(12) United States Patent
Yang et al.

(10) Patent No.: US 11,693,216 B2
(45) Date of Patent: Jul. 4, 2023

(54) OPTICAL IMAGING LENS INCLUDING SEVEN LENSES OF +−+−−+− OR +−+−++− REFRACTIVE POWERS

(71) Applicant: ZHEJIANG SUNNY OPTICAL, CO., LTD, Zhejiang (CN)

(72) Inventors: Meng Yang, Zhejiang (CN); Fujian Dai, Zhejiang (CN); Liefeng Zhao, Zhejiang (CN)

(73) Assignee: ZHEJIANG SUNNY OPTICAL, CO., LTD, Zhejiang (CN)

( * ) Notice: Subject to any disclaimer, the term of this patent is extended or adjusted under 35 U.S.C. 154(b) by 288 days.

(21) Appl. No.: 16/930,343

(22) Filed: Jul. 16, 2020

(65) Prior Publication Data
US 2021/0041670 A1   Feb. 11, 2021

(30) Foreign Application Priority Data

Aug. 8, 2019   (CN) .......................... 201910731300.X

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC ............................. G02B 13/0045; G02B 9/64
See application file for complete search history.

(56) References Cited

U.S. PATENT DOCUMENTS

| 2019/0094494 A1* | 3/2019 | Hsu | .......................... G02B 9/64 |
| 2019/0353874 A1* | 11/2019 | Yeh | .................... G02B 13/0045 |
| 2021/0018724 A1* | 1/2021 | Hsu | .................... G02B 13/0045 |

FOREIGN PATENT DOCUMENTS

| CN | 109491047 A | 3/2019 |
| CN | 109765679 A | 5/2019 |

* cited by examiner

*Primary Examiner* — Wen Huang
(74) *Attorney, Agent, or Firm* — Yu Gang

(57) ABSTRACT

The disclosure provides an optical imaging lens, which sequentially includes, from an object side to an image side: a first lens with positive focal power; a second lens with negative focal power; a third lens with positive focal power; a fourth lens with focal power; a fifth lens with focal power; a sixth lens with focal power, an object-side surface of which is a convex surface and an image-side surface of which is a concave surface; and a seventh lens with negative focal power, an image-side surface of which is a concave surface. An Entrance Pupil Diameter (EPD) of the optical imaging lens and an effective focal length f of the optical imaging lens meet 1.4<f/EPD<1.98, an air space T23 between the second lens and the third lens on an optical axis and an air space T34 between the third lens and the fourth lens on the optical axis meet 0.1<T23/T34<0.3.

7 Claims, 30 Drawing Sheets

OPTICAL IMAGING LENS INCLUDING SEVEN LENSES OF +−+−−+− OR +−+−++− REFRACTIVE POWERS

CROSS-REFERENCE TO RELATED DISCLOSURE(S)

The disclosure claims priority to Chinese Patent Disclosure No. 201910731300.X, filed on Aug. 8, 2019 and entitled "Optical Imaging Lens", the contents of which are hereby incorporated by reference in its entirety.

TECHNICAL FIELD

The disclosure relates to the technical field of optical lens imaging, and more particularly to an optical imaging lens.

BACKGROUND

With the rapid change of intelligent electronic products, people's demand for the photography function of smart phones, tablet PCs and other products is also increasing. The development trend of miniaturization and ultrathin in the market of intelligent electronic products promotes the new revolution of optical imaging lens. Besides meeting the requirements of miniaturization, how to obtain higher image quality in different environments becomes an urgent problem lens designers need to solve.

Based on the problem of an unstable imaging effect of the optical imaging lens in a related art, the disclosure provides an optical imaging lens with large aperture, ultra-thin shape and good imaging quality, which can meet the need of miniaturization of the intelligent electronic products.

SUMMARY

Some embodiment of the disclosure is to provide an optical imaging lens, to solve the problem of an unstable imaging effect of the optical imaging lens in the related art.

To achieve the above purpose, according to an aspect of the disclosure, an optical imaging lens is provided, which sequentially includes, from an object side to an image side: a first lens with positive focal power; a second lens with negative focal power; a third lens with positive focal power; a fourth lens with focal power; a fifth lens with focal power; a sixth lens with focal power, an object-side surface of which is a convex surface and an image-side surface of which is a concave surface; and a seventh lens with negative focal power, an image-side surface of which is a concave surface. An Entrance Pupil Diameter (EPD) of the optical imaging lens and an effective focal length f of the optical imaging lens meet $1.4 < f/EPD < 1.98$, an air space T23 between the second lens and the third lens on an optical axis and an air space T34 between the third lens and the fourth lens on the optical axis meet $0.1 < T23/T34 < 0.3$.

In an exemplary embodiment, a curvature radius R11 of the object-side surface of the sixth lens and an effective focal length f3 of the third lens meet $0.1 < R11/f3 < 0.5$.

In an exemplary embodiment, an effective focal length f2 of the second lens and an effective focal length f7 of the seventh lens meet $1 < f2/f7 < 1.6$.

In an exemplary embodiment, a curvature radius R12 of the image-side surface of the sixth lens and a curvature radius R11 of the object-side surface of the sixth lens meet $0 < (R12−R11)/(R12+R11) < 0.5$.

In an exemplary embodiment, a sum $\Sigma CT$ of Center Thicknesses (CT) of the first lens to the seventh lens on the optical axis and a distance TD from an object-side surface of the first lens to the image-side surface of the seventh lens on the optical axis meet $0.3 < \Sigma CT/TD < 0.8$.

In an exemplary embodiment, a curvature radius R11 of the object-side surface of the sixth lens and a curvature radius R14 of the image-side surface of the seventh lens meet $0.9 < R11/R14 < 1.5$.

In an exemplary embodiment, a distance from an intersection of an object-side surface of the first lens and the optical axis to a vertex of an effective radius of the object-side surface of the first lens on the optical axis is SAG11, an edge thickness of the first lens is ET1; SAG11 and ET1 meet $3 < SAG11/ET1 < 3.6$.

In an exemplary embodiment, a CT6 of the sixth lens on the optical axis, an air space T67 between the sixth lens and the seventh lens on the optical axis, and a CT7 of the seventh lens on the optical axis meet $0.1 < CT6/(T67+CT7) < 0.6$.

In an exemplary embodiment, the effective focal length f of the optical imaging lens, an effective focal length f1 of the first lens and an effective focal length f3 of the third lens meet $1.3 < (f/f1)+(f/f3) < 2$.

In an exemplary embodiment, a sum $\Sigma AT$ of an air spaces between any two lenses of the first lens to the seventh lens on the optical axis and the EPD of the optical imaging lens meet $0.9 < EPD/\Sigma AT < 1.6$.

According to another aspect of the disclosure, an optical imaging lens is provided, which sequentially includes, from an object side to an image side: a first lens with positive focal power; a second lens with negative focal power; a third lens with positive focal power; a fourth lens with focal power; a fifth lens with focal power; a sixth lens with focal power; and a seventh lens with negative focal power, an object-side surface of which is a convex surface and an image-side surface of which is a concave surface. A distance from AN intersection of the object-side surface of the seventh lens and the optical axis to a vertex of an effective radius of the object-side surface of the seventh lens on the optical axis is SAG71, and ImgH is a half of diagonal length of an effective pixel region on the imaging surface of the optical imaging lens, SAG71 and ImgH and an air space T67 between the sixth lens and the seventh lens on the optical axis meet $0.04 < |SAG71*T67|/ImgH^2 < 0.09$.

In an exemplary embodiment, the EPD of the optical imaging lens and the effective focal length f of the optical imaging lens meet $1.4 < f/EPD < 1.98$.

In an exemplary embodiment, an air space T23 between the second lens and the third lens on the optical axis and an air space T34 between the third lens and the fourth lens on the optical axis meet $0.1 < T23/T34 < 0.3$.

In an exemplary embodiment, a curvature radius R11 of an object-side surface of the sixth lens and an effective focal length f3 of the third lens meet $0.1 < R11/f3 < 0.5$.

In an exemplary embodiment, an effective focal length f2 of the second lens and an effective focal length f7 of the seventh lens meet $1 < f2/f7 < 1.6$.

In an exemplary embodiment, a curvature radius R12 of an image-side surface of the sixth lens and a curvature radius R11 of an object-side surface of the sixth lens meet $0 < (R12−R11)/(R12+R11) < 0.5$.

In an exemplary embodiment, a sum $\Sigma CT$ of CTs of the first lens to the seventh lens on the optical axis and a distance TD from an object-side surface of the first lens to the image-side surface of the seventh lens on the optical axis meet $0.3 < \Sigma CT/TD < 0.8$.

In an exemplary embodiment, a curvature radius R11 of an object-side surface of the sixth lens and a curvature radius R14 of the image-side surface of the seventh lens meet $0.9<R11/R14<1.5$.

In an exemplary embodiment, a distance from an intersection of an object-side surface of the first lens and the optical axis to a vertex of an effective radius of an object-side surface of the first lens on the optical axis is SAG11, an edge thickness of the first lens is ET1; SAG11 and ET1 meet $3<SAG11/ET1<3.6$.

In an exemplary embodiment, a CT6 of the sixth lens on the optical axis, an air space T67 between the sixth lens and the seventh lens on the optical axis, and a CT7 of the seventh lens on the optical axis meet $0.1<CT6/(T67+CT7)<0.6$.

In an exemplary embodiment, the effective focal length f of the optical imaging lens, an effective focal length f1 of the first lens and an effective focal length f3 of the third lens meet $1.3<(f/f1)+(f/f3)<2$.

In an exemplary embodiment, a sum $\Sigma AT$ of an air spaces between any two lenses of the first lens to the seventh lens on the optical axis and the EPD of the optical imaging lens meet $0.9<EPD/\Sigma AT<1.6$.

Applying the technical solutions of the disclosure, the optical imaging lens sequentially includes, from the object side to the image side: the first lens with positive focal power; the second lens with negative focal power; the third lens with positive focal power; the fourth lens with focal power; the fifth lens with focal power; the sixth lens with focal power, the object-side surface of which is a convex surface and the image-side surface of which is a concave surface; and the seventh lens with negative focal power, the image-side surface of which is a concave surface. The EPD of the optical imaging lens and the effective focal length f of the optical imaging lens meet $1.4<f/EPD<1.98$, the air space T23 between the second lens and the third lens on the optical axis and the air space T34 between the third lens and the fourth lens on the optical axis meet $0.1<T23/T34<0.3$.

Through the reasonable arrangement of surface type and focal power, a larger aperture can be realized to increase the amount of lighting, and a low order aberration of the system can be effectively balanced and controlled under the premise of compressing the overall size of lens and ensuring the normal mass production yield, thus obtaining higher imaging quality in different environments, and improving the stability of imaging effect. Through the reasonable control of the CT, a diaphragm may be set between the third lens and the fourth lens, and the aperture may be increased. The design of large aperture can obtain more amount of lighting, reduce an optical aberration in low light, improve an image acquisition quality, and obtain a stable imaging effect.

BRIEF DESCRIPTION OF THE DRAWINGS

The accompanying drawings constituting a part of the disclosure are used for providing further understanding of the disclosure. Schematic embodiments of the disclosure and description thereof are used for illustrating the disclosure and not intended to form an improper limit to the disclosure. In the accompanying drawings.

Figure 1:
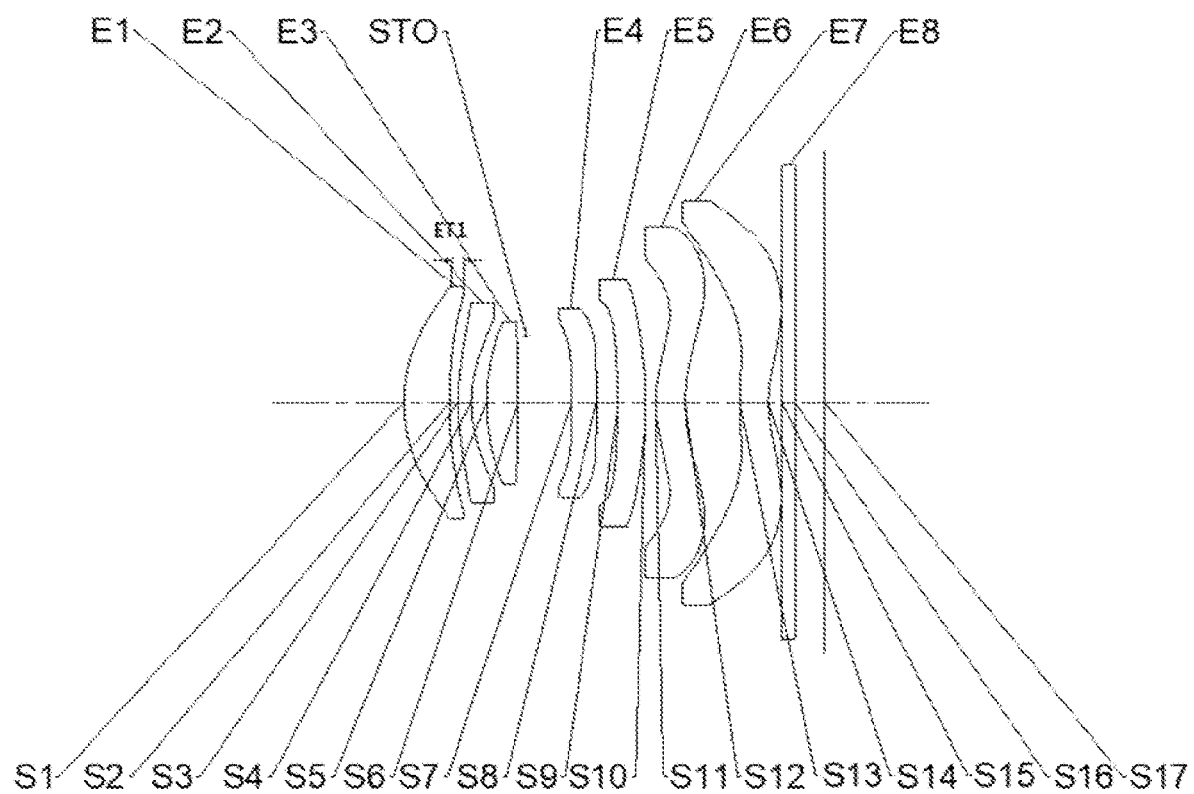
FIG. 1 is a structure diagram of an optical imaging lens according to Example 1 of the disclosure.

E1. First lens; E2. Second lens; E3. Third lens; E4. Fourth lens; E5. Fifth lens; E6. Sixth lens; E7. Seventh lens; E8. Filter; S1. Object-side surface of the first lens; S2. Image-side surface of the first lens; S3. Object-side surface of the second lens; S4. Image-side surface of the second lens; S5. Object-side surface of the third lens; S6. Image-side surface of the third lens; S7. Object-side surface of the fourth lens; S8. Image-side surface of the fourth lens; S9. Object-side surface of the fifth lens; S10. Image-side surface of the fifth lens; S11. Object-side surface of the sixth lens; S12. Image-side surface of the sixth lens; S13. Object-side surface of the seventh lens; S14. Image-side surface of the seventh lens;

S15. Object-side surface of the filter; S16. Image-side surface of the filter; S17. Imaging surface; STO. Diaphragm.

DETAILED DESCRIPTION OF THE EMBODIMENTS

It is to be noted that the embodiments in the disclosure and characteristics in the embodiments may be combined without conflicts. The disclosure is elaborated below with reference to the accompanying drawings and embodiments.

It is to be noted that unless otherwise indicated, all technical and scientific terms used herein have the same meaning as that commonly understood by those of ordinary skill in the art to which the disclosure belongs.

In the disclosure, in the absence of any statement to the contrary, the used nouns of locality like "up, down, top, bottom" are usually used in relation to the directions shown in the drawings, or to the component itself in the vertical, perpendicular, or gravitational directions. Similarly, for the convenience of understanding and description, "inside and outside" refer to the inside and outside of the outline of the component itself, but the above nouns of locality are not used to limit the disclosure.

It is to be noted that, in the specification, expressions like first, second and third are adopted not to represent any limit to characteristics but only to distinguish one characteristic from another characteristic. Therefore, a first lens discussed below may also be called a second lens or a third lens under the condition of not departing from the teachings of the disclosure.

For convenient description, thicknesses, sizes and shapes of lenses are slightly magnified in the drawings. Specifically, spherical or aspherical shapes in the drawings are shown exemplarily. That is, spherical or aspherical shapes are not limited to the spherical or aspherical shapes shown in the drawings. The drawings are drawn only exemplarily but not strictly to scale.

Herein, a paraxial region refers to a region nearby an optical axis. If a lens surface is a convex surface and a position of the convex surface is not defined, it indicates that the lens surface is a convex surface at least in the paraxial region; and if the lens surface is a concave surface and a position of the concave surface is not defined, it indicates that the lens surface is a concave surface at least in the paraxial region. A surface of each lens closest to an object-side is called an object-side surface of the lens, and a surface of each lens closest to an imaging surface is called an image-side surface of the lens. The surface type in the paraxial region may be judged according to a judgment mode of the general knowledgeable people in the field, and whether the surface is convex or concave is judged based on a positive or negative R value (R refers to a curvature radius of the paraxial region, usually the R value on lens data in optical software). On the object-side surface, if the R value is positive, the surface is a convex surface, and if the R value is negative, the surface is a concave surface; on the image-side surface, if the R value is positive, the surface is a concave surface, and if the R value is negative, the surface is a convex surface To solve the problem of an unstable imaging effect of the optical imaging lens in the related art, the disclosure provides an optical imaging lens.

Embodiment 1

As shown in FIG. 1 to FIG. 30, the optical imaging lens sequentially includes, from an object side to an image side: a first lens with positive focal power; a second lens with negative focal power; a third lens with positive focal power; a fourth lens with focal power; a fifth lens with focal power; a sixth lens with focal power, an object-side surface of which is a convex surface and an image-side surface of which is a concave surface; and a seventh lens with negative focal power, an image-side surface of which is a concave surface. An EPD of the optical imaging lens and an effective focal length f of the optical imaging lens meet $1.4<f/EPD<1.98$, an air space T23 between the second lens and the third lens on the optical axis and an air space T34 between the third lens and the fourth lens on the optical axis meet $0.1<T23/T34<0.3$.

Through the reasonable arrangement of surface type and focal power, a larger aperture can be realized to increase the amount of lighting, and a low order aberration of the system can be effectively balanced and controlled under the premise of compressing the overall size of lens and ensuring the normal mass production yield, thus obtaining higher imaging quality in different environments, and improving the stability of imaging effect. Through the reasonable control of a Center Thicknesses (CT), a diaphragm may be set between the third lens and the fourth lens, and the aperture may be increased. The design of large aperture can obtain more amount of lighting, reduce an optical aberration in low light, improve an image acquisition quality, and obtain a stable imaging effect.

It is to be noted that the CT is the thickness between the lenses which are between the first lens and the seventh lens.

In the embodiment, a curvature radius R11 of the object-side surface of the sixth lens and an effective focal length f3 of the third lens meet $0.1<R11/f3<0.5$. By reasonably controlling the curvature radius of the object-side surface of the sixth lens and the effective focal length of the third lens, optical sensitivity of the third lens and the sixth lens is reduced to reduce the aberration within the range, thus improving the imaging quality.

In the embodiment, an effective focal length f2 of the second lens and an effective focal length f7 of the seventh lens meet $1<f2/f7<1.6$. By controlling a ratio of the effective focal length of the second lens to the effective focal length of the seventh lens, a spherical aberration may be controlled within a reasonable range for better imaging effect.

In the embodiment, a curvature radius R12 of the image-side surface of the sixth lens and the curvature radius R11 of the object-side surface of the sixth lens meet $0<(R12-R11)/(R12+R11)<0.5$. By controlling the curvature radius of the object-side surface of the sixth lens and the curvature radius of the image-side surface of the sixth lens, an excessive incidence angle of the optical imaging lens can be avoided, and the range of the focal power of the optical imaging lens can be restricted to reduce a coma.

In the embodiment, a sum $\Sigma CT$ of CTs of the first lens to the seventh lens on the optical axis and a distance TD from the object-side surface of the first lens to the image-side surface of the seventh lens on the optical axis meet $0.3<\Sigma CT/TD<0.8$. In this way, the thickness of each lens is within a reasonable range relative to the length of optical imaging lens, so as to reduce the size of the optical imaging lens and reduce the difficulty of lens production, thus a good compromise can be reached between the two.

In the embodiment, the curvature radius R11 of the object-side surface of the sixth lens and a curvature radius R14 of the image-side surface of the seventh lens meet $0.9<R11/R14<1.5$. The optical sensitivity of the sixth lens and the seventh lens can be reduced by controlling the curvature radius of the object-side surface of the sixth lens and the image-side surface of the seventh lens.

In the embodiment, a distance from an intersection of the object-side surface of the first lens and the optical axis to a vertex of an effective radius of the object-side surface of the first lens on the optical axis is SAG11, an edge thickness of the first lens is ET1; SAG11 and ET1 meet 3<SAG11/ET1<3.6. The mass production of the first lens may be increased by defining the reasonable range of vector height and edge thickness of the object-side surface of the first lens, and the first lens may be easily assembled on a lens barrel.

In the embodiment, a CT6 of the sixth lens on the optical axis, an air space T67 between the sixth lens and the seventh lens on the optical axis, and a CT7 of the seventh lens on the optical axis meet 0.1<CT6/(T67+CT7)<0.6. By reasonably controlling the CT of the sixth lens, the air space between the sixth lens and the seventh lens on the optical axis, and the CT of the seventh lens on the optical axis in a reasonable range, it is ensured that two lenses will be neither too thin to affect production nor will the total length of the optical imaging lens exceed a manufacturing limit.

In the embodiment, the effective focal length f of the optical imaging lens, the effective focal length f1 of the first lens and the effective focal length f3 of the third lens meet 1.3<(f/f1)+(f/f3)<2. By reasonably distributing the contribution of the effective focal length of the first lens and the third lens to the whole optical imaging system, the spherical aberration and field curvature of the first lens and the third lens can be reduced.

In the embodiment, a sum ΣAT of an air spaces between any two lenses of the first lens to the seventh lens on the optical axis and the EPD of the optical imaging lens meet 0.9<EPD/ΣAT<1.6. By reasonably restricting the total length of the air space, the structure of the lens is more compact, and the effective focal length of the optical imaging lens and the total length of the optical imaging lens are still within a reasonable range while achieving a large aperture.

Embodiment 2

The optical imaging lens sequentially includes, from an object side to an image side: a first lens with positive focal power; a second lens with focal power; a third lens with positive focal power; a fourth lens with focal power; a fifth lens with focal power; a sixth lens with focal power; and a seventh lens with negative focal power, an object-side surface of which is a convex surface and an image-side surface of which is a concave surface. A distance SAG71 from an intersection of the object-side surface of the seventh lens and the optical axis to a vertex of an effective radius of the object-side surface of the seventh lens on the optical axis, the air space T67 between the sixth lens and the seventh lens on the optical axis, and ImgH meet 0.04<|SAG71*T67|/ImgH$^2$<0.09, wherein ImgH is a half of diagonal length of an effective pixel region on the imaging surface of the optical imaging lens.

Through the reasonable arrangement of surface type and focal power, a larger aperture can be realized to increase the amount of lighting, and a low order aberration of the system can be effectively balanced and controlled under the premise of compressing the overall size of lens and ensuring the normal mass production yield. By defining the vector height of the object-side surface of the seventh lens and the ratio of the air space between the sixth lens and the seventh lens to an image height, the seventh lens is more easily machined and the overall length of the optical imaging lens may be correspondingly reduced.

The EPD of the optical imaging lens and the effective focal length f of the optical imaging lens meet 1.4<f/EPD<1.98, an air space T23 between the second lens and the third lens on the optical axis and an air space T34 between the third lens and the fourth lens on the optical axis meet 0.1<T23/T34<0.3. Through the reasonable control of the CT, a diaphragm may be set between the third lens and the fourth lens, and the aperture may be increased. The design of large aperture can obtain more amount of lighting, reduce an optical aberration in low light, improve an image acquisition quality, and obtain a stable imaging effect.

In the embodiment, a curvature radius R11 of the object-side surface of the sixth lens and an effective focal length f3 of the third lens meet 0.1<R11/f3<0.5. By reasonably controlling the curvature radius of the object-side surface of the sixth lens and the effective focal length of the third lens, optical sensitivity of the third lens and the sixth lens is reduced to reduce the aberration within the range, thus improving the imaging quality.

In the embodiment, an effective focal length f2 of the second lens and an effective focal length f7 of the seventh lens meet 1<f2/f7<1.6. By controlling a ratio of the effective focal length of the second lens to the effective focal length of the seventh lens, a spherical aberration may be controlled within a reasonable range for better imaging effect.

In the embodiment, a curvature radius R12 of the image-side surface of the sixth lens and the curvature radius R11 of the object-side surface of the sixth lens meet 0<(R12−R11)/(R12+R11)<0.5. By controlling the curvature radius of the object-side surface of the sixth lens and the curvature radius of the image-side surface of the sixth lens, an excessive incidence angle of the optical imaging lens can be avoided, and the range of the focal power of the optical imaging lens can be restricted to reduce a coma.

In the embodiment, a sum ΣCT of CTs of the first lens to the seventh lens on the optical axis and a distance TD from the object-side surface of the first lens to the image-side surface of the seventh lens on the optical axis meet 0.3<ΣCT/TD<0.8. In this way, the thickness of each lens is within a reasonable range relative to the length of optical imaging lens, so as to reduce the size of the optical imaging lens and reduce the difficulty of lens production, thus a good compromise can be reached between the two.

In the embodiment, the curvature radius R11 of the object-side surface of the sixth lens and the curvature radius R14 of the image-side surface of the seventh lens meet 0.9<R11/R14<1.5. The optical sensitivity of the sixth lens and the seventh lens can be reduced by controlling the curvature radius of the object-side surface of the sixth lens and the image-side surface of the seventh lens.

In the embodiment, the distance from the intersection of the object-side surface of the first lens and the optical axis to the vertex of an effective radius of the object-side surface of the first lens on the optical axis is SAG11, an edge thickness of the first lens is ET1; SAG11 and ET1 meet 3<SAG11/ET1<3.6. The mass production of the first lens may be increased by defining the reasonable range of vector height and edge thickness of the object-side surface of the first lens, and the first lens may be easily assembled on a lens barrel.

In the embodiment, a CT6 of the sixth lens on the optical axis, an air space T67 between the sixth lens and the seventh lens on the optical axis, and a CT7 of the seventh lens on the optical axis meet 0.1<CT6/(T67+CT7)<0.6. By reasonably controlling the CT of the sixth lens, the air space between the sixth lens and the seventh lens on the optical axis, and the CT of the seventh lens on the optical axis in a reasonable range, it is ensured that two lenses will be neither too thin to affect production nor will the total length of the optical imaging lens exceed a manufacturing limit.

In the embodiment, the effective focal length f of the optical imaging lens, the effective focal length f1 of the first lens and the effective focal length f3 of the third lens meet 1.3<(f/f1)+(f/f3)<2. By reasonably distributing the contribution of the effective focal length of the first lens and the third lens to the whole optical imaging system, the spherical aberration and field curvature of the first lens and the third lens can be reduced.

In the embodiment, a sum ΣAT of the air spaces between any two lenses of the first lens to the seventh lens on the optical axis and the EPD of the optical imaging lens meet 0.9<EPD/ΣAT<1.6. By reasonably restricting the total length of the air space, the structure of the lens is more compact, and the effective focal length of the optical imaging lens and the total length of the optical imaging lens are still within a reasonable range while achieving a large aperture.

The optical imaging lens may further include at least one diaphragm to improve the imaging quality of the lens. Optionally, the diaphragm may be arranged between an image-side surface of the third lens and an object-side surface of the fourth lens. Optionally, the optical imaging lens may further include an optical filter configured to correct the chromatic aberration and/or protective glass configured to protect a photosensitive element on the imaging surface.

The optical imaging lens in the disclosure may use multiple lenses, for example, seven lenses. By reasonably distributing the focal power of each lens, the surface type, the CT of each lens and the distance between the lenses on the optical axis, the aperture of the optical imaging lens may be effectively increased, the sensitivity of the lens may be reduced, and the machinability of the lens may be improved, thus the optical imaging lens is more conducive to production and processing and may be applied to smart phones and other portable electronic devices. The optical imaging lens also has the advantages of large aperture, being ultra-thin and excellent imaging quality, which can meet the needs of miniaturization of intelligent electronic products. In addition, the design of large aperture can obtain more amount of lighting, reduce an optical aberration in case of insufficient light, improve an image acquisition quality, and obtain a stable imaging effect.

In the disclosure, at least one of mirror surfaces of each lens is an aspherical mirror surface. The aspherical mirror surface has the characteristic that the curvature keeps changing from a center of the lens to a periphery of the lens. Unlike a spherical lens with a constant curvature from the center of the lens to the periphery of the lens, an aspherical lens has a better curvature radius characteristic and the advantages of improving distortion aberrations and improving astigmatic aberrations. With adoption of the aspherical lens, the aberrations during imaging may be eliminated as much as possible, thereby improving the imaging quality.

However, those skilled in the art should know that the number of the lenses forming the optical imaging lens may be changed without departing from the technical solutions claimed in the disclosure to achieve each result and advantage described in the specification. For example, although descriptions are made in the implementation with seven lenses as an example, the optical imaging lens is not limited to seven lenses. If necessary, the optical imaging lens may further include another number of lenses.

Examples of the specific surface types and parameters of the optical imaging lens applicable to the above implementation mode will further be described below with reference to the drawings.

It is to be noted that any of the following examples 1 to 6 is applied to all embodiments of the disclosure.

Example 1

As shown in FIG. 1, an optical imaging lens sequentially includes, from an object side to an image side: a first lens E1, a second lens E2, a third lens E3, a diaphragm STO, a fourth lens E4, a fifth lens E5, a sixth lens E6, a seventh lens E7, a filter E8 and an imaging surface S17.

The first lens E1 has positive focal power, an object-side surface S1 of the first lens is a convex surface, and an image-side surface S2 of the first lens is a concave surface. The second lens E2 has negative focal power, an object-side surface S3 of the second lens is a convex surface, and an image-side surface S4 of the second lens is a concave surface. The third lens E3 has positive focal power, an object-side surface S5 of the third lens is a convex surface, and an image-side surface S6 of the third lens is a convex surface. The fourth lens E4 has negative focal power, an object-side surface S7 of the fourth lens is a concave surface, and an image-side surface S8 of the fourth lens is a concave surface. The fifth lens E5 has negative focal power, an object-side surface S9 of the fifth lens is a concave surface, and an image-side surface S10 of the fifth lens is a convex surface. The sixth lens E6 has positive focal power, an object-side surface S11 of the sixth lens is a convex surface, and an image-side surface S12 of the sixth lens is a concave surface. The seventh lens E7 has negative focal power, an object-side surface S13 of the seventh lens is a convex surface, and an image-side surface S14 of the seventh lens is a concave surface. The filter E8 has a filter object-side surface S15 and a filter image-side surface S16. Light from an object sequentially penetrates through each surface and is finally imaged on the imaging surface S17.

Table 1 shows surface type, curvature radius, thickness, material and cone coefficient of each lens of the optical imaging lens in example 1, in which the units of curvature radius and thickness are millimeter.

TABLE 1 detailed optical data for each lens in example 1 (OBJ represents a light source surface)

| Surface number | Surface type | Curvature radius | Thickness | Material | Cone coefficient |
|---|---|---|---|---|---|
| OBJ | Spherical | Infinite | Infinite | | |
| S1 | Aspherical | 1.9259 | 0.5520 | 1.54/56.2 | −0.0457 |
| S2 | Aspherical | 6.9336 | 0.1000 | | 1.3666 |
| S3 | Aspherical | 2.7331 | 0.1621 | 1.64/23.5 | −0.9032 |
| S4 | Aspherical | 1.5271 | 0.1852 | | −0.9028 |
| S5 | Aspherical | 2.6090 | 0.3808 | 1.54/56.1 | −30.5998 |
| S6 | Aspherical | −72.2411 | 0.1002 | | −95.0000 |
| STO | Spherical | Infinite | 0.5491 | | |
| S7 | Aspherical | −52.0007 | 0.3058 | 1.66/20.4 | 50.0000 |
| S8 | Aspherical | 17.0938 | 0.2660 | | 13.6404 |
| S9 | Aspherical | −5.7011 | 0.3288 | 1.64/23.5 | −7.8192 |
| S10 | Aspherical | −7.2143 | 0.1228 | | −35.3879 |
| S11 | Aspherical | 1.5623 | 0.3555 | 1.54/56.1 | −4.3138 |
| S12 | Aspherical | 2.0594 | 0.6626 | | −3.5892 |
| S13 | Aspherical | 3.2110 | 0.3444 | 1.54/56.1 | −22.0345 |
| S14 | Aspherical | 1.4268 | 0.1684 | | −6.5697 |

TABLE 1-continued detailed optical data for each lens in example
1 (OBJ represents a light source surface)

| Surface number | Surface type | Curvature radius | Thickness | Material | Cone coefficient |
|---|---|---|---|---|---|
| S15 | Spherical | Infinite | 0.1600 | 1.52/64.2 | |
| S16 | Spherical | Infinite | 0.3564 | | |
| S17 | Spherical | Infinite | | | |

In the example, an aspherical lens can be used for each lens, and each aspherical surface type is limited by the following formula:

$$x = \frac{ch^2}{1+\sqrt{1-(k+1)c^2h^2}} + \sum A_i h^i, \quad \text{formula (1)}$$

where x is a distance vector height between a position of the aspherical surface at a height h in a direction of the optical axis and an aspherical surface vertex; c is a paraxial curvature of the aspherical surface, c=1/R (namely, the paraxial curvature c is a reciprocal of the curvature radius R in Table 1); k is a cone coefficient (given in Table 1); and Ai is an i-th-order correction coefficient of the aspherical surface.

Table 2 shows higher-order coefficients applicable to each aspherical surface of each aspherical lens in the example.

TABLE 2 higher-order coefficients of each aspherical surface in example 1

| Surface type | A4 | A6 | A8 | A10 | A12 |
|---|---|---|---|---|---|
| S1 | 2.4088E−04 | −5.7702E−03 | 2.4087E−02 | −6.9199E−02 | 1.0383E−01 |
| S2 | 2.2333E−03 | 9.8560E−02 | −2.9845E−01 | 5.4759E−01 | −6.4231E−01 |
| S3 | −1.6509E−01 | 3.5124E−01 | −7.4131E−01 | 1.2925E+00 | −1.6781E+00 |
| S4 | −1.7429E−01 | 2.9158E−01 | −2.6012E−01 | −4.6904E−01 | 2.3238E+00 |
| S5 | 2.0521E−01 | −4.5551E−01 | 1.4369E+00 | −4.2178E+00 | 9.3280E+00 |
| S6 | −4.0580E−02 | 1.7015E−01 | −1.0755E+00 | 3.8064E+00 | −7.6782E+00 |
| S7 | −1.1925E−01 | −1.0007E−01 | 4.7387E−01 | −1.7040E+00 | 4.0762E+00 |
| S8 | −8.0047E−02 | −1.5927E−01 | 5.3649E−01 | −1.4334E+00 | 2.5303E+00 |
| S9 | 9.7840E−02 | −2.2952E−01 | 4.8596E−01 | −7.6929E−01 | 6.7289E−01 |
| S10 | −1.1799E−01 | 1.4009E−01 | −3.5760E−03 | −1.7571E−01 | 2.2583E−01 |
| S11 | −1.2438E−01 | 1.1165E−01 | −1.6964E−01 | 1.7588E−01 | −1.2756E−01 |
| S12 | 1.5866E−02 | −1.0384E−01 | 9.6553E−02 | −5.8164E−02 | 2.3570E−02 |
| S13 | −2.6175E−01 | 1.8181E−01 | −1.0150E−01 | 4.5860E−02 | −1.5661E−02 |
| S14 | −1.4742E−01 | 9.0443E−02 | −4.2611E−02 | 1.4157E−02 | −3.7552E−03 |

| Surface type | A14 | A16 | A18 | A20 |
|---|---|---|---|---|
| S1 | −9.0423E−02 | 4.5043E−02 | −1.1823E−02 | 1.2407E−03 |
| S2 | 4.6749E−01 | −2.0031E−01 | 4.5788E−02 | −4.3040E−03 |
| S3 | 1.4371E+00 | −7.4011E−01 | 2.0506E−01 | −2.3320E−02 |
| S4 | −4.4312E+00 | 4.4756E+00 | −2.2924E+00 | 4.6512E−01 |
| S5 | −1.3796E+01 | 1.2425E+01 | −6.0413E+00 | 1.2061E+00 |
| S6 | 8.6620E+00 | −4.7959E+00 | 6.5834E−01 | 2.8482E−01 |
| S7 | −6.2521E+00 | 5.9148E+00 | −3.1478E+00 | 7.2324E−01 |
| S8 | −2.8704E+00 | 2.0193E+00 | −8.0411E−01 | 1.3851E−01 |
| S9 | −2.4089E−01 | −7.0643E−02 | 8.7811E−02 | −2.1539E−02 |
| S10 | −1.4464E−01 | 5.1609E−02 | −9.7069E−03 | 7.5106E−04 |
| S11 | 6.2300E−02 | −1.9079E−02 | 3.2637E−03 | −2.3551E−04 |
| S12 | −6.2237E−03 | 1.0141E−03 | −9.2363E−05 | 3.5953E−06 |
| S13 | 3.8579E−03 | −6.4664E−04 | 6.5393E−05 | −2.9664E−06 |
| S14 | 8.1772E−04 | −1.2987E−04 | 1.2341E−05 | −5.0517E−07 |

Table 3 shows the effective focal length f of the optical imaging lens, the effective focal lengths f1 to f7 of the lenses, the distance TTL between the object-side surface S1 of the first lens to the imaging surface S17 on the optical axis, F number Fno of the optical imaging lens, ImgH is a half of diagonal length of the effective pixel region on the imaging surface of the optical imaging lens, and the maximum horizontal field of view (HFOV) in example 1.

TABLE 3 parameters of the optical imaging lens

| Parameters | examples 1 |
|---|---|
| TTL(mm) | 5.10 |
| ImgH (mm) | 3.07 |
| Semi-FOV(°) | 35.0 |
| Fno | 1.96 |
| f(mm) | 4.10 |
| f1(mm) | 4.71 |
| f2(mm) | −5.71 |
| f3(mm) | 4.64 |
| f4(mm) | −19.44 |
| f5(mm) | −46.42 |
| f6(mm) | 9.50 |
| f7(mm) | −5.06 |

Table 4 shows relationship expressions of the optical imaging lens in example 1. In example 1, f/EPD=1.96, which is in the range of 1.4 to 1.98, so a larger aperture can be realized to increase the amount of lighting, and a low order aberration of the system can be effectively balanced and controlled under the premise of compressing the overall size of lens and ensuring the normal mass production yield;

T23/T34=0.29, which is in the range of 0.1 to 0.3, so the aperture may be increased, and the amount of lighting may be increased;

R11/f3=0.34, which is in the range of 0.1 to 0.5, so the optical sensitivity of the third lens E3 and the sixth lens E6 may be reduced to reduce the aberration in the range and improve the imaging quality;

f2/f7=1.13, which is in the range of 1 to 1.6, so the spherical aberration may be controlled within a reasonable range for better imaging effect;

(R12−R11)/(R12+R11)=0.14, which is in the range of 0 to 0.5, so an excessive incidence angle of the optical imaging lens may be avoided, and the range of the focal power of the optical imaging lens may be restricted to reduce a coma;

ΣCT/TD=0.53, which is in the range of 0.3 to 0.8, so the thickness of each lens is within a reasonable range relative to the length of optical imaging lens, which reduces the size of the optical imaging lens and reduces the difficulty of lens production;

R11/R14=1.09, which is in the range of 0.9 to 1.5, so the optical sensitivity of the sixth lens E6 and the seventh lens E7 may be reduced;

SAG11/ET1=3.44, which is in the range of 3 to 3.6, so the mass production of the first lens E1 may be increased, and the first lens may be easily assembled on a lens barrel;

CT6/(T67+CT7)=0.35, which is in the range of 0.1 to 0.6, so it is ensured that the sixth lens E6 and the seventh lens E7 will be neither too thin to affect production nor will the total length of the optical imaging lens exceed a manufacturing limit;

(f/f1)+(f/f3)=1.75, which is in the range of 1.3 to 2, so it is beneficial to reducing the spherical aberration and field curvature of the first lens E1 and the third lens E3;

EPD/ΣAT=1.05, which is in the range of 0.9 to 1.6; by reasonably restricting the total length of the air space, the structure of the lens is more compact, and the effective focal length of the optical imaging lens and the total length of the optical imaging lens are still within a reasonable range while achieving a large aperture;

|SAG71*T67|/ImgH$^2$=0.05, which is in the range of 0.04 to 0.09; by defining the vector height of the object-side surface S14 of the seventh lens and the ratio of the air space between the sixth lens E6 and the seventh lens E7 to an image height, the seventh lens E7 is more easily machined and the overall length of the optical imaging lens may be correspondingly reduced.

TABLE 4 relationship expressions of the optical imaging lens in example 1

| Conditional expressions | examples 1 |
|---|---|
| f/EPD | 1.96 |
| T23/T34 | 0.29 |
| R11/f3 | 0.34 |
| f2/f7 | 1.13 |
| (R12 − R11)/(R12 + R11) | 0.14 |
| ΣCT/TD | 0.53 |
| R11/R14 | 1.09 |
| SAG11/ET1 | 3.44 |
| CT6/(T67 + CT7) | 0.35 |
| (f/f1) + (f/f3) | 1.75 |

TABLE 4-continued relationship expressions of the optical imaging lens in example 1

| Conditional expressions | examples 1 |
|---|---|
| EPD/ΣAT | 1.05 |
| |SAG71*T67|/ImgH$^2$ | 0.05 |

In the example, the length of the optical imaging lens on the optical axis from the object-side surface S1 of the first lens to the imaging surface S17 is 5.1 mm, the effective focal length of the optical imaging lens is 4.1 mm, the image height is 3.07 mm, the maximum HFOV is 35 degrees, and an aperture value is 1.96. The example ensures a larger aperture while ensuring the miniaturization of the optical imaging lens, which can obtain more amount of lighting, reduce the optical aberration in case of insufficient light, improve the image acquisition quality, and obtain the stable imaging effect. It is to be noted that the larger the aperture value, the smaller the aperture, and the smaller the aperture value, the larger the aperture.

Figure 2:
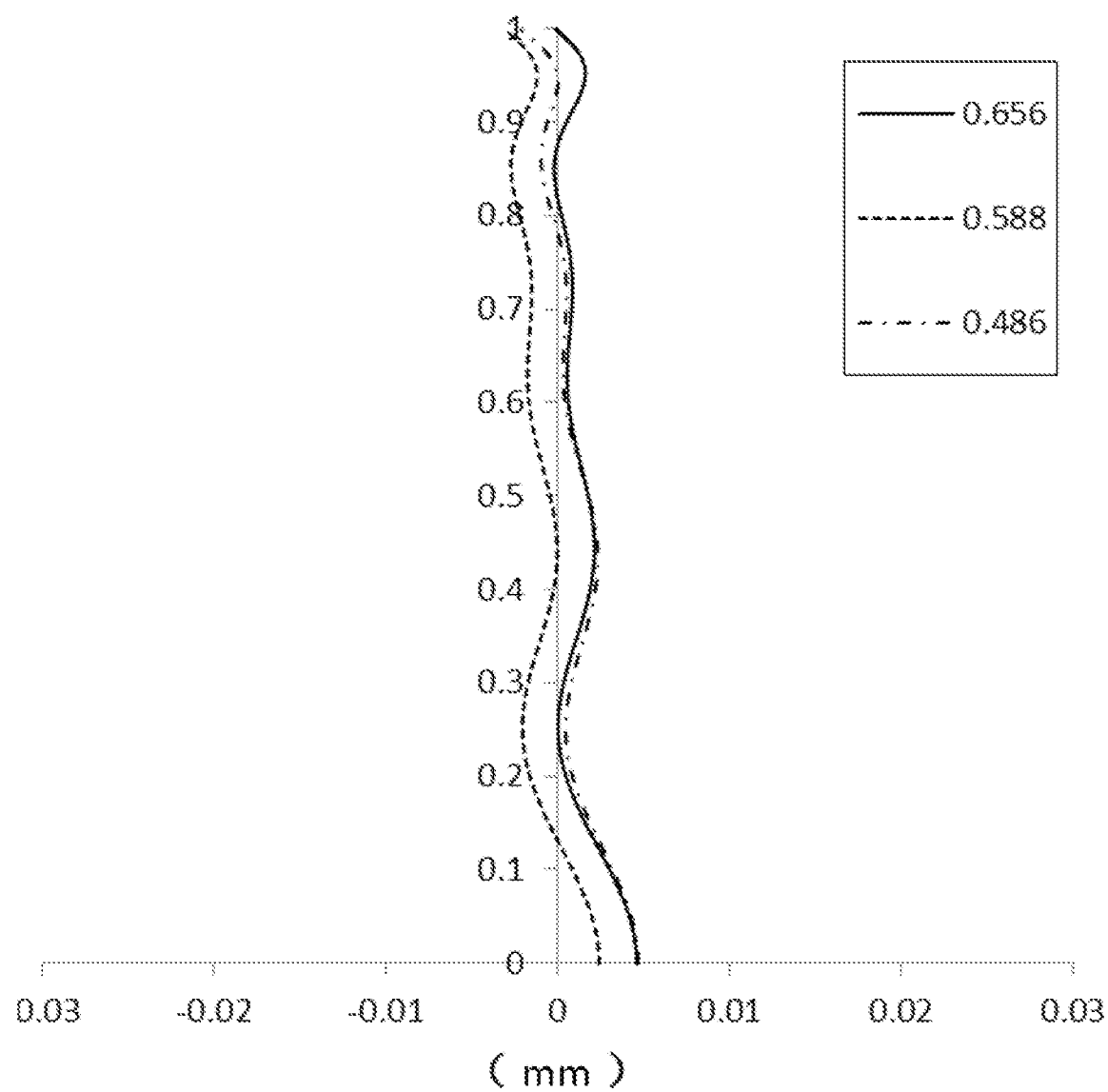
FIG. 2 shows a longitudinal aberration curve of the optical imaging lens in FIG. 1.
Figure 3:
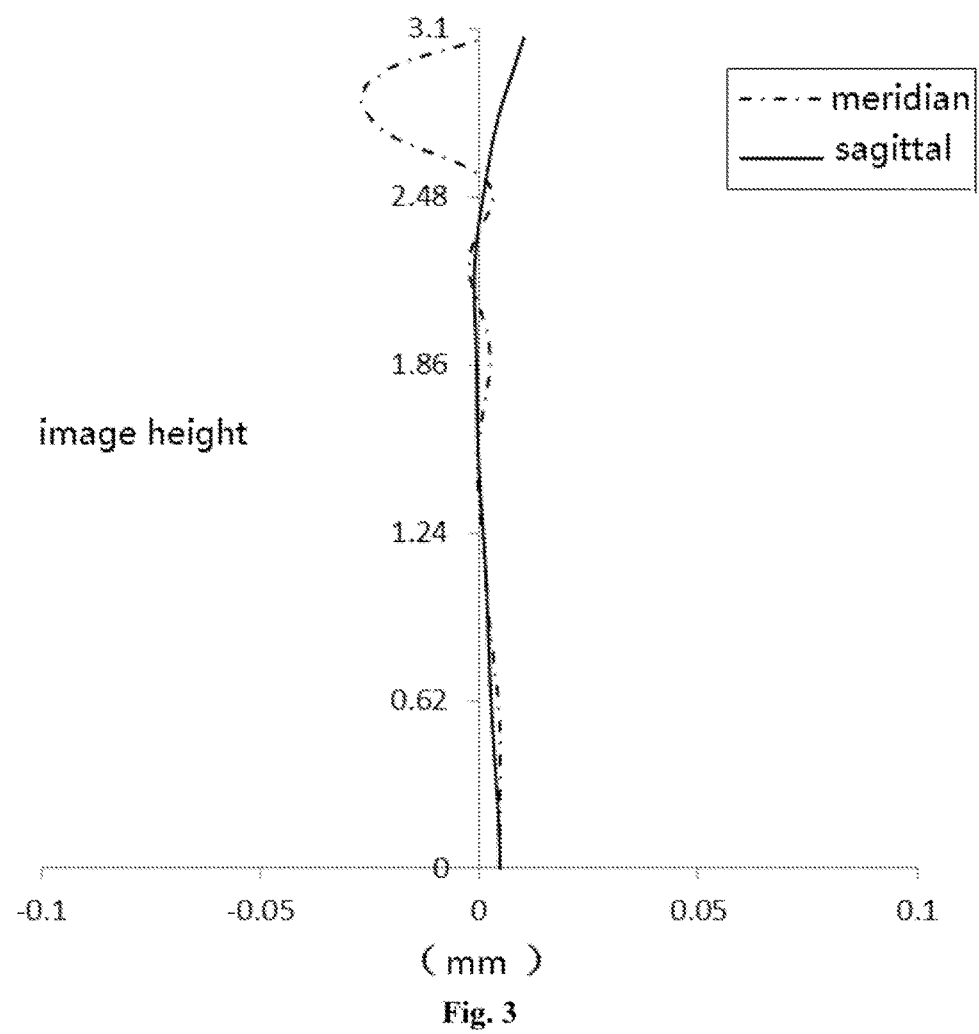
FIG. 3 shows an astigmatism curve of the optical imaging lens in FIG. 1.
Figure 4:
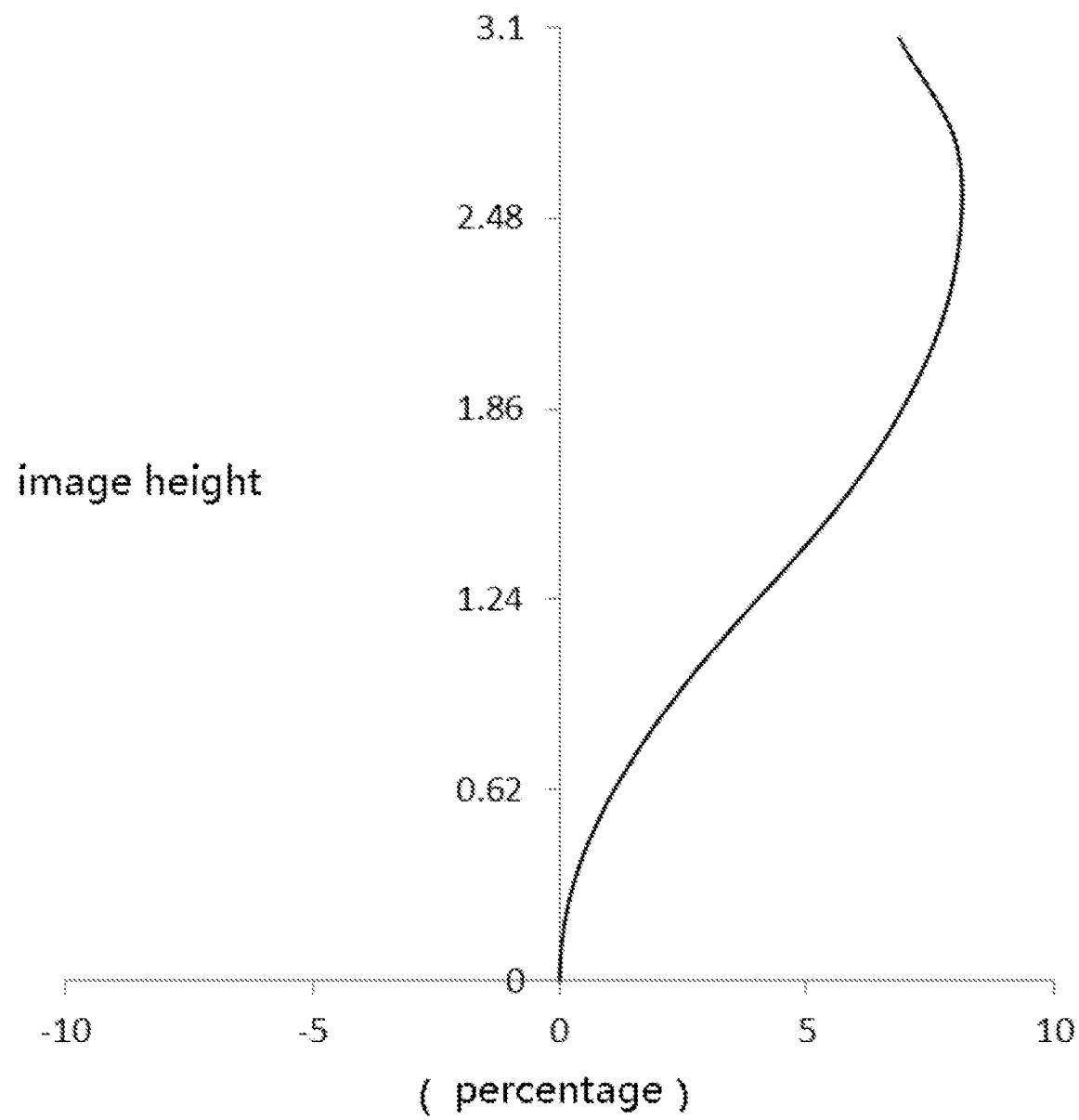
FIG. 4 shows a distortion curve of the optical imaging lens in FIG. 1.
Figure 5:
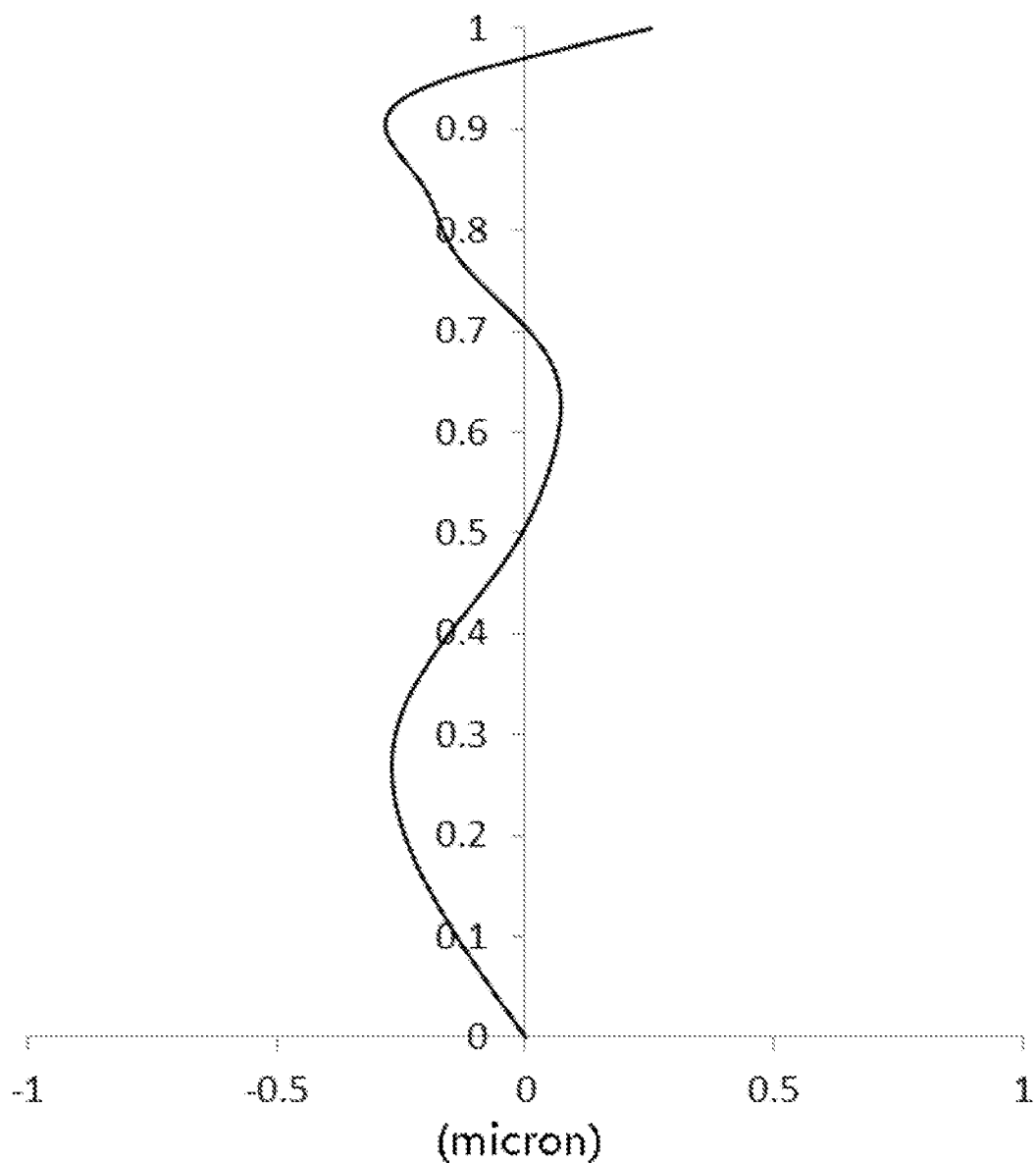
FIG. 5 shows a lateral color curve of the optical imaging lens in FIG. 1.

FIG. 2 shows a longitudinal aberration curve of the optical imaging lens in example 1, which represents that a converging focus of light with different wavelengths deviates after passing through the optical system, then focal planes of the light with different wavelengths cannot coincide in the final imaging, and polychromatic light scatters to form chromatic dispersion. FIG. 3 shows an astigmatism curve of the optical imaging lens in example 1, which represents a meridian image surface curvature and a sagittal image surface curvature. FIG. 4 shows a distortion curve of the optical imaging lens in example 1, which represents distortion values at different angles of view. FIG. 5 shows a lateral color curve of the optical imaging lens in example 1, which represents the aberration of different image heights on the imaging surface after the light passes through the optical imaging lens. It can be seen from FIG. 2 to FIG. 5 that the optical imaging lens based on example 1 is suitable for portable electronic products, and has large aperture and good imaging quality.

Example 2

Figure 6:
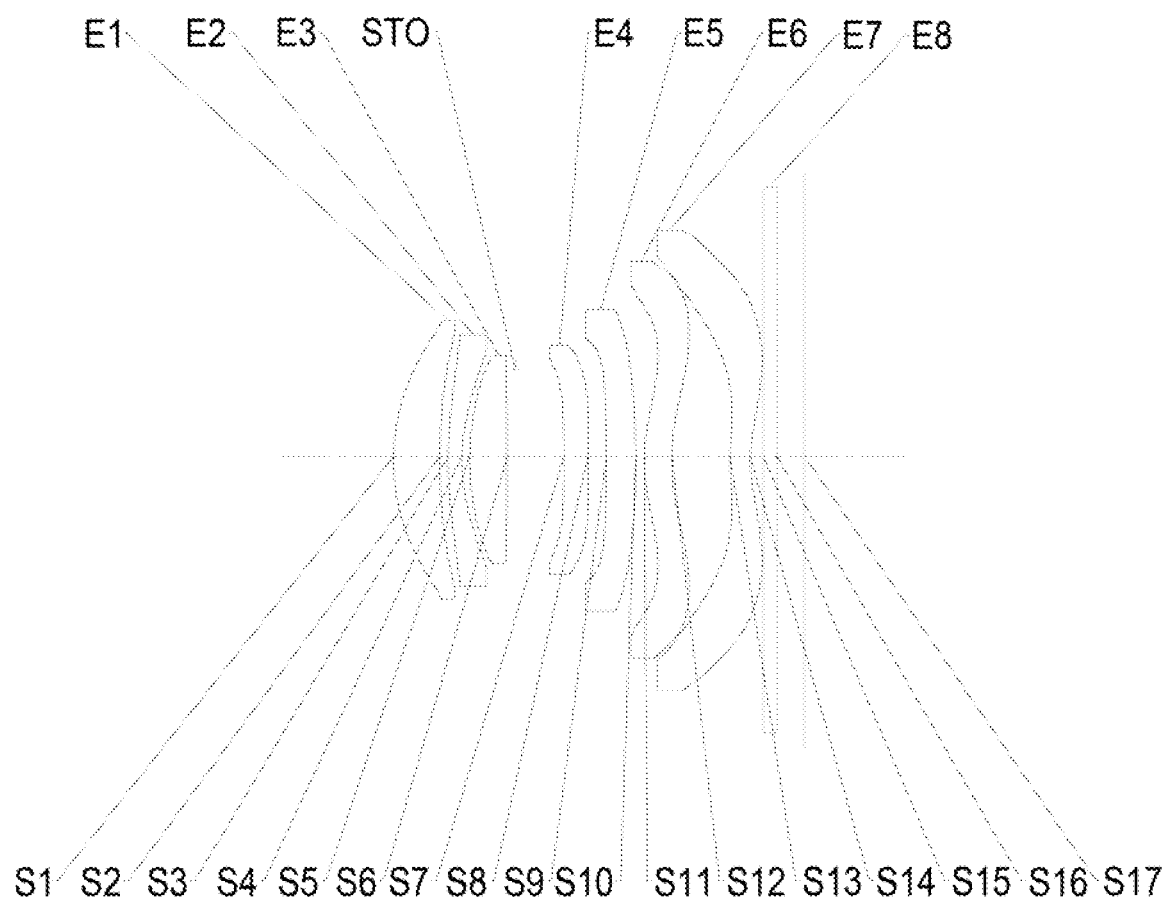
FIG. 6 is a structure diagram of an optical imaging lens according to Example 2 of the disclosure.

As shown in FIG. 6, the optical imaging lens sequentially includes, from an object side to an image side: a first lens E1, a second lens E2, a third lens E3, a diaphragm STO, a fourth lens E4, a fifth lens E5, a sixth lens E6, a seventh lens E7, a filter E8 and an imaging surface S17.

The first lens E1 has positive focal power, an object-side surface S1 of the first lens is a convex surface, and an image-side surface S2 of the first lens is a concave surface. The second lens E2 has negative focal power, an object-side surface S3 of the second lens is a convex surface, and an image-side surface S4 of the second lens is a concave surface. The third lens E3 has positive focal power, an object-side surface S5 of the third lens is a convex surface, and an image-side surface S6 of the third lens is a convex surface. The fourth lens E4 has negative focal power, an object-side surface S7 of the fourth lens is a concave surface, and an image-side surface S8 of the fourth lens is a concave surface. The fifth lens E5 has negative focal power, an object-side surface S9 of the fifth lens is a concave surface, and an image-side surface S10 of the fifth lens is a convex surface. The sixth lens E6 has positive focal power, an object-side surface S11 of the sixth lens is a convex surface, and an image-side surface S12 of the sixth lens is a concave surface. The seventh lens E7 has negative focal power, an object-side surface S13 of the seventh lens is a convex surface, and an image-side surface S14 of the seventh lens is a concave surface. The filter E8 has a filter object-side surface S15 and a filter image-side surface S16. Light from an object sequentially penetrates through each surface and is finally imaged on the imaging surface S17.

Table 5 shows surface type, curvature radius, thickness, material and cone coefficient of each lens of the optical imaging lens in example 2, in which the units of curvature radius and thickness are millimeter.

TABLE 5 detailed optical data of each lens in example 2

| Surface number | Surface type | Curvature radius | Thickness | Material | Cone coefficient |
|---|---|---|---|---|---|
| OBJ | Spherical | Infinite | Infinite | | |
| S1 | Aspherical | 1.9667 | 0.5734 | 1.54/56.2 | 0.0021 |
| S2 | Aspherical | 6.9100 | 0.1000 | | 4.1236 |
| S3 | Aspherical | 3.1469 | 0.1700 | 1.64/23.5 | −0.5925 |
| S4 | Aspherical | 1.6210 | 0.1000 | | −0.8806 |
| S5 | Aspherical | 2.5385 | 0.4675 | 1.54/56.1 | −27.9601 |
| S6 | Aspherical | −51.0358 | 0.1000 | | −78.2998 |
| STO | Spherical | Infinite | 0.6029 | | |
| S7 | Aspherical | −76.6262 | 0.2955 | 1.66/20.4 | −90.0000 |
| S8 | Aspherical | 16.4539 | 0.2317 | | 23.6162 |
| S9 | Aspherical | −8.1646 | 0.3652 | 1.64/23.5 | 2.7580 |
| S10 | Aspherical | −11.7473 | 0.1014 | | −23.9459 |
| S11 | Aspherical | 1.5227 | 0.3426 | 1.54/56.1 | −5.0799 |
| S12 | Aspherical | 2.0780 | 0.7215 | | −3.7789 |

TABLE 5-continued detailed optical data of each lens in example 2

| Surface number | Surface type | Curvature radius | Thickness | Material | Cone coefficient |
|---|---|---|---|---|---|
| S13 | Aspherical | 2.6393 | 0.2514 | 1.54/56.1 | −32.2285 |
| S14 | Aspherical | 1.2585 | 0.1622 | | −7.7219 |
| S15 | Spherical | Infinite | 0.1700 | 1.52/64.2 | |
| S16 | Spherical | Infinite | 0.3449 | | |
| S17 | Spherical | Infinite | | | |

In the example, the aspherical lens can be used for each lens, and each aspherical surface type is limited by the following formula:

$$x = \frac{ch^2}{1 + \sqrt{1 - (k+1)c^2h^2}} + \sum A_i h^i, \quad \text{formula (1)}$$

where x is the distance vector height between a position of the aspherical surface at a height h in the direction of the optical axis and the aspherical surface vertex; c is the paraxial curvature of the aspherical surface, c=1/R (namely, the paraxial curvature c is a reciprocal of the curvature radius R in Table 1); k is the cone coefficient (given in Table 1); and $A_i$ is the i-th-order correction coefficient of the aspherical surface.

Table 6 shows the higher-order coefficients of each aspherical surface of each aspherical lens in the example.

TABLE 6 higher-order coefficients of each aspherical surface in example 2.

| Surface type | A4 | A6 | A8 | A10 | A12 |
|---|---|---|---|---|---|
| S1 | −1.8479E−03 | 3.1740E−03 | −1.1128E−02 | 1.9560E−02 | −2.6892E−02 |
| S2 | 1.2918E−02 | 7.9455E−02 | −2.3951E−01 | 3.6217E−01 | −3.3066E−01 |
| S3 | −1.4263E−01 | 3.4543E−01 | −8.5841E−01 | 1.4566E+00 | −1.6004E+00 |
| S4 | −1.7846E−01 | 3.7581E−01 | −8.1901E−01 | 1.0615E+00 | −3.1170E−01 |
| S5 | 1.8946E−01 | −3.6927E−01 | 9.9076E−01 | −2.5272E+00 | 4.8087E+00 |
| S6 | −2.6697E−02 | 9.0938E−02 | −3.8504E−01 | 8.5106E−01 | −8.2365E−01 |
| S7 | −1.0513E−01 | −1.1555E−01 | 5.2137E−01 | −1.5834E+00 | 3.1584E+00 |
| S8 | −7.1299E−02 | −1.7487E−01 | 5.0892E−01 | −1.1793E+00 | 1.8134E+00 |
| S9 | 1.1511E−01 | −2.5510E−01 | 4.8010E−01 | −7.5681E−01 | 6.8054E−01 |
| S10 | −1.1276E−01 | 1.7738E−01 | −8.9764E−02 | −8.3760E−02 | 1.4621E−01 |
| S11 | −1.0892E−01 | 8.9157E−02 | −1.2382E−01 | 1.1891E−01 | −7.9420E−02 |
| S12 | 1.6034E−02 | −1.2696E−01 | 1.3938E−01 | −9.7790E−02 | 4.5857E−02 |
| S13 | −2.9769E−01 | 2.0734E−01 | −1.1449E−01 | 4.8537E−02 | −1.5433E−02 |
| S14 | −1.6853E−01 | 1.1582E−01 | −6.5932E−02 | 2.9046E−02 | −1.0186E−02 |

| Surface type | A14 | A16 | A18 | A20 |
|---|---|---|---|---|
| S1 | 2.3399E−02 | −1.2367E−02 | 3.6092E−03 | −4.5696E−04 |
| S2 | 1.8675E−01 | −6.3398E−02 | 1.1925E−02 | −9.9792E−04 |
| S3 | 1.1159E+00 | −4.7517E−01 | 1.1254E−01 | −1.1344E−02 |
| S4 | −9.5043E−01 | 1.2704E+00 | −6.3793E−01 | 1.1868E−01 |
| S5 | −5.8611E+00 | 4.2621E+00 | −1.6822E+00 | 2.7836E−01 |
| S6 | −4.7925E−02 | 8.2778E−01 | −6.7223E−01 | 1.7842E−01 |
| S7 | −4.0235E+00 | 3.1546E+00 | −1.3896E+00 | 2.6260E−01 |
| S8 | −1.7611E+00 | 1.0506E+00 | −3.5423E−01 | 5.1642E−02 |
| S9 | −2.8340E−01 | −7.1337E−03 | 4.7586E−02 | −1.2119E−02 |
| S10 | −9.0542E−02 | 2.8555E−02 | −4.5030E−03 | 2.7769E−04 |
| S11 | 3.5422E−02 | −9.8728E−03 | 1.5357E−03 | −1.0068E−04 |
| S12 | −1.4187E−02 | 2.7709E−03 | −3.0970E−04 | 1.5077E−05 |
| S13 | 3.7806E−03 | −6.9603E−04 | 8.2636E−05 | −4.4758E−06 |
| S14 | 2.6172E−03 | −4.3938E−04 | 4.2031E−05 | −1.7190E−06 |

Table 7 shows the effective focal length f of the optical imaging lens, the effective focal lengths f1 to f7 of the lenses, the distance TTL between the object-side surface S1 of the first lens to the imaging surface S17 on the optical axis, the F number Fno of the optical imaging lens, ImgH is a half of diagonal length of the effective pixel region on the imaging surface of the optical imaging lens, and the maximum HFOV in example 2.

TABLE 7 parameters of the optical imaging lens.

| Parameters | examples 2 |
|---|---|
| TTL(mm) | 5.10 |
| ImgH (mm) | 3.08 |
| Semi-FOV(°) | 35.0 |
| Fno | 1.69 |
| f(mm) | 4.10 |
| f1(mm) | 4.85 |
| f2(mm) | −5.46 |
| f3(mm) | 4.46 |
| f4(mm) | −20.48 |
| f5(mm) | −43.58 |
| f6(mm) | 8.60 |
| f7(mm) | −4.72 |

Table 8 shows relationship expressions of the optical imaging lens in example 2. In example 2, f/EPD=1.66, which is in the range of 1.4 to 1.98, so a larger aperture can be realized to increase the amount of lighting, and a low order aberration of the system can be effectively balanced and controlled under the premise of compressing the overall size of lens and ensuring the normal mass production yield;

T23/T34=0.14, which is in the range of 0.1 to 0.3, the aperture may be increased, and the amount of lighting may be increased;

R11/f3=0.34, which is in the range of 0.1 to 0.5, the optical sensitivity of the third lens E3 and the sixth lens E6 is reduced to reduce the aberration in the range and improve the imaging quality;

f2/f7=1.16, which is in the range of 1 to 1.6, so the spherical aberration may be controlled within a reasonable range for better imaging effect;

(R12−R11)/(R12+R11)=0.15, which is in the range of 0 to 0.5, so an excessive incidence angle of the optical imaging lens may be avoided, and the range of the focal power of the optical imaging lens may be restricted to reduce a coma;

ΣCT/TD=0.54, which is in the range of 0.3 to 0.8, so the thickness of each lens is within a reasonable range relative to the length of optical imaging lens, which reduces the size of the optical imaging lens and reduces the difficulty of lens production;

R11/R14=1.21, which is in the range of 0.9 to 1.5, so the optical sensitivity of the sixth lens E6 and the seventh lens E7 may be reduced;

SAG11/ET1=3.51, which is in the range of 3 to 3.6, so the mass production of the first lens E1 may be increased, and the first lens may be easily assembled on a lens barrel;

CT6/(T67+CT7)=0.35, which is in the range of 0.1 to 0.6, so it is ensured that the sixth lens E6 and the seventh lens E7 will be neither too thin to affect production nor will the total length of the optical imaging lens exceed a manufacturing limit;

(f/f1)+(f/f3)=1.76, which is in the range of 1.3 to 2, so it is beneficial to reducing the spherical aberration and field curvature of the first lens E1 and the third lens E3;

EPD/ΣAT=1.26, which is in the range of 0.9 to 1.6; by reasonably restricting the total length of the air space, the structure of the lens is more compact, and the effective focal length of the optical imaging lens and the total length of the optical imaging lens are still within a reasonable range while achieving a large aperture.

|SAG71*T67|/ImgH$^2$=0.07, which is in the range of 0.04 to 0.09; by defining the vector height of the object-side surface S14 of the seventh lens and the ratio of the air space between the sixth lens E6 and the seventh lens E7 to an image height, the seventh lens E7 is more easily machined and the overall length of the optical imaging lens may be correspondingly reduced.

TABLE 8 relationship expressions of the optical imaging lens in example 2

| Conditional expressions | examples 2 |
|---|---|
| f/EPD | 1.66 |
| T23/T34 | 0.14 |
| R11/f3 | 0.34 |
| f2/f7 | 1.16 |
| (R12 − R11)/(R12 + R11) | 0.15 |
| ΣCT/TD | 0.54 |
| R11/R14 | 1.21 |
| SAG11/ET1 | 3.51 |
| CT6/(T67 + CT7) | 0.35 |
| (f/f1) + (f/f3) | 1.76 |
| EPD/ΣAT | 1.26 |
| |SAG71*T67|/ImgH^2 | 0.07 |

In the example, the length of the optical imaging lens on the optical axis from the object-side surface S1 of the first lens to the imaging surface S17 is 5.1 mm, the effective focal length of the optical imaging lens is 4.1 mm, the image height is 3.08 mm, the maximum HFOV is 35 degrees, and an aperture value is 1.69. The example ensures a larger aperture while ensuring the miniaturization of the optical imaging lens, which can obtain more amount of lighting, reduce the optical aberration in case of insufficient light, improve the image acquisition quality, and obtain the stable imaging effect. It is to be noted that the larger the aperture value, the smaller the aperture, and the smaller the aperture value, the larger the aperture.

Figure 7:
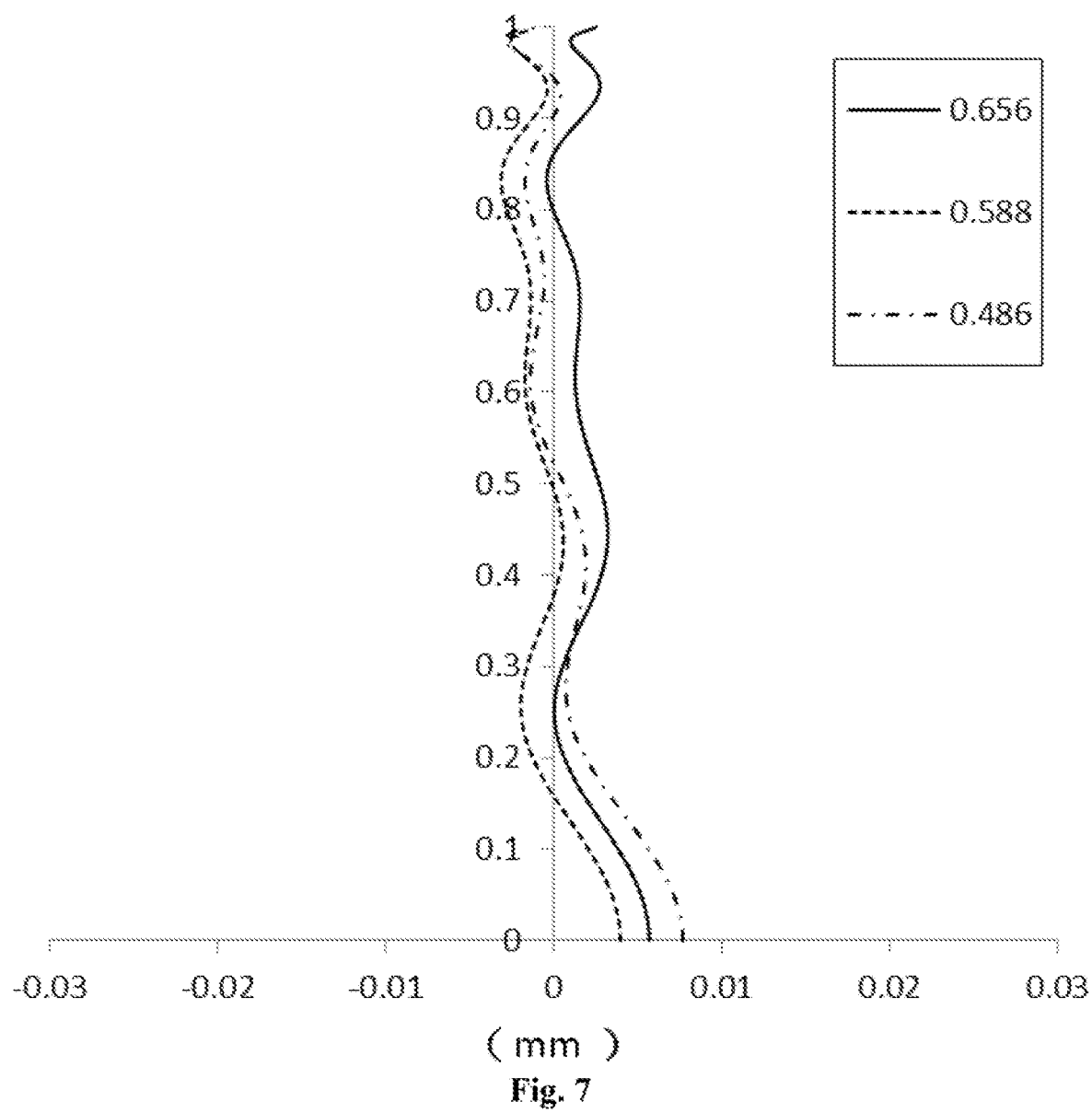
FIG. 7 shows a longitudinal aberration curve of the optical imaging lens in FIG. 6.
Figure 8:
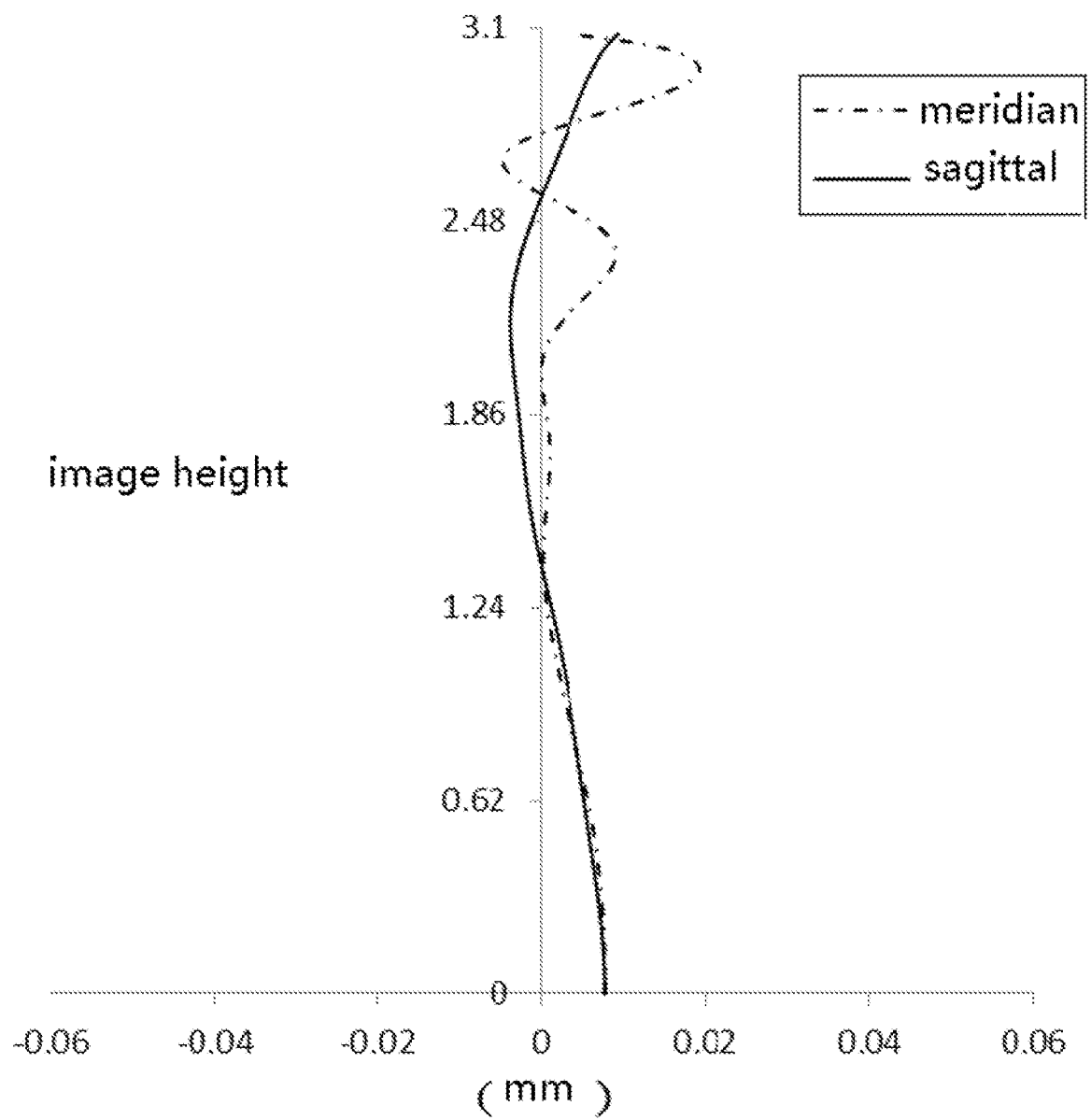
FIG. 8 shows an astigmatism curve of the optical imaging lens in FIG. 6.
Figure 9:
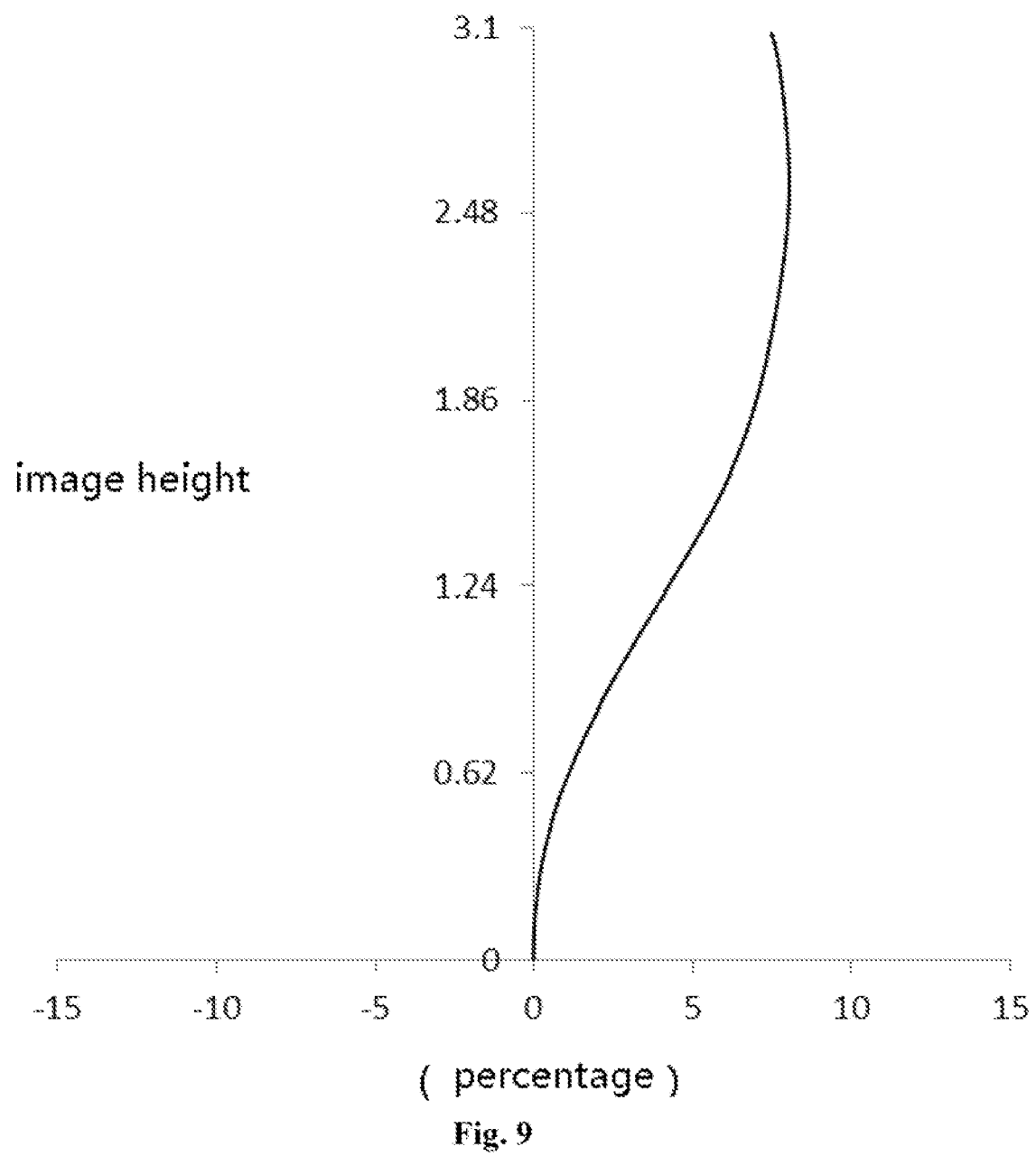
FIG. 9 shows a distortion curve of the optical imaging lens in FIG. 6.
Figure 10:
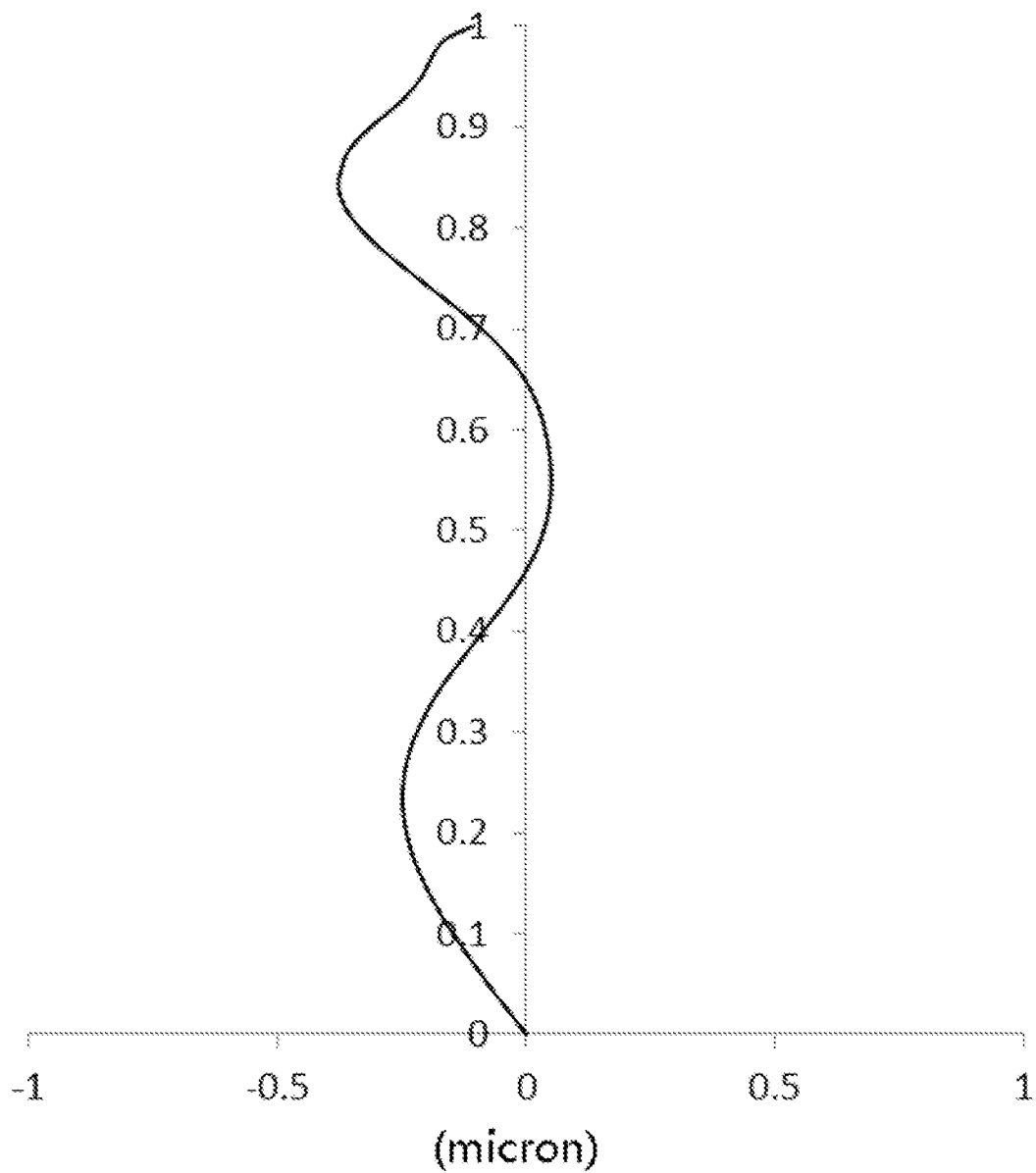
FIG. 10 shows a lateral color curve of the optical imaging lens in FIG. 6.

FIG. 7 shows the longitudinal aberration curve of the optical imaging lens in example 2, which represents that the converging focus of light with different wavelengths deviates after passing through the optical system, then the focal planes of the light with different wavelengths cannot coincide in the final imaging, and the polychromatic light scatters to form the chromatic dispersion. FIG. 8 shows an astigmatism curve of the optical imaging lens according to embodiment 2, which represents the meridian image surface curvature and the sagittal image surface curvature. FIG. 9 shows a distortion curve of the optical imaging lens in example 2, which represents the distortion values at different angles of view. FIG. 10 shows a lateral color curve of the optical imaging lens in example 2, which represents the aberration of different image heights on the imaging surface after the light passes through the optical imaging lens. It can be seen from FIG. 7 to FIG. 10 that the optical imaging lens based on example 2 is suitable for portable electronic products, and has large aperture and good imaging quality.

Example 3

Figure 11:
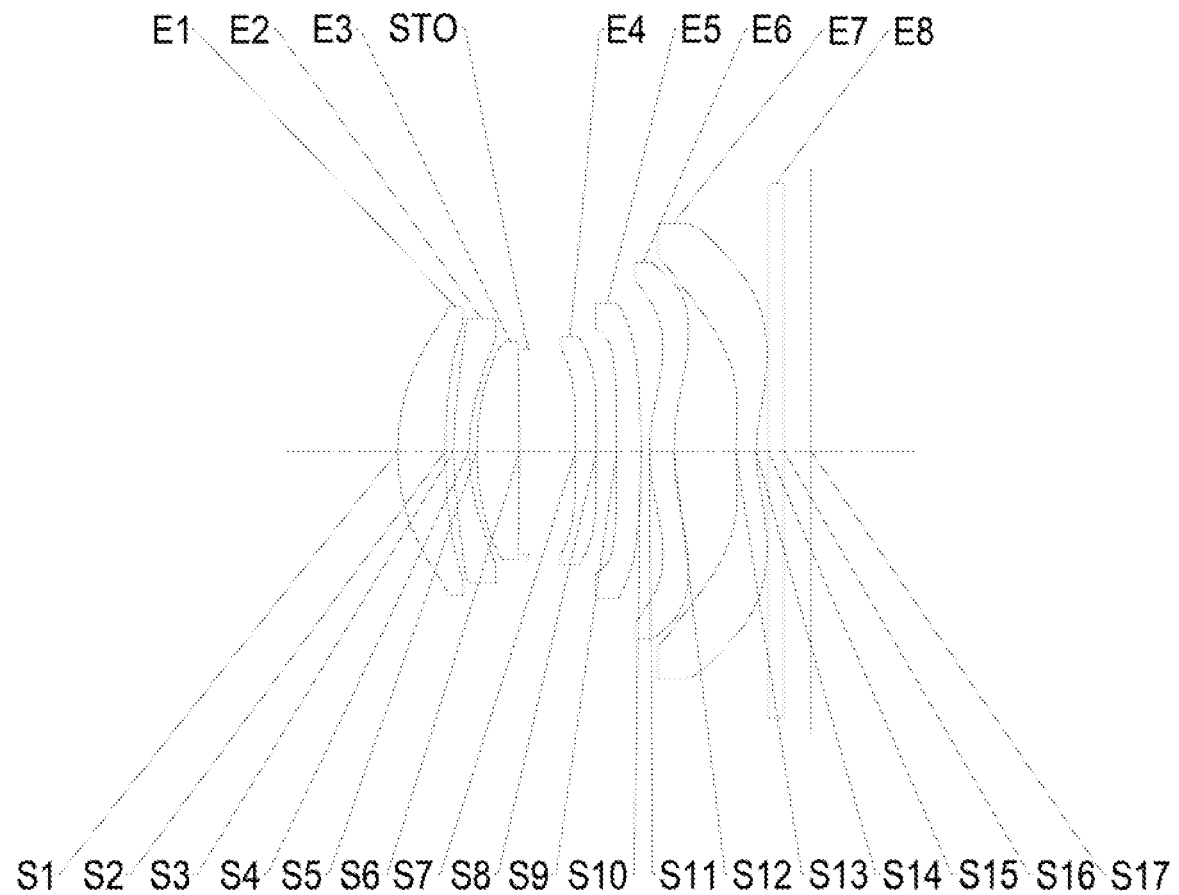
FIG. 11 is a structure diagram of an optical imaging lens according to Example 3 of the disclosure.

As shown in FIG. 11, the optical imaging lens sequentially includes, from an object side to an image side: a first lens E1, a second lens E2, a third lens E3, a diaphragm STO, a fourth lens E4, a fifth lens E5, a sixth lens E6, a seventh lens E7, a filter E8 and an imaging surface S17.

The first lens E1 has positive focal power, an object-side surface S1 of the first lens is a convex surface, and an image-side surface S2 of the first lens is a concave surface. The second lens E2 has negative focal power, an object-side surface S3 of the second lens is a convex surface, and an image-side surface S4 of the second lens is a concave surface. The third lens E3 has positive focal power, an object-side surface S5 of the third lens is a convex surface, and an image-side surface S6 of the third lens is a convex surface. The fourth lens E4 has negative focal power, an object-side surface S7 of the fourth lens is a concave surface, and an image-side surface S8 of the fourth lens is a concave surface. The fifth lens E5 has negative focal power, an object-side surface S9 of the fifth lens is a concave surface, and an image-side surface S10 of the fifth lens is a convex surface. The sixth lens E6 has positive focal power, an object-side surface S11 of the sixth lens is a convex surface, and an image-side surface S12 of the sixth lens is a concave surface. The seventh lens E7 has negative focal power, an object-side surface S13 of the seventh lens is a convex surface, and an image-side surface S14 of the seventh lens is a concave surface. The filter E8 has a filter object-side surface S15 and a filter image-side surface S16. Light from an object sequentially penetrates through each surface and is finally imaged on the imaging surface S17.

Table 9 shows surface type, curvature radius, thickness, material and cone coefficient of each lens of the optical imaging lens in example 3, in which the units of curvature radius and thickness are millimeter.

TABLE 9 detailed optical data of each lens in example 3.

| Surface number | Surface type | Curvature radius | Thickness | Material | Cone coefficient |
|---|---|---|---|---|---|
| OBJ | Spherical | Infinite | Infinite | | |
| S1 | Aspherical | 2.0025 | 0.5889 | 1.54/56.2 | 0.0516 |
| S2 | Aspherical | 6.4525 | 0.1000 | | 6.8702 |
| S3 | Aspherical | 3.2591 | 0.1900 | 1.64/23.5 | −0.3460 |
| S4 | Aspherical | 1.6526 | 0.1000 | | −0.8543 |
| S5 | Aspherical | 2.4926 | 0.5283 | 1.54/56.1 | −25.8024 |
| S6 | Aspherical | −34.0977 | 0.1000 | | −16.3104 |
| STO | Spherical | Infinite | 0.5926 | | |
| S7 | Aspherical | −47.3087 | 0.2529 | 1.66/20.4 | 24.4886 |
| S8 | Aspherical | 25.6027 | 0.2513 | | 49.8762 |
| S9 | Aspherical | −10.7204 | 0.3003 | 1.64/23.5 | 9.2821 |
| S10 | Aspherical | −17.4530 | 0.1036 | | 50.0000 |
| S11 | Aspherical | 1.5574 | 0.2996 | 1.54/56.1 | −5.4147 |
| S12 | Aspherical | 2.1972 | 0.7663 | | −3.9163 |
| S13 | Aspherical | 3.1450 | 0.2500 | 1.54/56.1 | −51.6404 |
| S14 | Aspherical | 1.2936 | 0.1540 | | −8.6196 |
| S15 | Spherical | Infinite | 0.1900 | 1.52/64.2 | |
| S16 | Spherical | Infinite | 0.3323 | | |
| S17 | Spherical | Infinite | | | |

In the example, the aspherical lens can be used for each lens, and each aspherical surface type is limited by the following formula:

$$x = \frac{ch^2}{1+\sqrt{1-(k+1)c^2h^2}} + \sum A_i h^i; \quad \text{formula (1)}$$

where x is the distance vector height between a position of the aspherical surface at a height h in the direction of the optical axis and the aspherical surface vertex; c is the paraxial curvature of the aspherical surface, c=1/R (namely, the paraxial curvature c is a reciprocal of the curvature radius R in Table 1); k is the cone coefficient (given in Table 1); and Ai is the i-th-order correction coefficient of the aspherical surface.

Table 10 shows the higher-order coefficients of each aspherical surface of each aspherical lens in the example.

TABLE 10 higher-order coefficients of each aspherical surface in example 3.

| Surface type | A4 | A6 | A8 | A10 | A12 |
|---|---|---|---|---|---|
| S1 | −2.0209E−03 | −3.5752E−03 | 2.3824E−02 | −5.9237E−02 | 7.4204E−02 |
| S2 | 9.6899E−03 | 1.0064E−01 | −2.7952E−01 | 3.9940E−01 | −3.4267E−01 |
| S3 | −1.3441E−01 | 3.2438E−01 | −7.8321E−01 | 1.2600E+00 | −1.2945E+00 |
| S4 | −1.7779E−01 | 3.7704E−01 | −8.9569E−01 | 1.3950E+00 | −1.0699E+00 |
| S5 | 1.8295E−01 | −3.4397E−01 | 9.0026E−01 | −2.2260E+00 | 4.1091E+00 |
| S6 | −2.2333E−02 | 9.1318E−02 | −3.5904E−01 | 7.3301E−01 | −6.3421E−01 |
| S7 | −8.7956E−02 | −1.7348E−01 | 7.2373E−01 | −2.0809E+00 | 3.9833E+00 |
| S8 | −6.1119E−02 | −1.9856E−01 | 5.9168E−01 | −1.3767E+00 | 2.1719E+00 |
| S9 | 1.0779E−01 | −2.4843E−01 | 5.0120E−01 | −8.5006E−01 | 8.4830E−01 |
| S10 | −1.1551E−01 | 1.9869E−01 | −1.4119E−01 | −3.4628E−02 | 1.1638E−01 |
| S11 | −1.1008E−01 | 8.5867E−02 | −2.1189E−01 | 1.0389E−01 | −6.8369E−02 |
| S12 | 1.1306E−02 | −1.4442E−01 | 1.8120E−01 | −1.4473E−01 | 7.6607E−02 |
| S13 | −3.1848E−01 | 2.0618E−01 | −9.5804E−02 | 2.9470E−02 | −5.5190E−03 |
| S14 | −1.6727E−01 | 1.1123E−01 | −6.1034E−02 | 2.6206E−02 | −8.9867E−03 |

| Surface type | A14 | A16 | A18 | A20 |
|---|---|---|---|---|
| S1 | −5.4782E−02 | 2.3759E−02 | −5.5696E−03 | 5.3229E−04 |
| S2 | 1.7794E−01 | −5.2775E−02 | 7.6814E−03 | −3.6338E−04 |
| S3 | 8.3789E−01 | −3.2983E−01 | 7.2060E−02 | −6.6946E−03 |
| S4 | 9.7591E−02 | 4.1543E−01 | −2.6421E−01 | 5.1517E−02 |
| S5 | −4.8388E+00 | 3.3836E+00 | −1.2801E+00 | 2.0232E−01 |
| S6 | −1.3020E−01 | 7.1084E−01 | −5.2552E−01 | 1.3037E−01 |
| S7 | −4.8971E+00 | 3.7105E+00 | −1.5804E+00 | 2.8921E−01 |
| S8 | −2.1784E+00 | 1.3387E+00 | −4.6233E−01 | 6.8756E−02 |

TABLE 10-continued higher-order coefficients of each aspherical surface in example 3.

| | | | | |
|---|---|---|---|---|
| S9 | −4.4944E−01 | 8.7999E−02 | 1.7635E−02 | −8.0026E−03 |
| S10 | −7.5674E−02 | 2.2432E−02 | −2.9162E−03 | 1.0378E−04 |
| S11 | 3.0229E−02 | −8.3546E−03 | 1.2862E−03 | −8.3168E−05 |
| S12 | −2.6587E−02 | 5.7907E−03 | −7.1740E−04 | 3.8515E−05 |
| S13 | 7.0413E−04 | −1.2104E−04 | 2.4738E−05 | −2.2108E−06 |
| S14 | 2.2471E−03 | −3.6817E−04 | 3.4839E−05 | −1.4346E−06 |

Table 11 shows the effective focal length f of the optical imaging lens, the effective focal lengths f1 to f7 of the lenses, the distance TTL between the object-side surface S1 of the first lens to the imaging surface S17 on the optical axis, the F number Fno of the optical imaging lens, ImgH is a half of diagonal length of the effective pixel region on the imaging surface of the optical imaging lens, and the maximum HFOV in example 3.

TABLE 11 parameters of the optical imaging lens.

| Parameters | examples 3 |
|---|---|
| TTL(mm) | 5.10 |
| ImgH (mm) | 3.02 |
| Semi-FOV(°) | 35.0 |
| Fno | 1.65 |
| f(mm) | 4.10 |
| f1(mm) | 5.09 |
| f2(mm) | −5.49 |
| f3(mm) | 4.29 |
| f4(mm) | −25.11 |
| f5(mm) | −44.21 |
| f6(mm) | 8.44 |
| f7(mm) | −4.24 |

Table 12 shows relationship expressions of the optical imaging lens in example 3. In example 3, f/EPD=1.65, which is in the range of 1.4 to 1.98, so a larger aperture can be realized to increase the amount of lighting, and a low order aberration of the system can be effectively balanced and controlled under the premise of compressing the overall size of lens and ensuring the normal mass production yield;

T23/T34=0.14, which is in the range of 0.1 to 0.3, the aperture may be increased, and the amount of lighting may be increased;

R11/f3=0.36, which is in the range of 0.1 to 0.5, the optical sensitivity of the third lens E3 and the sixth lens E6 is reduced to reduce the aberration in the range and improve the imaging quality;

f2/f7=1.30, which is in the range of 1 to 1.6, so the spherical aberration may be controlled within a reasonable range for better imaging effect;

(R12−R11)/(R12+R11)=0.17, which is in the range of 0 to 0.5, so an excessive incidence angle of the optical imaging lens may be avoided, and the range of the focal power of the optical imaging lens may be restricted to reduce a coma;

ΣCT/TD=0.53, which is in the range of 0.3 to 0.8, so the thickness of each lens is within a reasonable range relative to the length of optical imaging lens, which reduces the size of the optical imaging lens and reduces the difficulty of lens production;

R11/R14=1.20, which is in the range of 0.9 to 1.5, so the optical sensitivity of the sixth lens E6 and the seventh lens E7 may be reduced;

SAG11/ET1=3.29, which is in the range of 3 to 3.6, so the mass production of the first lens E1 may be increased, and the first lens may be easily assembled on a lens barrel;

CT6/(T67+CT7)=0.29, which is in the range of 0.1 to 0.6, so it is ensured that the sixth lens E6 and the seventh lens E7 will be neither too thin to affect production nor will the total length of the optical imaging lens exceed a manufacturing limit;

(f/f1)+(f/f3)=1.76, which is in the range of 1.3 to 2, so it is beneficial to reducing the spherical aberration and field curvature of the first lens E1 and the third lens E3;

EPD/ΣAT=1.23, which is in the range of 0.9 to 1.6; by reasonably restricting the total length of the air space, the structure of the lens is more compact, and the effective focal length of the optical imaging lens and the total length of the optical imaging lens are still within a reasonable range while achieving a large aperture.

|SAG71*T67|/ImgH$^2$=0.08, which is in the range of 0.04 to 0.09; by defining the vector height of the object-side surface S14 of the seventh lens and the ratio of the air space between the sixth lens E6 and the seventh lens E7 to an image height, the seventh lens E7 is more easily machined and the overall length of the optical imaging lens may be correspondingly reduced.

TABLE 12 relationship expressions of the optical imaging lens in example 3

| Conditional expressions | examples 3 |
|---|---|
| f/EPD | 1.65 |
| T23/T34 | 0.14 |
| R11/f3 | 0.36 |
| f2/f7 | 1.30 |
| (R12 − R11)/(R12 + R11) | 0.17 |
| ΣCT/TD | 0.53 |
| R11/R14 | 1.20 |
| SAG11/ET1 | 3.29 |
| CT6/(T67 + CT7) | 0.29 |
| (f/f1) + (f/f3) | 1.76 |
| EPD/ΣAT | 1.23 |
| |SAG71*T67|/ImgH^2 | 0.08 |

In the example, the length of the optical imaging lens on the optical axis from the object-side surface S1 of the first lens to the imaging surface S17 is 5.1 mm, the effective focal length of the optical imaging lens is 4.1 mm, the image height is 3.02 mm, the maximum HFOV is 35 degrees, and an aperture value is 1.65. The example ensures a larger aperture while ensuring the miniaturization of the optical imaging lens, which can obtain more amount of lighting, reduce the optical aberration in case of insufficient light, improve the image acquisition quality, and obtain the stable imaging effect. It is to be noted that the larger the aperture value, the smaller the aperture, and the smaller the aperture value, the larger the aperture.

Figure 12:
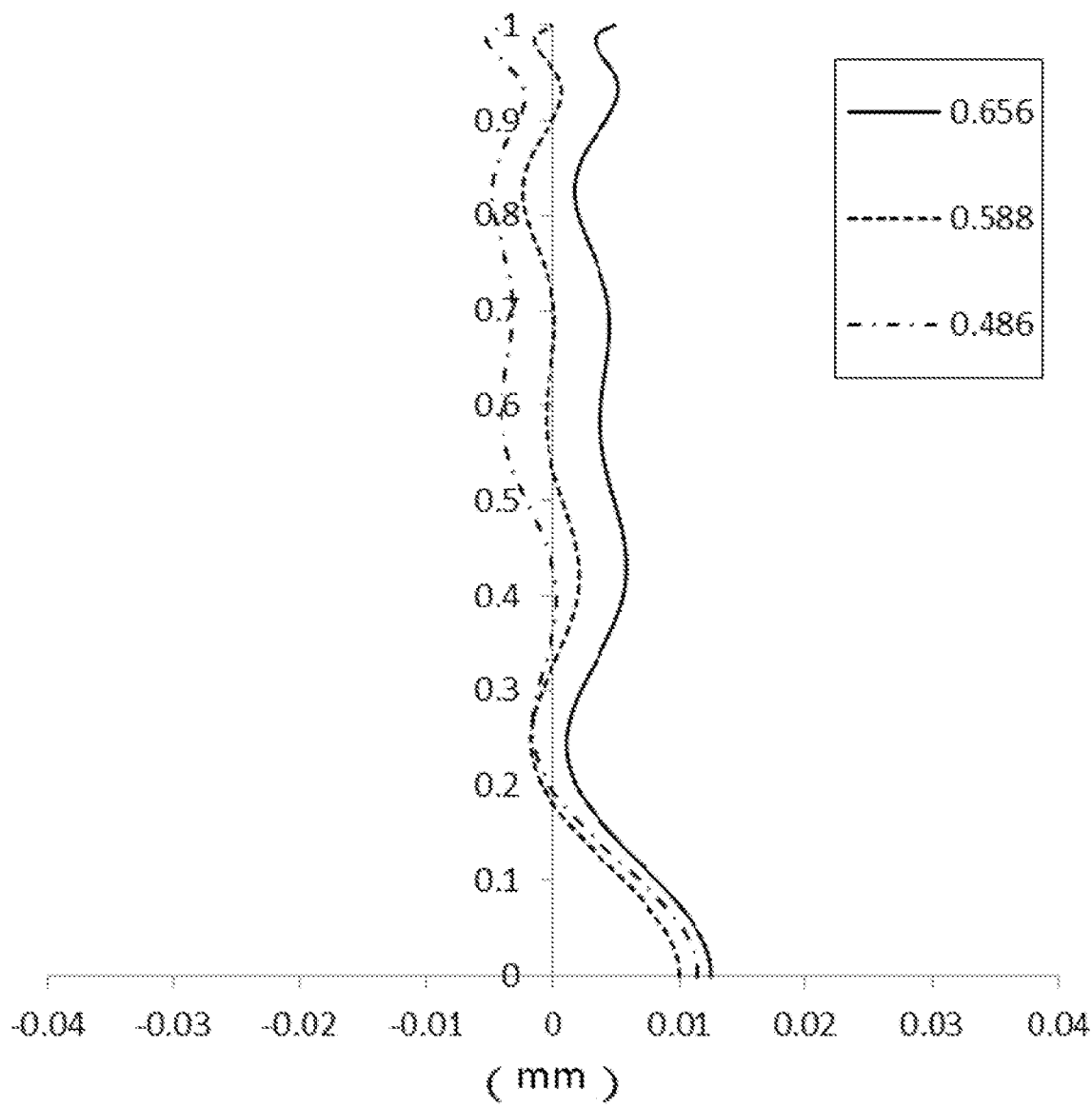
FIG. 12 shows a longitudinal aberration curve of the optical imaging lens in FIG. 11.
Figure 13:
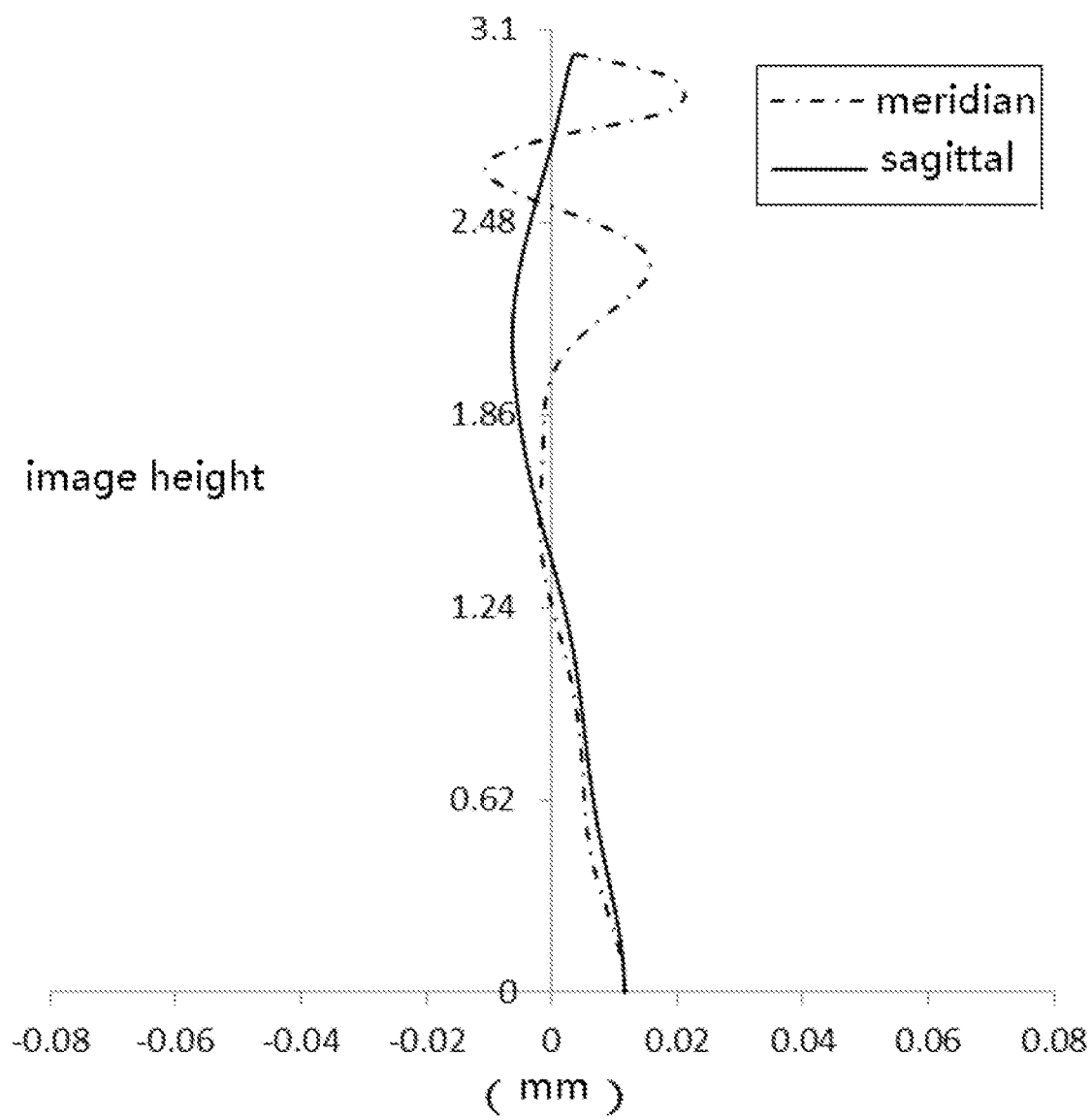
FIG. 13 shows an astigmatism curve of the optical imaging lens in FIG. 11.
Figure 14:
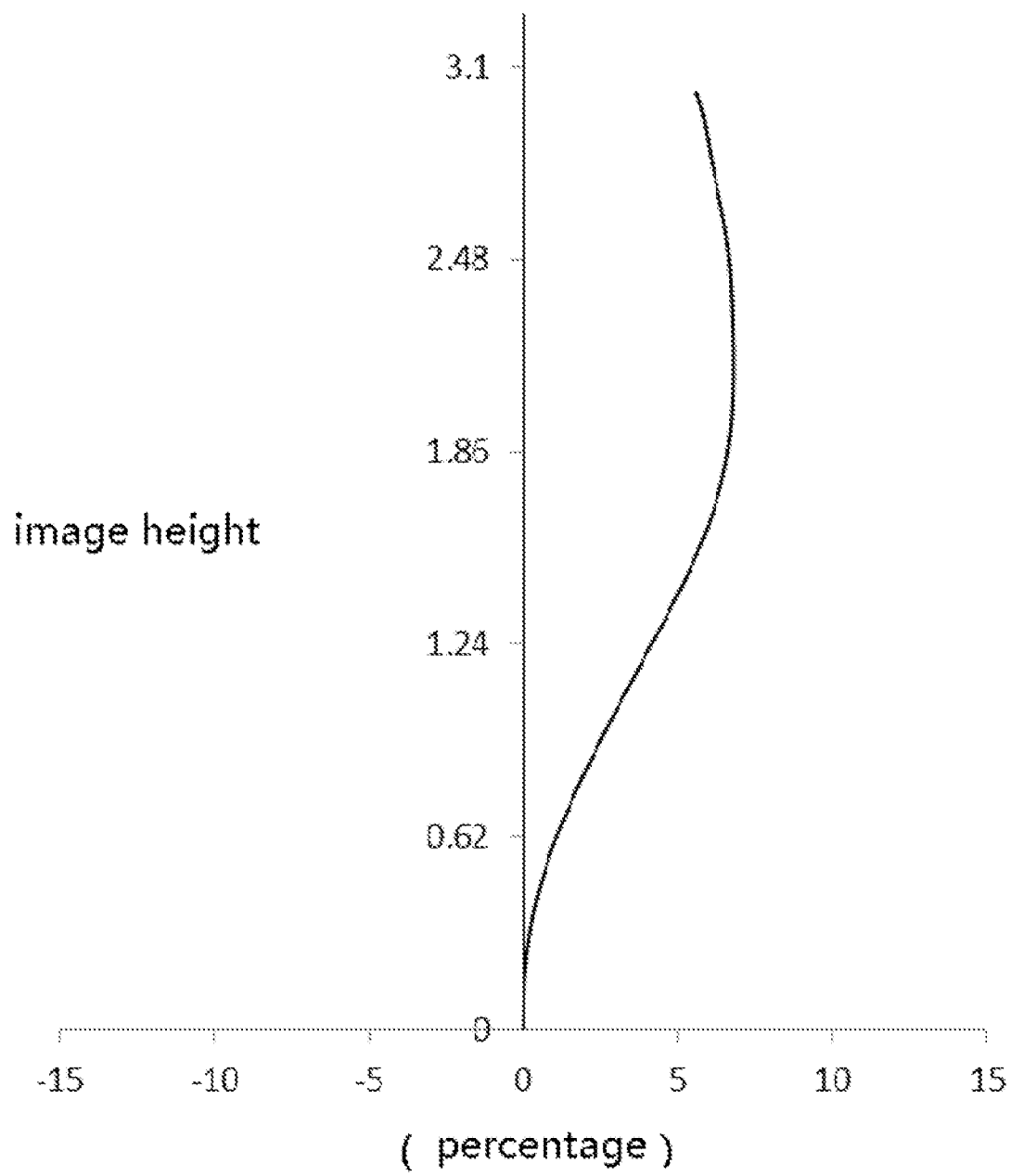
FIG. 14 shows a distortion curve of the optical imaging lens in FIG. 11.
Figure 15:
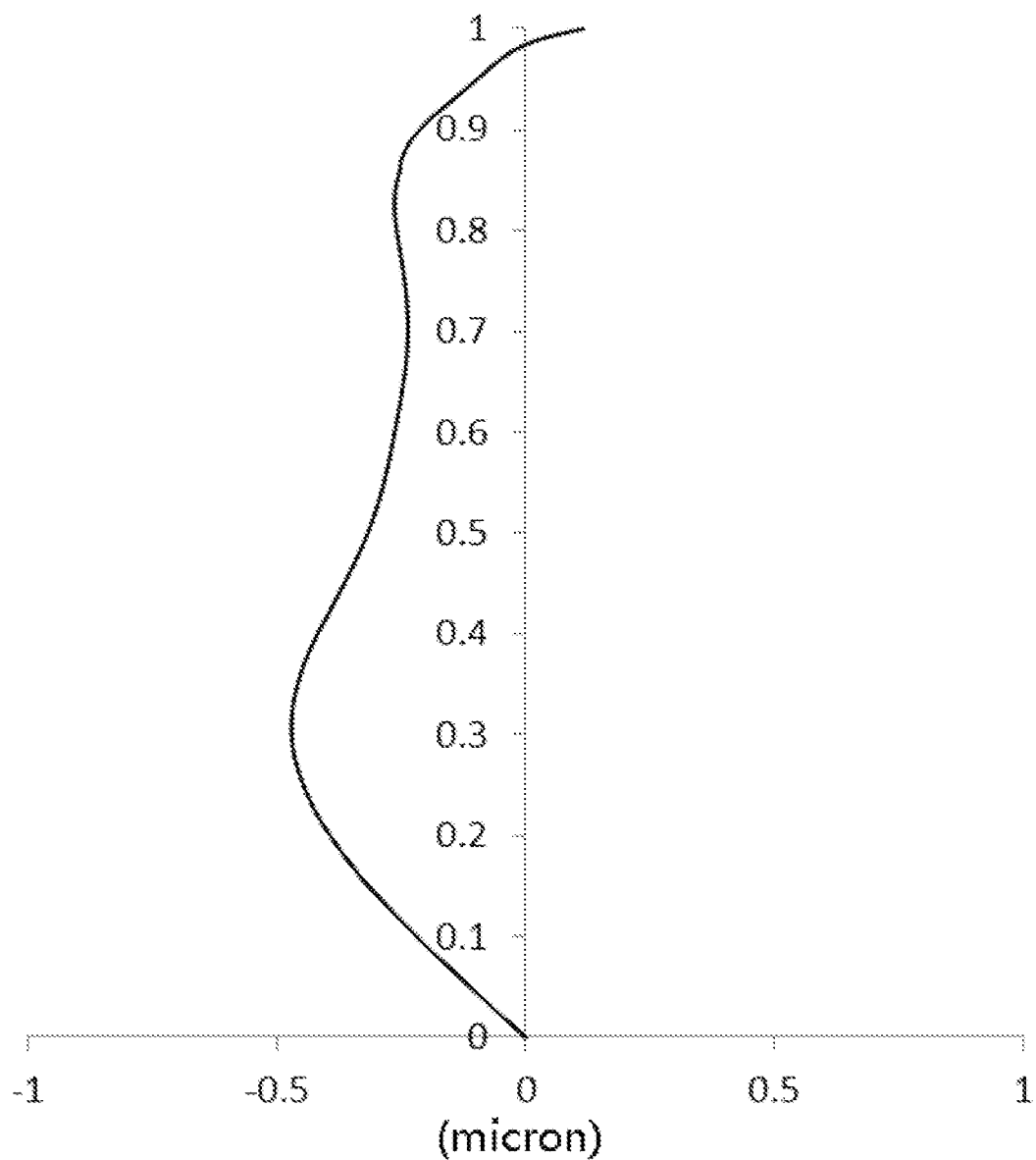
FIG. 15 shows a lateral color curve of the optical imaging lens in FIG. 11.

FIG. 12 shows the longitudinal aberration curve of the optical imaging lens in example 3, which represents that the converging focus of light with different wavelengths deviates after passing through the optical system, then the focal planes of the light with different wavelengths cannot coincide in the final imaging, and the polychromatic light scatters to form the chromatic dispersion. FIG. 13 shows an astigmatism curve of the optical imaging lens according to embodiment 3, which represents the meridian image surface curvature and the sagittal image surface curvature. FIG. 14 shows a distortion curve of the optical imaging lens in example 3, which represents the distortion values at different angles of view. FIG. 15 shows a lateral color curve of the optical imaging lens in example 3, which represents the aberration of different image heights on the imaging surface after the light passes through the optical imaging lens. It can be seen from FIG. 12 to FIG. 15 that the optical imaging lens based on example 3 is suitable for portable electronic products, and has large aperture and good imaging quality.

Example 4

Figure 16:
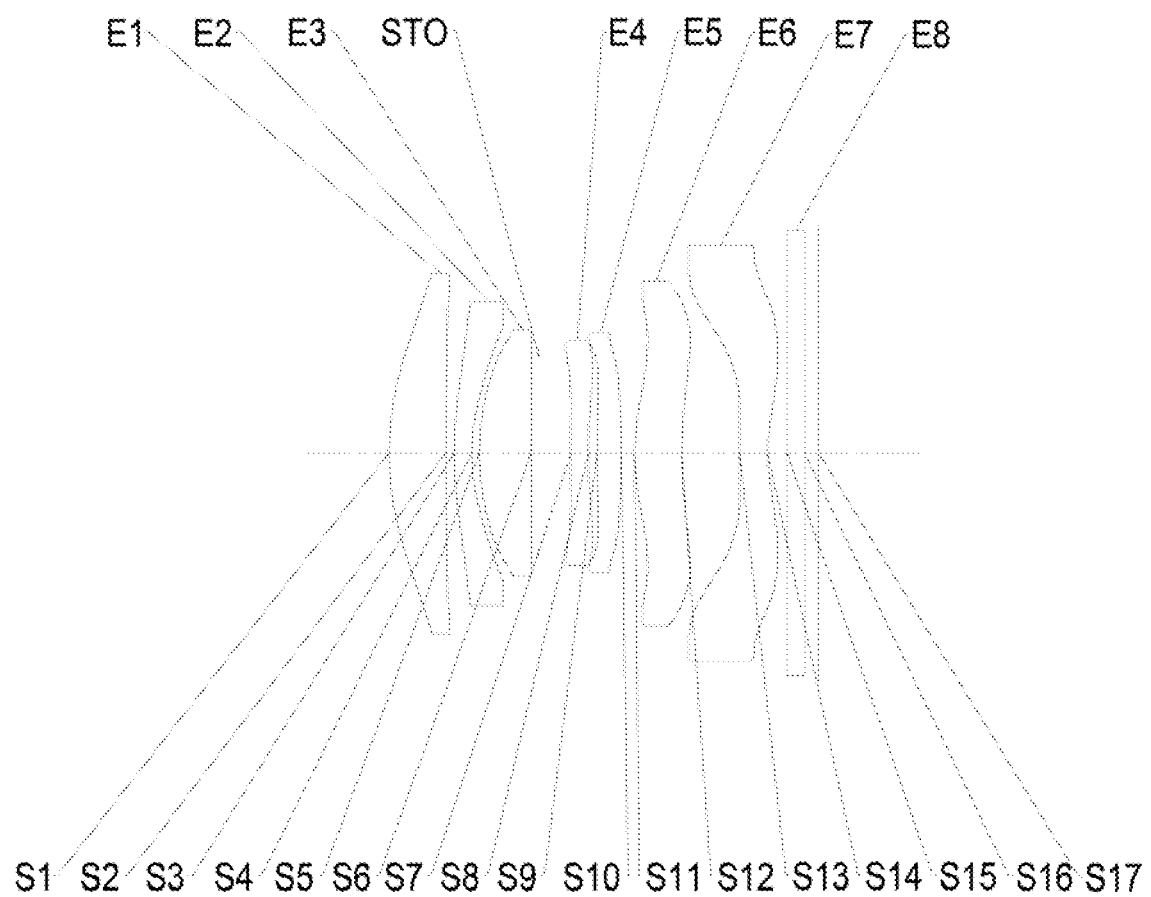
FIG. 16 is a structure diagram of an optical imaging lens according to Example 4 of the disclosure.

As shown in FIG. 16, the optical imaging lens sequentially includes, from an object side to an image side: a first lens E1, a second lens E2, a third lens E3, a diaphragm STO, a fourth lens E4, a fifth lens E5, a sixth lens E6, a seventh lens E7, a filter E8 and an imaging surface S17.

The first lens E1 has positive focal power, an object-side surface S1 of the first lens is a convex surface, and an image-side surface S2 of the first lens is a convex surface. The second lens E2 has negative focal power, an object-side surface S3 of the second lens is a convex surface, and an image-side surface S4 of the second lens is a concave surface. The third lens E3 has positive focal power, an object-side surface S5 of the third lens is a convex surface, and an image-side surface S6 of the third lens is a concave surface. The fourth lens E4 has negative focal power, an object-side surface S7 of the fourth lens is a convex surface, and an image-side surface S8 of the fourth lens is a concave surface. The fifth lens E5 has positive focal power, an object-side surface S9 of the fifth lens is a concave surface, and an image-side surface S10 of the fifth lens is a convex surface. The sixth lens E6 has positive focal power, an object-side surface S11 of the sixth lens is a convex surface, and an image-side surface S12 of the sixth lens is a concave surface. The seventh lens E7 has negative focal power, an object-side surface S13 of the seventh lens is a convex surface, and an image-side surface S14 of the seventh lens is a concave surface. The filter E8 has a filter object-side surface S15 and a filter image-side surface S16. Light from an object sequentially penetrates through each surface and is finally imaged on the imaging surface S17.

Table 13 shows surface type, curvature radius, thickness, material and cone coefficient of each lens of the optical imaging lens in example 4, in which the units of curvature radius and thickness are millimeter.

TABLE 13

| detailed optical data of each lens in example 4 | | | | | |
|---|---|---|---|---|---|
| Surface number | Surface type | Curvature radius | Thickness | Material | Cone coefficient |
| OBJ | Spherical | Infinite | Infinite | | |
| S1 | Aspherical | 2.7454 | 0.7163 | 1.54/56.2 | −0.4163 |
| S2 | Aspherical | −48.2877 | 0.1000 | | 48.1735 |
| S3 | Aspherical | 3.1604 | 0.2200 | 1.64/23.5 | −1.2566 |
| S4 | Aspherical | 1.6929 | 0.1000 | | −0.8419 |
| S5 | Aspherical | 2.6794 | 0.6456 | 1.54/56.1 | −13.2804 |
| S6 | Aspherical | 17.9562 | 0.1000 | | −26.9713 |
| STO | Spherical | Infinite | 0.4005 | | |
| S7 | Aspherical | 6.4932 | 0.2200 | 1.66/20.4 | −2.0100 |
| S8 | Aspherical | 3.5602 | 0.1112 | | 6.2355 |
| S9 | Aspherical | −113.9889 | 0.3022 | 1.64/23.5 | 50.0000 |
| S10 | Aspherical | −21.4463 | 0.1736 | | −36.9383 |
| S11 | Aspherical | 2.0511 | 0.5915 | 1.54/56.1 | −4.8178 |
| S12 | Aspherical | 4.4930 | 0.7300 | | 2.8566 |
| S13 | Aspherical | 5.2860 | 0.3488 | 1.54/56.1 | 4.4489 |
| S14 | Aspherical | 1.4611 | 0.2461 | | −8.6463 |
| S15 | Spherical | Infinite | 0.2200 | 1.52/64.2 | |
| S16 | Spherical | Infinite | 0.1742 | | |
| S17 | Spherical | Infinite | | | |

In the example, the aspherical lens can be used for each lens, and each aspherical surface type is limited by the following formula:

$$x = \frac{ch^2}{1+\sqrt{1-(k+1)c^2h^2}} + \sum A_i h^i, \qquad \text{formula (1)}$$

where x is the distance vector height between a position of the aspherical surface at a height h in the direction of the optical axis and the aspherical surface vertex; c is the paraxial curvature of the aspherical surface, c=1/R (namely, the paraxial curvature c is a reciprocal of the curvature radius R in Table 1); k is the cone coefficient (given in Table 1); and Ai is the i-th-order correction coefficient of the aspherical surface.

Table 14 shows the higher-order coefficients of each aspherical surface of each aspherical lens in the example.

TABLE 14

| higher-order coefficients of each aspherical surface in example 4. | | | | | |
|---|---|---|---|---|---|
| Surface type | A4 | A6 | A8 | A10 | A12 |
| S1 | −5.8071E−03 | 1.7191E−03 | −5.9740E−03 | 4.9410E−03 | −2.3506E−03 |
| S2 | 3.3065E−02 | −3.4215E−02 | 3.2700E−02 | −2.2061E−02 | 8.9485E−03 |
| S3 | −5.4229E−02 | −2.3659E−02 | 8.0182E−02 | −7.6031E−02 | 3.5820E−02 |
| S4 | −6.6282E−02 | −6.0526E−02 | 1.3623E−01 | −1.0619E−01 | 3.9686E−02 |
| S5 | 1.4211E−01 | −1.9935E−01 | 3.7357E−01 | −5.9527E−01 | 7.2036E−01 |
| S6 | −2.8622E−02 | 7.6196E−02 | −2.9812E−01 | 7.0701E−01 | −1.0232E+00 |
| S7 | −1.2242E−01 | −3.1434E−01 | 1.2609E+00 | −2.7175E+00 | 3.9966E+00 |
| S8 | −4.2664E−02 | −4.2109E−01 | 1.0829E+00 | −1.8565E+00 | 2.3321E+00 |
| S9 | 1.5280E−01 | −3.6636E−01 | 6.8995E−01 | −1.1693E+00 | 1.2641E+00 |
| S10 | −7.3402E−02 | 1.1509E−01 | −3.1579E−01 | 7.4649E−01 | −1.2742E+00 |

TABLE 14-continued higher-order coefficients of each aspherical surface in example 4.

| | | | | | |
|---|---|---|---|---|---|
| S11 | −8.0303E−02 | 9.7744E−02 | −1.5814E−01 | 1.6066E−01 | −1.1165E−01 |
| S12 | −3.1450E−03 | −2.5407E−02 | 1.9977E−02 | −3.6696E−02 | 3.7041E−02 |
| S13 | −4.2786E−01 | 4.9261E−01 | −5.9778E−01 | 5.5574E−01 | −3.4567E−01 |
| S14 | −1.9050E−01 | 2.1555E−01 | −1.9837E−01 | 1.2203E−01 | −4.8948E−02 |

| Surface type | A14 | A16 | A18 | A20 |
|---|---|---|---|---|
| S1 | 5.4927E−04 | −4.8040E−05 | 0.0000E+00 | 0.0000E+00 |
| S2 | −2.1975E−03 | 3.4616E−04 | −3.5330E−05 | 1.8813E−06 |
| S3 | −8.4954E−03 | 8.2130E−04 | 0.0000E+00 | 0.0000E+00 |
| S4 | −7.0339E−03 | 5.5652E−04 | 0.0000E+00 | 0.0000E+00 |
| S5 | −5.7861E−01 | 2.8273E−01 | −7.5507E−02 | 8.3789E−03 |
| S6 | 9.2282E−01 | −5.0339E−01 | 1.5016E−01 | −1.8561E−02 |
| S7 | −3.8912E+00 | 2.3573E+00 | −7.9582E−01 | 1.1261E−01 |
| S8 | −2.0453E+00 | 1.1466E+00 | −3.6405E−01 | 4.8858E−02 |
| S9 | −7.0638E−01 | 4.1715E−02 | 1.3567E−01 | −4.2258E−02 |
| S10 | 1.3866E+00 | −9.2431E−01 | 3.4313E−01 | −5.3392E−02 |
| S11 | 5.0526E−02 | −1.3742E−02 | 2.0206E−03 | −1.2337E−04 |
| S12 | −2.0994E−02 | 6.7207E−03 | −1.1245E−03 | 7.6090E−05 |
| S13 | 1.3617E−01 | −3.2253E−02 | 4.1743E−03 | −2.2666E−04 |
| S14 | 1.2350E−02 | −1.8551E−03 | 1.5015E−04 | −5.0185E−06 |

Table 15 shows the effective focal length f of the optical imaging lens, the effective focal lengths f1 to f7 of the lenses, the distance TTL between the object-side surface S1 of the first lens to the imaging surface S17 on the optical axis, the F number Fno of the optical imaging lens, ImgH is a half of diagonal length of the effective pixel region on the imaging surface of the optical imaging lens and the maximum HFOV in example 4.

TABLE 15 parameters of the optical imaging lens.

| Parameters | examples 2 |
|---|---|
| TTL(mm) | 5.40 |
| ImgH (mm) | 2.45 |
| Semi-FOV(°) | 31.0 |
| Fno | 1.49 |
| f(mm) | 4.00 |
| f1(mm) | 4.79 |
| f2(mm) | −6.05 |
| f3(mm) | 5.70 |
| f4(mm) | −12.30 |
| f5(mm) | 41.24 |
| f6(mm) | 6.39 |
| f7(mm) | −3.83 |

Table 16 shows relationship expressions of the optical imaging lens in example 4. In example 4, f/EPD=1.49, which is in the range of 1.4 to 1.98, so a larger aperture can be realized to increase the amount of lighting, and a low order aberration of the system can be effectively balanced and controlled under the premise of compressing the overall size of lens and ensuring the normal mass production yield;

T23/T34=0.20, which is in the range of 0.1 to 0.3, the aperture may be increased, and the amount of lighting may be increased;

R11/f3=0.36, which is in the range of 0.1 to 0.5, the optical sensitivity of the third lens E3 and the sixth lens E6 is reduced to reduce the aberration in the range and improve the imaging quality;

f2/f7=1.58, which is in the range of 1 to 1.6, so the spherical aberration may be controlled within a reasonable range for better imaging effect;

(R12−R11)/(R12+R11)=0.37, which is in the range of 0 to 0.5, so an excessive incidence angle of the optical imaging lens may be avoided, and the range of the focal power of the optical imaging lens may be restricted to reduce a coma;

ΣCT/TD=0.61, which is in the range of 0.3 to 0.8, so the thickness of each lens is within a reasonable range relative to the length of optical imaging lens, which reduces the size of the optical imaging lens and reduces the difficulty of lens production;

R11/R14=1.40, which is in the range of 0.9 to 1.5, so the optical sensitivity of the sixth lens E6 and the seventh lens E7 may be reduced;

SAG11/ET1=2.48, which is in the range of 3 to 3.6, so the mass production of the first lens E1 may be increased, and the first lens may be easily assembled on a lens barrel;

CT6/(T67+CT7)=0.55, which is in the range of 0.1 to 0.6, so it is ensured that the sixth lens E6 and the seventh lens E7 will be neither too thin to affect production nor will the total length of the optical imaging lens exceed a manufacturing limit;

(f/f1)+(f/f3)=1.54, which is in the range of 1.3 to 2, so it is beneficial to reducing the spherical aberration and field curvature of the first lens E1 and the third lens E3;

EPD/ΣAT=1.57, which is in the range of 0.9 to 1.6; by reasonably restricting the total length of the air space, the structure of the lens is more compact, and the effective focal length of the optical imaging lens and the total length of the optical imaging lens are still within a reasonable range while achieving a large aperture.

|SAG71*T67|/ImgH$^2$=0.08, which is in the range of 0.04 to 0.09; by defining the vector height of the object-side surface S14 of the seventh lens and the ratio of the air space between the sixth lens E6 and the seventh lens E7 to an image height, the seventh lens E7 is more easily machined and the overall length of the optical imaging lens may be correspondingly reduced.

TABLE 16 relationship expressions of the optical imaging lens in example 4

| Conditional expressions | examples 4 |
|---|---|
| f/EPD | 1.49 |
| T23/T34 | 0.20 |

TABLE 16-continued relationship expressions of the optical imaging lens in example 4

| Conditional expressions | examples 4 |
|---|---|
| R11/f3 | 0.36 |
| f2/f7 | 1.58 |
| (R12 − R11)/(R12 + R11) | 0.37 |
| ΣCT/TD | 0.61 |
| R11/R14 | 1.40 |
| SAG11/ET1 | 2.48 |
| CT6/(T67 + CT7) | 0.55 |
| (f/f1) + (f/f3) | 1.54 |
| EPD/ΣAT | 1.57 |
| |SAG71*T67|/ImgH^2 | 0.08 |

In the example, the length of the optical imaging lens on the optical axis from the object-side surface S1 of the first lens to the imaging surface S17 is 5.4 mm, the effective focal length of the optical imaging lens is 4.0 mm, the image height is 2.45 mm, the maximum HFOV is 31 degrees, and an aperture value is 1.49. The example ensures a larger aperture while ensuring the miniaturization of the optical imaging lens, which can obtain more amount of lighting, reduce the optical aberration in case of insufficient light, improve the image acquisition quality, and obtain the stable imaging effect. It is to be noted that the larger the aperture value, the smaller the aperture, and the smaller the aperture value, the larger the aperture.

Figure 17:
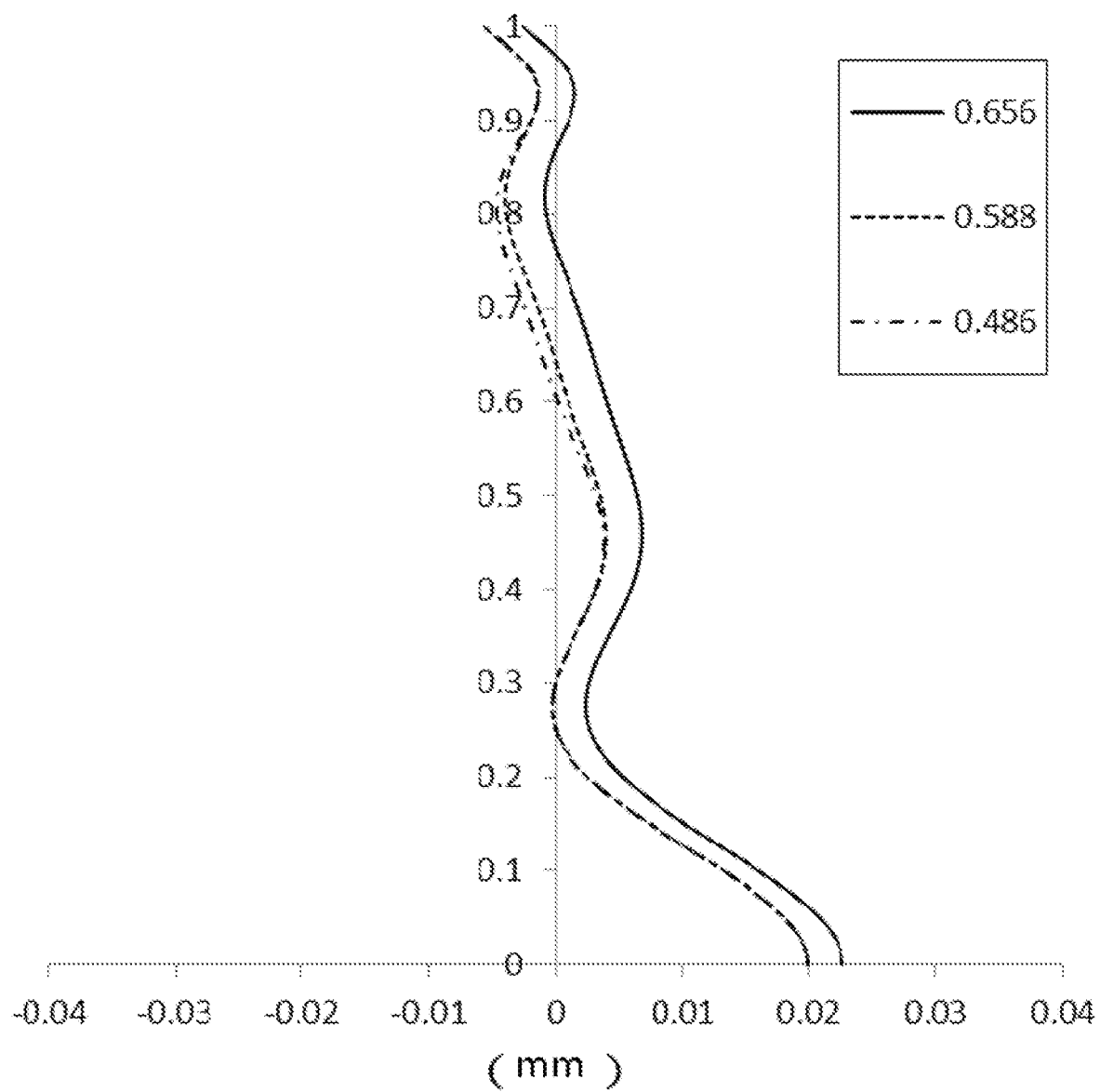
FIG. 17 shows a longitudinal aberration curve of the optical imaging lens in FIG. 16.
Figure 18:
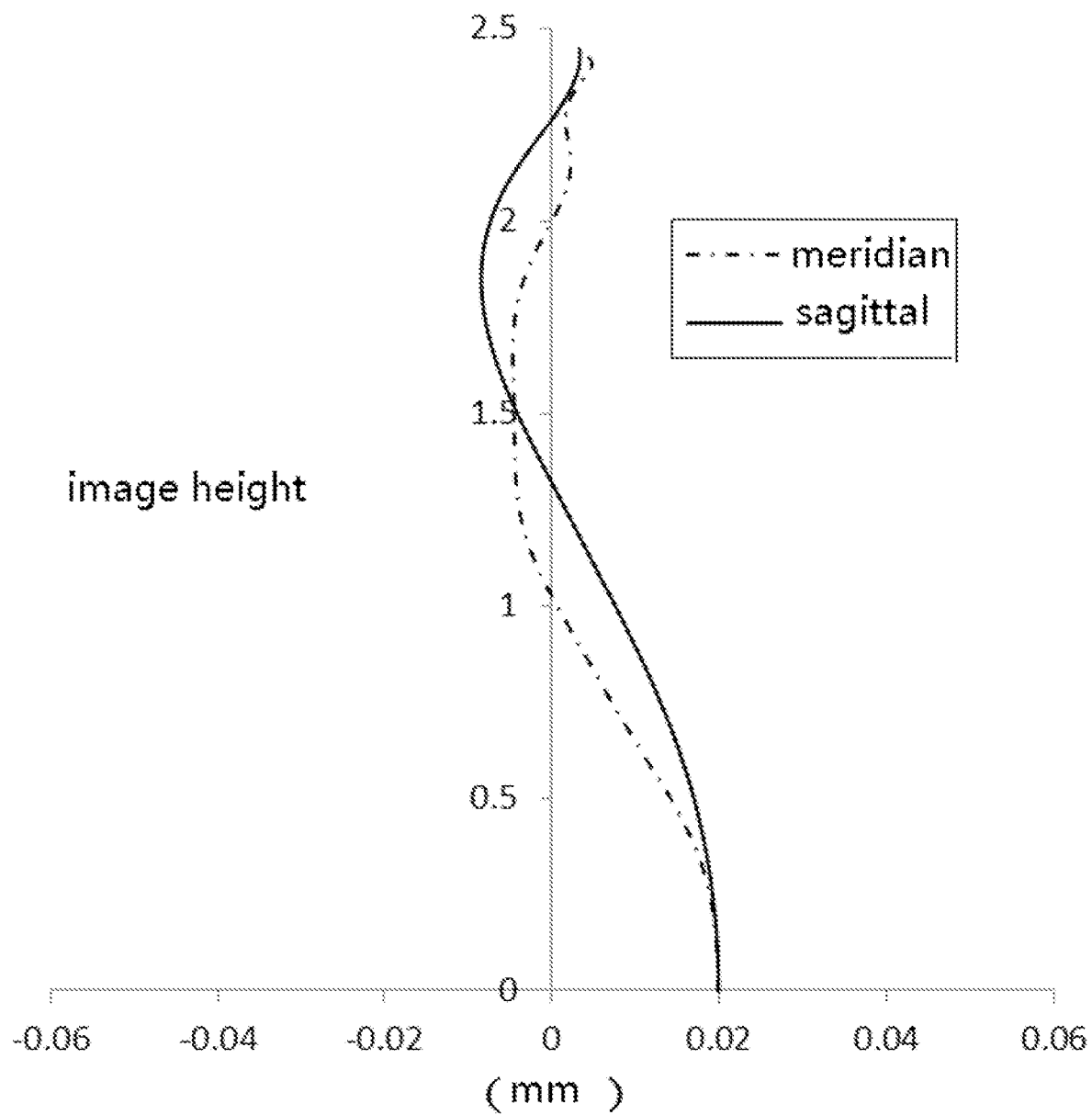
FIG. 18 shows an astigmatism curve of the optical imaging lens in FIG. 16.
Figure 19:
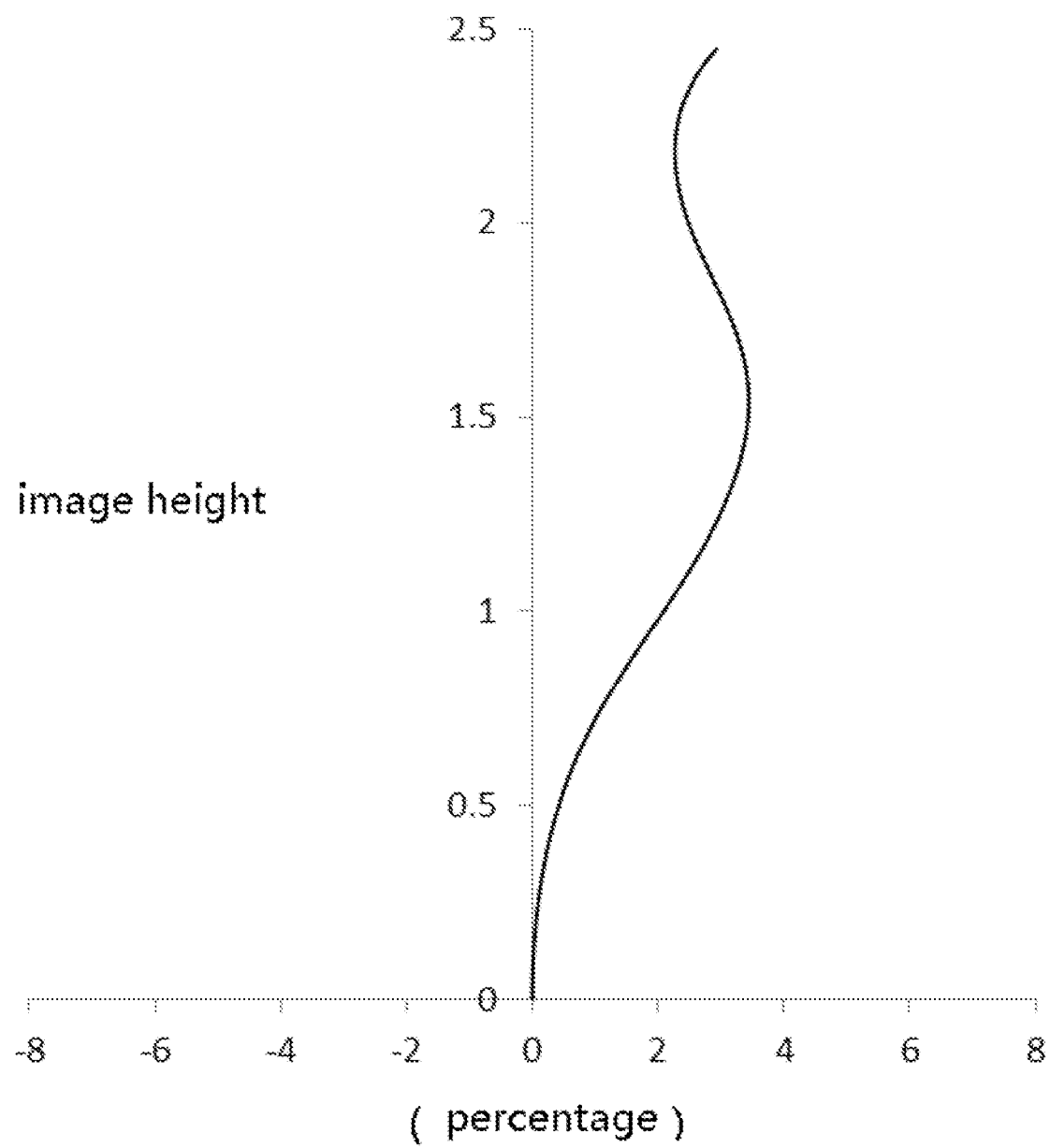
FIG. 19 shows a distortion curve of the optical imaging lens in FIG. 16.
Figure 20:
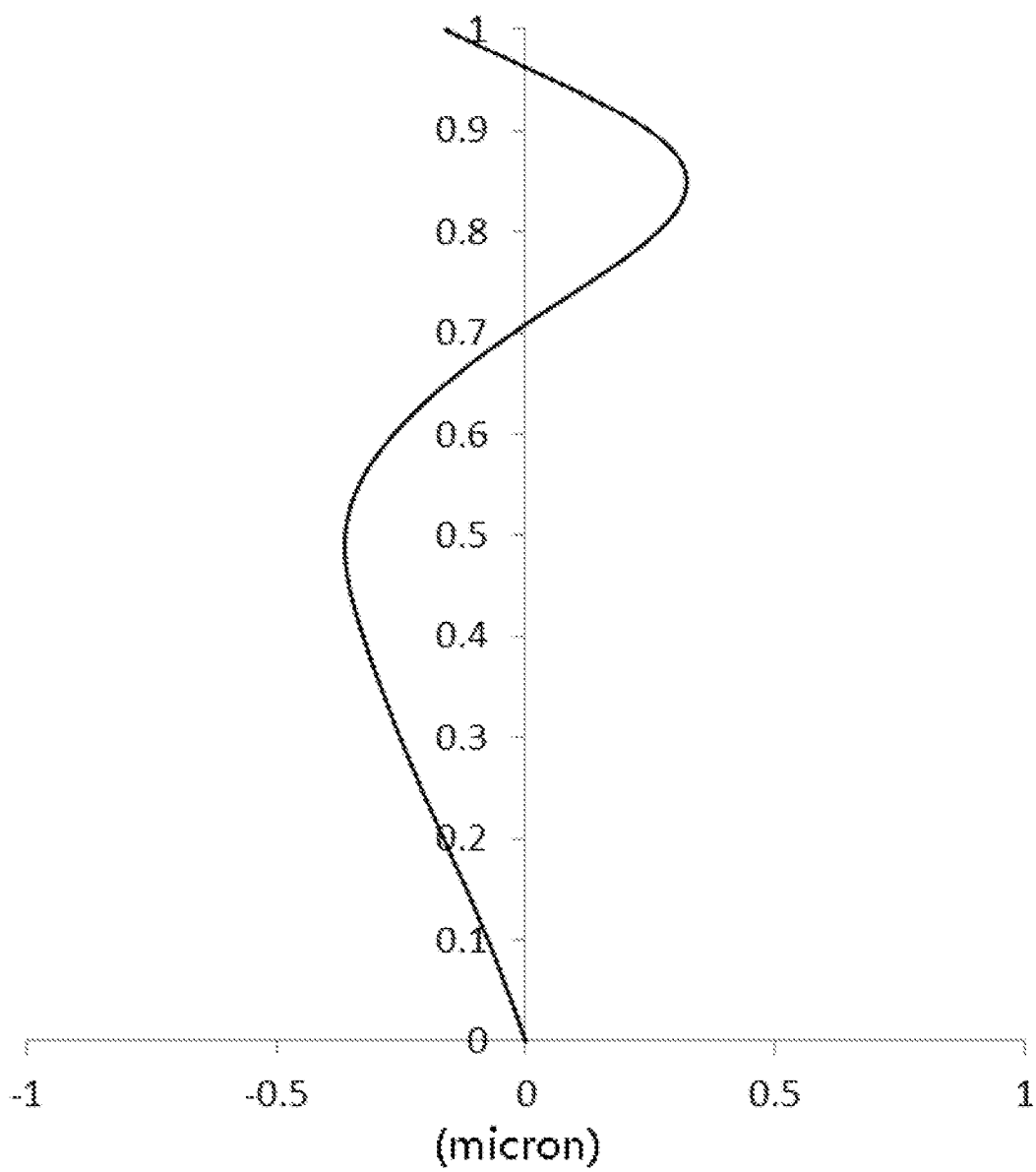
FIG. 20 shows a lateral color curve of the optical imaging lens in FIG. 16.

FIG. 17 shows the longitudinal aberration curve of the optical imaging lens in example 4, which represents that the converging focus of light with different wavelengths deviates after passing through the optical system, then the focal planes of the light with different wavelengths cannot coincide in the final imaging, and the polychromatic light scatters to form the chromatic dispersion. FIG. 18 shows an astigmatism curve of the optical imaging lens according to embodiment 4, which represents the meridian image surface curvature and the sagittal image surface curvature. FIG. 19 shows a distortion curve of the optical imaging lens in example 4, which represents the distortion values at different angles of view. FIG. 20 shows a lateral color curve of the optical imaging lens in example 4, which represents the aberration of different image heights on the imaging surface after the light passes through the optical imaging lens. It can be seen from FIG. 17 to FIG. 20 that the optical imaging lens based on example 4 is suitable for portable electronic products, and has large aperture and good imaging quality.

Example 5

Figure 21:
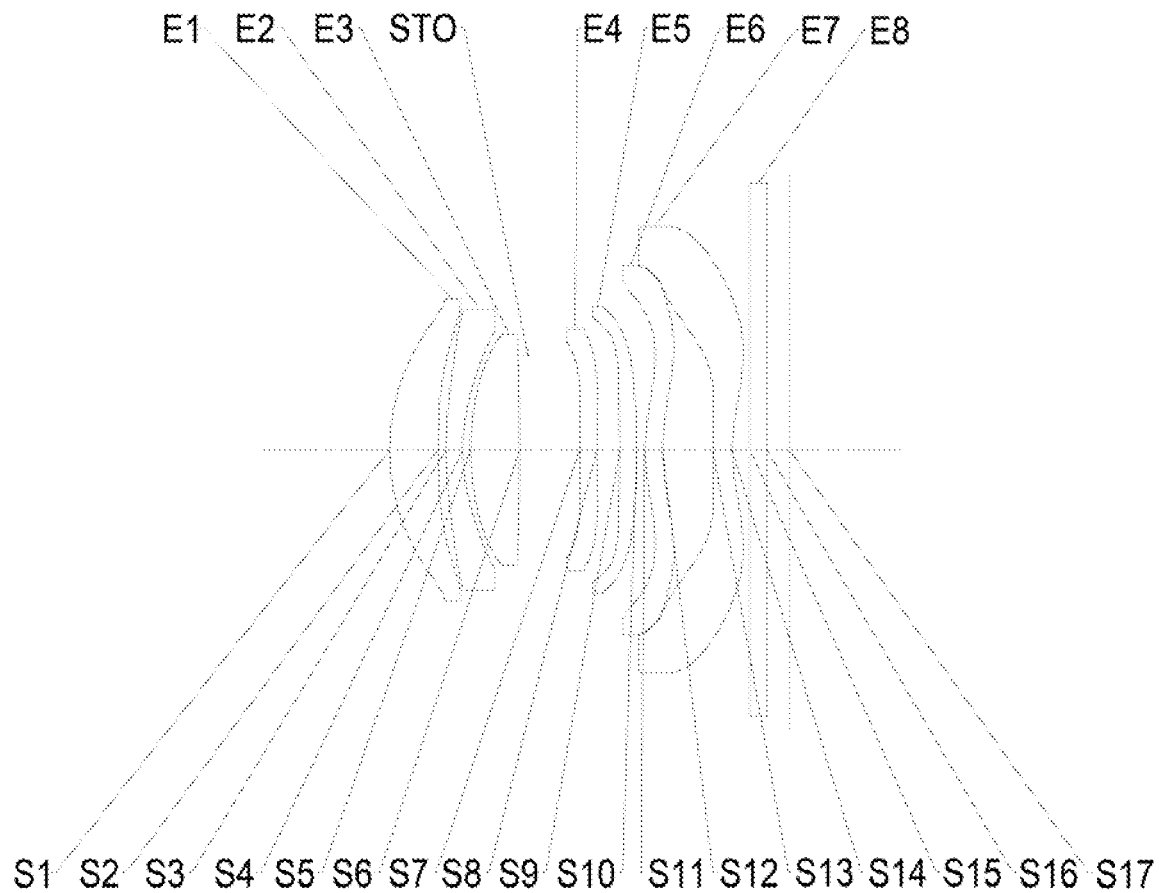
FIG. 21 is a structure diagram of an optical imaging lens according to Example 5 of the disclosure.

As shown in FIG. 21, the optical imaging lens sequentially includes, from an object side to an image side: a first lens E1, a second lens E2, a third lens E3, a diaphragm STO, a fourth lens E4, a fifth lens E5, a sixth lens E6, a seventh lens E7, a filter E8 and an imaging surface S17.

The first lens E1 has positive focal power, an object-side surface S1 of the first lens is a convex surface, and an image-side surface S2 of the first lens is a concave surface. The second lens E2 has negative focal power, an object-side surface S3 of the second lens is a convex surface, and an image-side surface S4 of the second lens is a concave surface. The third lens E3 has positive focal power, an object-side surface S5 of the third lens is a convex surface, and an image-side surface S6 of the third lens is a convex surface. The fourth lens E4 has negative focal power, an object-side surface S7 of the fourth lens is a convex surface, and an image-side surface S8 of the fourth lens is a concave surface. The fifth lens E5 has negative focal power, an object-side surface S9 of the fifth lens is a concave surface, and an image-side surface S10 of the fifth lens is a convex surface. The sixth lens E6 has positive focal power, an object-side surface S11 of the sixth lens is a convex surface, and an image-side surface S12 of the sixth lens is a concave surface. The seventh lens E7 has negative focal power, an object-side surface S13 of the seventh lens is a convex surface, and an image-side surface S14 of the seventh lens is a concave surface. The filter E8 has a filter object-side surface S15 and a filter image-side surface S16. Light from an object sequentially penetrates through each surface and is finally imaged on the imaging surface S17.

Table 17 shows surface type, curvature radius, thickness, material and cone coefficient of each lens of the optical imaging lens in example 5, in which the units of curvature radius and thickness are millimeter.

TABLE 17 detailed optical data of each lens in example 5

| Surface number | Surface type | Curvature radius | Thickness | Material | Cone coefficient |
|---|---|---|---|---|---|
| OBJ | Spherical | Infinite | Infinite | | |
| S1 | Aspherical | 1.9738 | 0.6041 | 1.54/56.2 | 0.0659 |
| S2 | Aspherical | 5.8803 | 0.1000 | | 8.3671 |
| S3 | Aspherical | 3.2372 | 0.2100 | 1.64/23.5 | −0.0825 |
| S4 | Aspherical | 1.6145 | 0.1000 | | −0.7667 |
| S5 | Aspherical | 2.4358 | 0.6142 | 1.54/56.1 | −22.4227 |
| S6 | Aspherical | −23.7525 | 0.1000 | | 50.0000 |
| STO | Spherical | Infinite | 0.6521 | | |
| S7 | Aspherical | 13.9778 | 0.2100 | 1.66/20.4 | 36.4447 |
| S8 | Aspherical | 9.7178 | 0.2921 | | 49.3007 |
| S9 | Aspherical | −9.3153 | 0.2100 | 1.64/23.5 | 7.5446 |
| S10 | Aspherical | −12.0893 | 0.1000 | | 50.0000 |
| S11 | Aspherical | 1.5792 | 0.2210 | 1.54/56.1 | −6.2875 |
| S12 | Aspherical | 2.1464 | 0.6300 | | −6.2331 |
| S13 | Aspherical | 3.5318 | 0.2400 | 1.54/56.1 | −0.1592 |
| S14 | Aspherical | 1.3355 | 0.2282 | | −10.1785 |
| S15 | Spherical | Infinite | 0.2100 | 1.52/64.2 | |
| S16 | Spherical | Infinite | 0.2783 | | |
| S17 | Spherical | Infinite | | | |

In the example, the aspherical lens can be used for each lens, and each aspherical surface type is limited by the following formula:

$$x = \frac{ch^2}{1+\sqrt{1-(k+1)c^2h^2}} + \sum A_i h^i, \quad \text{formula (1)}$$

where x is the distance vector height between a position of the aspherical surface at a height h in the direction of the optical axis and the aspherical surface vertex; c is the paraxial curvature of the aspherical surface, c=1/R (namely, the paraxial curvature c is a reciprocal of the curvature radius R in Table 1); k is the cone coefficient (given in Table 1); and $A_i$ is the i-th-order correction coefficient of the aspherical surface.

Table 18 shows the higher-order coefficients of each aspherical surface of each aspherical lens in the example.

TABLE 18 higher-order coefficients of each aspherical surface in example 5.

| Surface type | A4 | A6 | A8 | A10 | A12 |
|---|---|---|---|---|---|
| S1 | 8.3173E−04 | −2.5876E−02 | 8.6644E−02 | −1.5755E−01 | 1.6950E−01 |
| S2 | 8.3038E−03 | 1.0012E−01 | −2.6336E−01 | 3.7279E−01 | −3.2350E−01 |
| S3 | −1.1703E−01 | 2.3669E−01 | −4.9661E−01 | 7.1834E−01 | −6.7303E−01 |
| S4 | −1.7340E−01 | 3.8138E+00 | −9.9714E+00 | 1.8268E+00 | −1.9869E+00 |
| S5 | 1.8451E−01 | −3.5803E−01 | 8.7903E−01 | −1.8072E+00 | 2.8051E+00 |
| S6 | −1.6983E−02 | 9.0945E−02 | −3.8364E−01 | 9.0590E−01 | −1.2250E+00 |
| S7 | −4.2561E−02 | −3.0891E−01 | 1.0805E+00 | −2.7719E+00 | 4.8623E+00 |
| S8 | −3.9331E−02 | −1.6339E−01 | 3.0813E−01 | −5.7905E−01 | 8.9086E−01 |
| S9 | 1.0390E−01 | −2.3336E−01 | 5.9734E−01 | −1.1745E+00 | 1.3380E+00 |
| S10 | −1.8328E−01 | 4.8801E−01 | −7.7880E−01 | 8.9255E−01 | −8.2993E−01 |
| S11 | −1.3559E−01 | 8.8338E−02 | −1.2172E−01 | 1.4871E−01 | −1.2534E−01 |
| S12 | 6.1241E−02 | −3.4545E−01 | 4.9934E−01 | −4.4933E−01 | 2.6332E−01 |
| S13 | −4.1061E−01 | 3.2386E−01 | −2.4240E−01 | 1.1056E−01 | −2.2889E−02 |
| S14 | −1.0448E−01 | 2.4220E−02 | 2.0150E−02 | −3.0230E−02 | 1.6831E−02 |

| Surface type | A14 | A16 | A18 | A20 |
|---|---|---|---|---|
| S1 | −1.1318E−01 | 4.5730E−02 | −1.0197E−02 | 9.5285E−04 |
| S2 | 1.7175E−01 | −5.2666E−02 | 8.1257E−03 | −4.4148E−04 |
| S3 | 3.9945E−01 | −1.4454E−01 | 2.9141E−02 | −2.5162E−03 |
| S4 | 1.2211E+00 | −3.8574E−01 | 4.4778E−02 | 1.6708E−03 |
| S5 | −2.8926E+00 | 1.8061E+00 | −6.1080E−01 | 8.5468E−02 |
| S6 | 9.4162E−01 | −3.6910E−01 | 4.6397E−02 | 5.8992E−03 |
| S7 | −5.5745E+00 | 3.9416E+00 | −1.5541E+00 | 2.6083E−01 |
| S8 | −9.1575E−01 | 5.6967E−01 | −1.9407E−01 | 2.7867E−02 |
| S9 | −9.1302E−01 | 3.7477E−01 | −8.6656E−02 | 8.7158E−03 |
| S10 | 5.6543E−01 | −2.4486E−01 | 5.8423E−02 | −5.7998E−03 |
| S11 | 6.5492E−02 | −2.0170E−02 | 3.3478E−03 | −2.3014E−04 |
| S12 | −1.0002E−01 | 2.3690E−02 | −3.1625E−03 | 1.8035E−04 |
| S13 | −2.0710E−04 | 1.0870E−03 | −2.1060E−04 | 1.3589E−05 |
| S14 | −5.0134E−03 | 8.4021E−04 | −7.4502E−05 | 2.7059E−06 |

Table 19 shows the effective focal length f of the optical imaging lens, the effective focal lengths f1 to f7 of the lenses, the distance TTL between the object-side surface S1 of the first lens to the imaging surface S17 on the optical axis, the F number Fno of the optical imaging lens, ImgH is a half of diagonal length of the effective pixel region on the imaging surface of the optical imaging lens and the maximum HFOV in example 5.

TABLE 19 parameters of the optical imaging lens.

| Parameters | examples 5 |
|---|---|
| TTL(mm) | 5.00 |
| ImgH (mm) | 3.10 |
| Semi-FOV(°) | 35.0 |
| Fno | 1.89 |
| f(mm) | 4.10 |
| f1(mm) | 5.17 |
| f2(mm) | −5.30 |
| f3(mm) | 4.09 |
| f4(mm) | −49.23 |
| f5(mm) | −65.39 |
| f6(mm) | 9.66 |
| f7(mm) | −4.10 |

Table 20 shows relationship expressions of the optical imaging lens in example 5. In example 5, f/EPD=1.59, which is in the range of 1.4 to 1.98, so a larger aperture can be realized to increase the amount of lighting, and a low order aberration of the system can be effectively balanced and controlled under the premise of compressing the overall size of lens and ensuring the normal mass production yield;

T23/T34=0.13, which is in the range of 0.1 to 0.3, the aperture may be increased, and the amount of lighting may be increased;

R11/f3=0.39, which is in the range of 0.1 to 0.5, the optical sensitivity of the third lens E3 and the sixth lens E6 is reduced to reduce the aberration in the range and improve the imaging quality;

f2/f7=1.29, which is in the range of 1 to 1.6, so the spherical aberration may be controlled within a reasonable range for better imaging effect;

(R12−R11)/(R12+R11)=0.15, which is in the range of 0 to 0.5, so an excessive incidence angle of the optical imaging lens may be avoided, and the range of the focal power of the optical imaging lens may be restricted to reduce a coma;

ΣCT/TD=0.51, which is in the range of 0.3 to 0.8, so the thickness of each lens is within a reasonable range relative to the length of optical imaging lens, which reduces the size of the optical imaging lens and reduces the difficulty of lens production;

R11/R14=1.18, which is in the range of 0.9 to 1.5, so the optical sensitivity of the sixth lens E6 and the seventh lens E7 may be reduced;

SAG11/ET1=3.44, which is in the range of 3 to 3.6, so the mass production of the first lens E1 may be increased, and the first lens may be easily assembled on a lens barrel;

CT6/(T67+CT7)=0.25, which is in the range of 0.1 to 0.6, so it is ensured that the sixth lens E6 and the seventh lens E7 will be neither too thin to affect production nor will the total length of the optical imaging lens exceed a manufacturing limit;

(f/f1)+(f/f3)=1.79, which is in the range of 1.3 to 2, so it is beneficial to reducing the spherical aberration and field curvature of the first lens E1 and the third lens E3;

EPD/ΣAT=1.31, which is in the range of 0.9 to 1.6; by reasonably restricting the total length of the air space, the structure of the lens is more compact, and the effective focal length of the optical imaging lens and the total length of the optical imaging lens are still within a reasonable range while achieving a large aperture.

|SAG71*T67|/ImgH$^2$=0.06, which is in the range of 0.04 to 0.09; by defining the vector height of the object-side surface S14 of the seventh lens and the ratio of the air space between the sixth lens E6 and the seventh lens E7 to an image height, the seventh lens E7 is more easily machined and the overall length of the optical imaging lens may be correspondingly reduced.

TABLE 20 relationship expressions of the optical imaging lens in example 5

| Conditional expressions | examples 5 |
|---|---|
| f/EPD | 1.59 |
| T23/T34 | 0.13 |
| R11/f3 | 0.39 |
| f2/f7 | 1.29 |
| (R12 − R11)/(R12 + R11) | 0.15 |
| ΣCT/TD | 0.51 |
| R11/R14 | 1.18 |
| SAG11/ET1 | 3.44 |
| CT6/(T67 + CT7) | 0.25 |
| (f/f1) + (f/f3) | 1.79 |
| EPD/ΣAT | 1.31 |
| |SAG71*T67|/ImgH^2 | 0.06 |

In the example, the length of the optical imaging lens on the optical axis from the object-side surface S1 of the first lens to the imaging surface S17 is 5.0 mm, the effective focal length of the optical imaging lens is 4.1 mm, the image height is 3.10 mm, the maximum HFOV is 35 degrees, and an aperture value is 1.89. The example ensures a larger aperture while ensuring the miniaturization of the optical imaging lens, which can obtain more amount of lighting, reduce the optical aberration in case of insufficient light, improve the image acquisition quality, and obtain the stable imaging effect. It is to be noted that the larger the aperture value, the smaller the aperture, and the smaller the aperture value, the larger the aperture.

Figure 22:
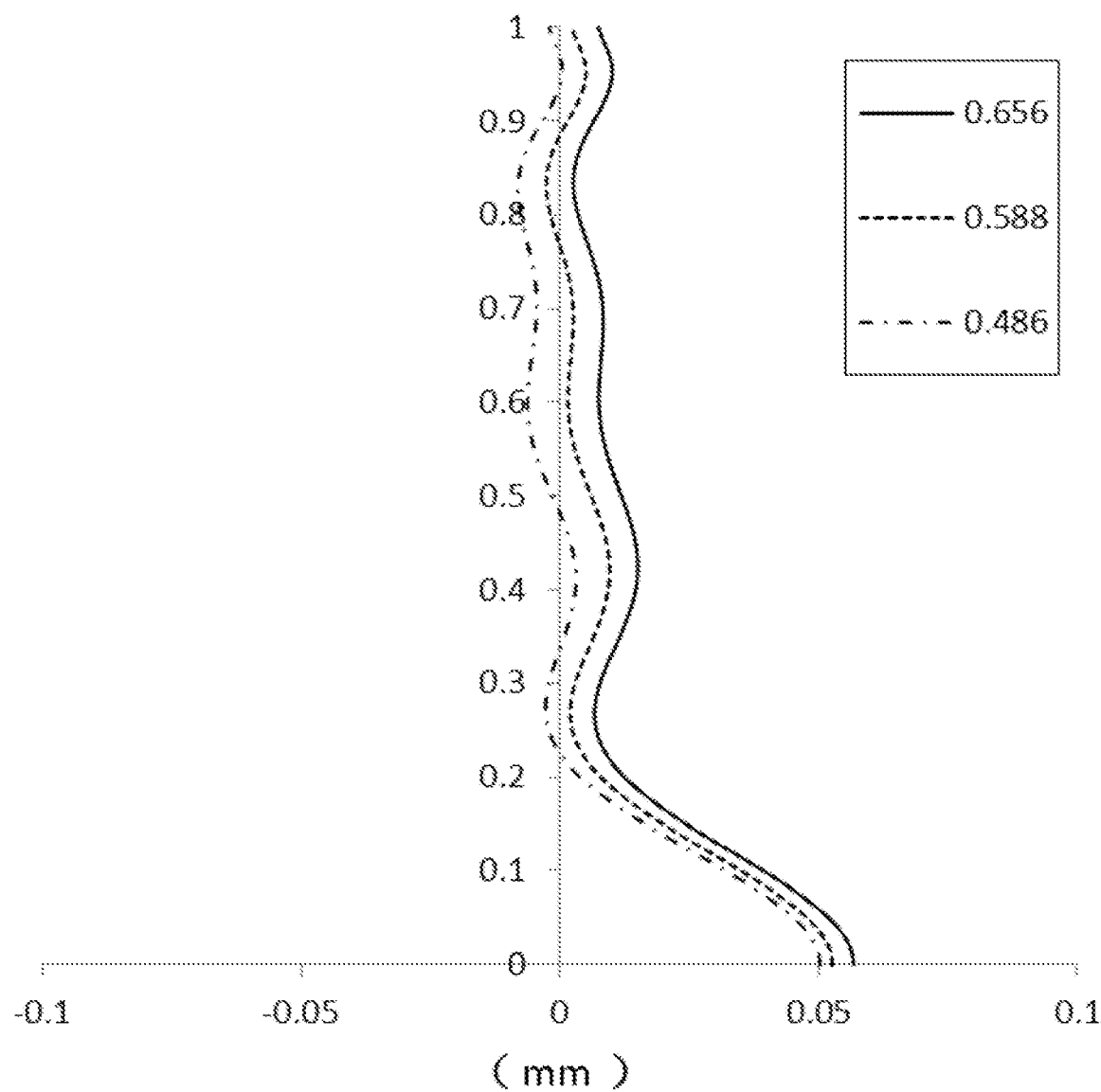
FIG. 22 shows a longitudinal aberration curve of the optical imaging lens in FIG. 21.
Figure 23:
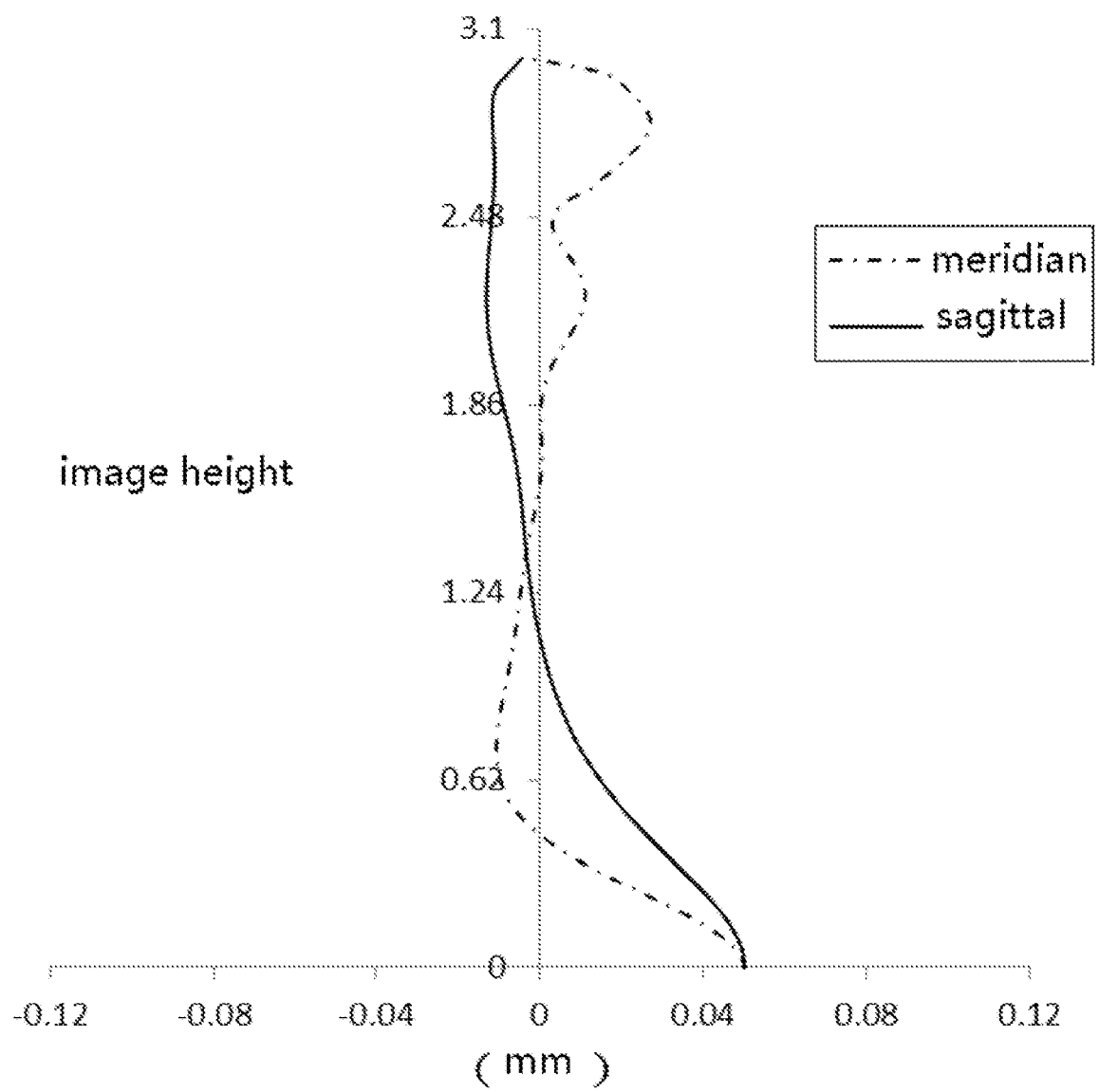
FIG. 23 shows an astigmatism curve of the optical imaging lens in FIG. 21.
Figure 24:
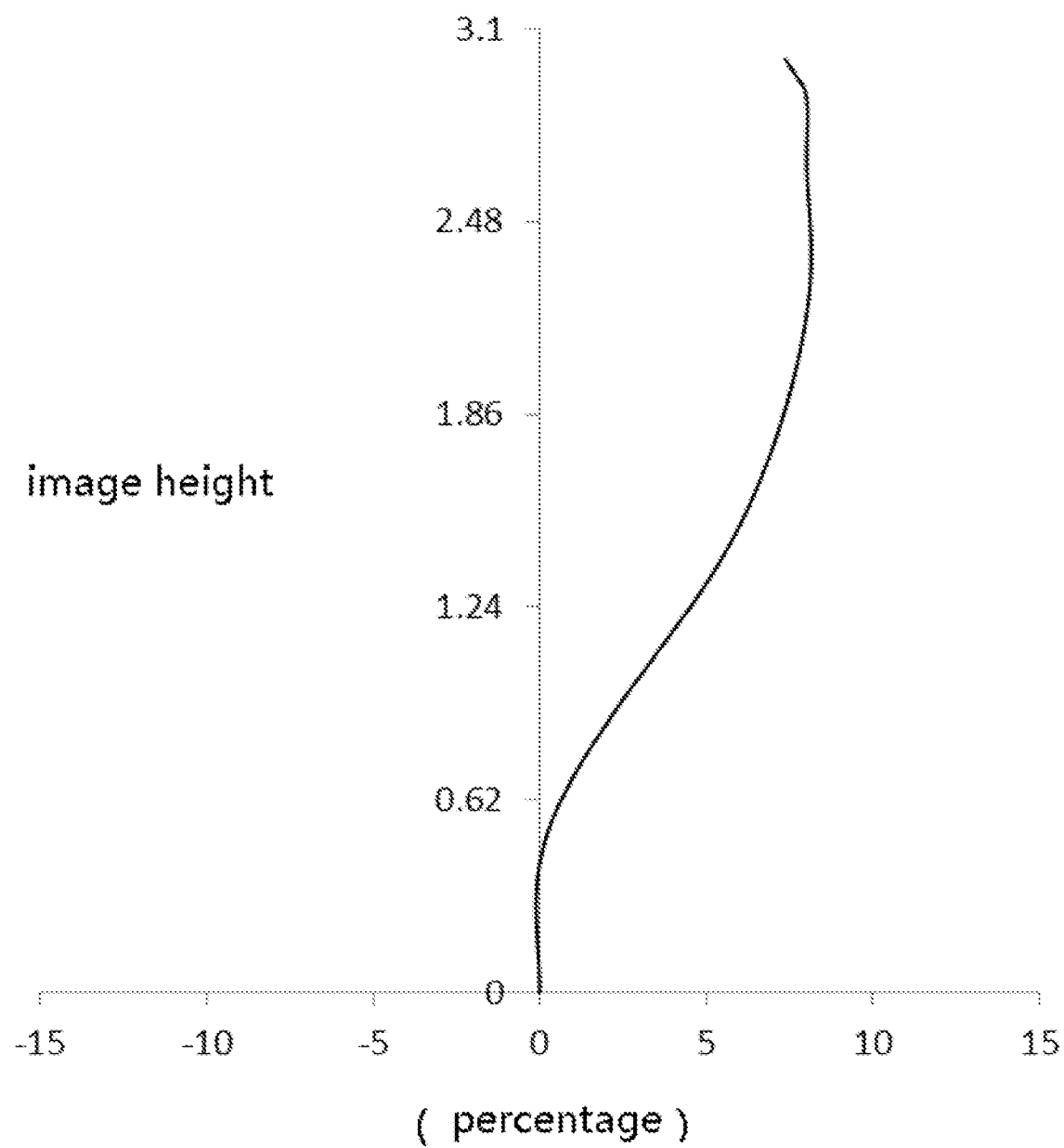
FIG. 24 shows a distortion curve of the optical imaging lens in FIG. 21.
Figure 25:
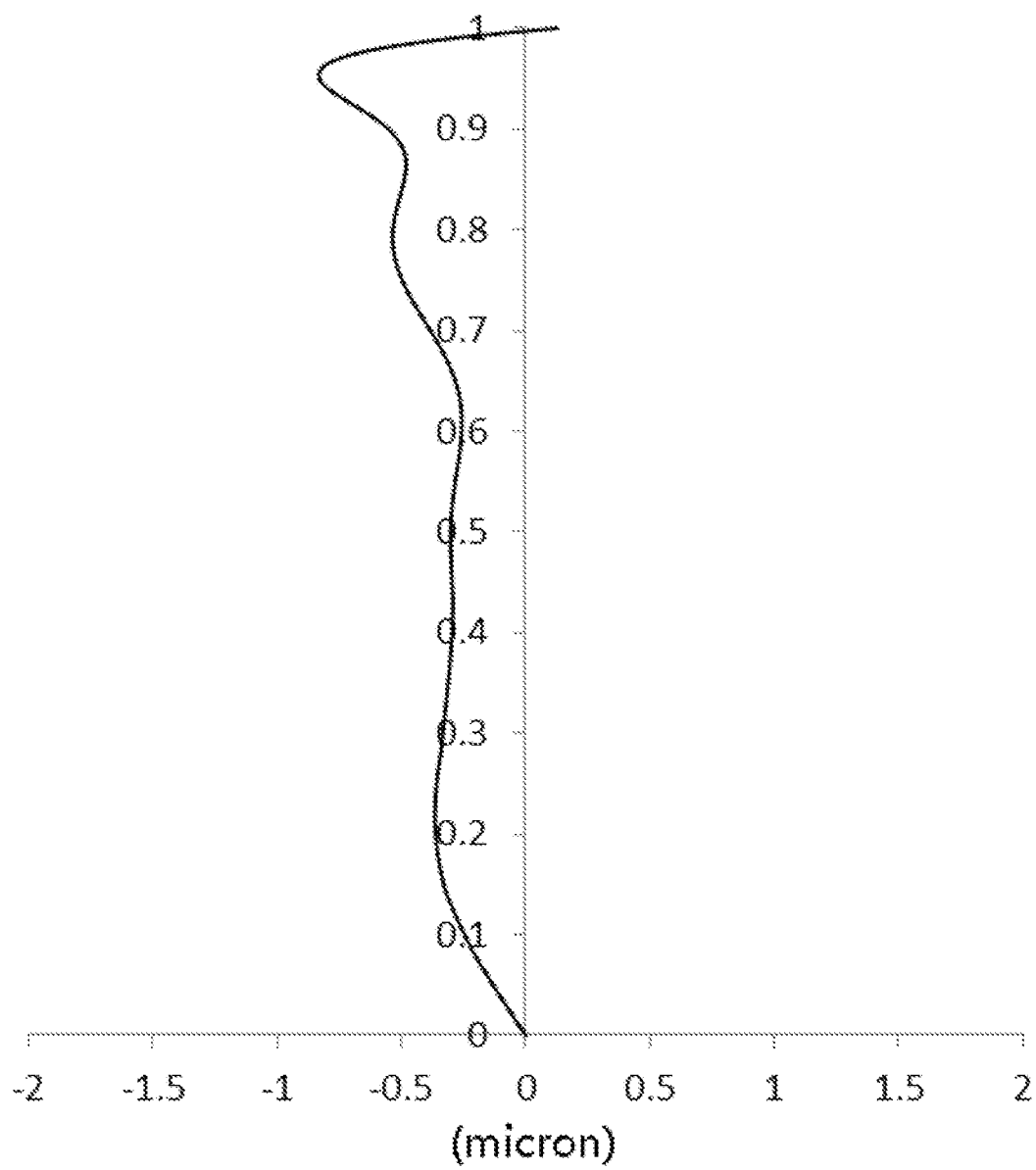
FIG. 25 shows a lateral color curve of the optical imaging lens in FIG. 21.

FIG. 22 shows the longitudinal aberration curve of the optical imaging lens in example 5, which represents that the converging focus of light with different wavelengths deviates after passing through the optical system, then the focal planes of the light with different wavelengths cannot coincide in the final imaging, and the polychromatic light scatters to form the chromatic dispersion. FIG. 23 shows an astigmatism curve of the optical imaging lens according to embodiment 5, which represents the meridian image surface curvature and the sagittal image surface curvature. FIG. 24 shows a distortion curve of the optical imaging lens in example 5, which represents the distortion values at different angles of view. FIG. 25 shows a lateral color curve of the optical imaging lens in example 5, which represents the aberration of different image heights on the imaging surface after the light passes through the optical imaging lens. It can be seen from FIG. 22 to FIG. 25 that the optical imaging lens based on example 5 is suitable for portable electronic products, and has large aperture and good imaging quality.

Example 6

Figure 26:
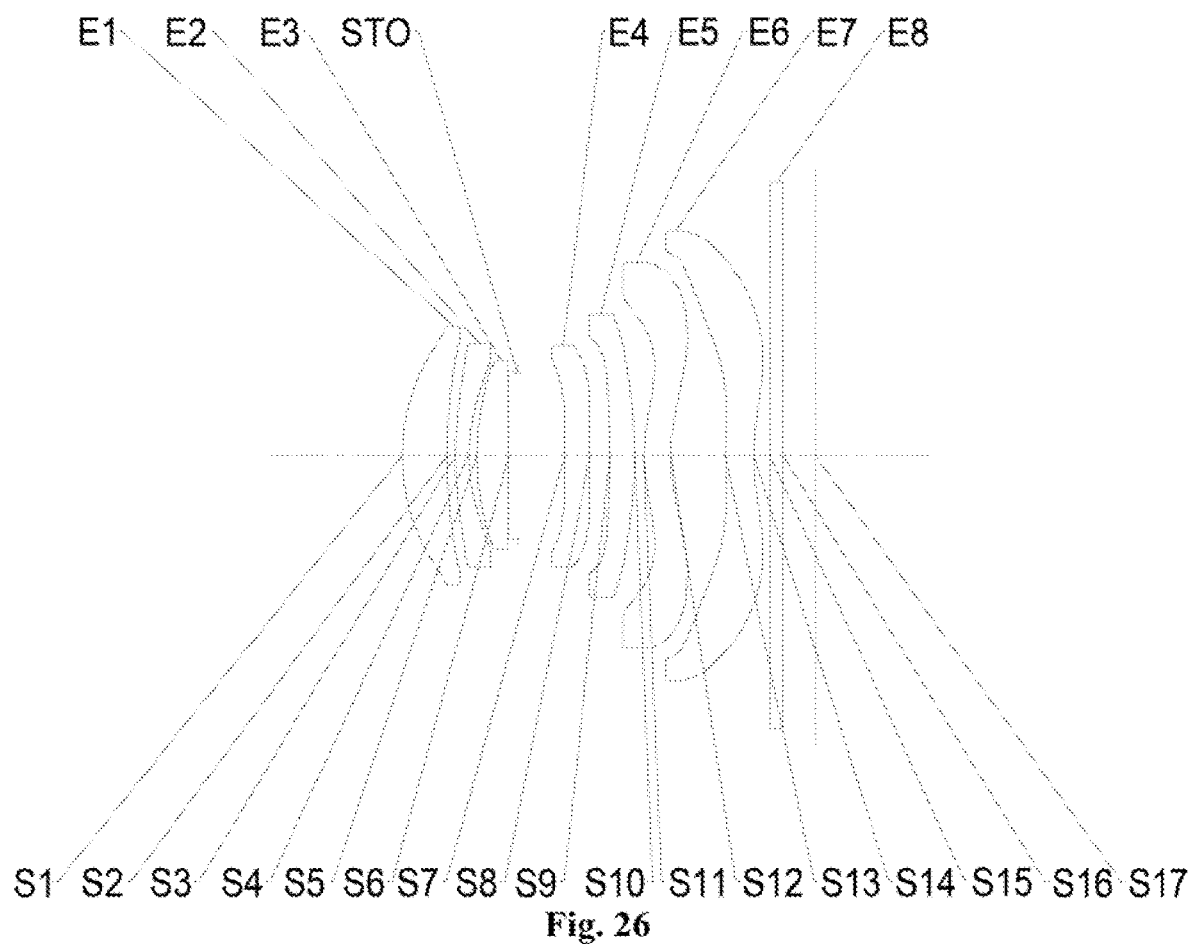
FIG. 26 is a structure diagram of an optical imaging lens according to Example 6 of the disclosure.

As shown in FIG. 26, the optical imaging lens sequentially includes, from an object side to an image side: a first lens E1, a second lens E2, a third lens E3, a diaphragm STO, a fourth lens E4, a fifth lens E5, a sixth lens E6, a seventh lens E7, a filter E8 and an imaging surface S17.

The first lens E1 has positive focal power, an object-side surface S1 of the first lens is a convex surface, and an image-side surface S2 of the first lens is a concave surface. The second lens E2 has negative focal power, an object-side surface S3 of the second lens is a convex surface, and an image-side surface S4 of the second lens is a concave surface. The third lens E3 has positive focal power, an object-side surface S5 of the third lens is a convex surface, and an image-side surface S6 of the third lens is a convex surface. The fourth lens E4 has negative focal power, an object-side surface S7 of the fourth lens is a concave surface, and an image-side surface S8 of the fourth lens is a concave surface. The fifth lens E5 has positive focal power, an object-side surface S9 of the fifth lens is a concave surface, and an image-side surface S10 of the fifth lens is a convex surface. The sixth lens E6 has positive focal power, an object-side surface S11 of the sixth lens is a convex surface, and an image-side surface S12 of the sixth lens is a concave surface. The seventh lens E7 has negative focal power, an object-side surface S13 of the seventh lens is a convex surface, and an image-side surface S14 of the seventh lens is a concave surface. The filter E8 has a filter object-side surface S15 and a filter image-side surface S16. Light from an object sequentially penetrates through each surface and is finally imaged on the imaging surface S17.

Table 21 shows surface type, curvature radius, thickness, material and cone coefficient of each lens of the optical imaging lens in example 6, in which the units of curvature radius and thickness are millimeter.

TABLE 21 detailed optical data of each lens in example 6

| Surface number | Surface type | Curvature radius | Thickness | Material | Cone coefficient |
|---|---|---|---|---|---|
| OBJ | Spherical | Infinite | Infinite | | |
| S1 | Aspherical | 1.8644 | 0.5416 | 1.54/56.2 | −0.0921 |
| S2 | Aspherical | 6.7900 | 0.1000 | | 3.7029 |
| S3 | Aspherical | 2.9057 | 0.1600 | 1.64/23.5 | −0.7061 |
| S4 | Aspherical | 1.5315 | 0.1000 | | −0.9328 |
| S5 | Aspherical | 2.5542 | 0.3888 | 1.54/56.1 | −30.0207 |
| S6 | Aspherical | −117.4021 | 0.1000 | | −90.0000 |
| STO | Spherical | Infinite | 0.5740 | | |
| S7 | Aspherical | −118.6341 | 0.3109 | 1.66/20.4 | −90.0000 |
| S8 | Aspherical | 11.6418 | 0.2452 | | −35.4870 |
| S9 | Aspherical | −7.0403 | 0.2991 | 1.64/23.5 | 2.3107 |
| S10 | Aspherical | −6.2587 | 0.1129 | | −39.6482 |
| S11 | Aspherical | 1.5287 | 0.3212 | 1.54/56.1 | −5.1991 |
| S12 | Aspherical | 1.8085 | 0.6620 | | −4.7037 |
| S13 | Aspherical | 4.1993 | 0.3389 | 1.54/56.1 | −0.2183 |
| S14 | Aspherical | 1.5841 | 0.2001 | | −8.5297 |
| S15 | Spherical | Infinite | 0.1600 | 1.52/64.2 | |
| S16 | Spherical | Infinite | 0.3852 | | |
| S17 | Spherical | Infinite | | | |

In the example, the aspherical lens can be used for each lens, and each aspherical surface type is limited by the following formula:

$$x = \frac{ch^2}{1 + \sqrt{1 - (k+1)c^2h^2}} + \sum A_i h^i, \quad \text{formula (1)}$$

where x is the distance vector height between a position of the aspherical surface at a height h in the direction of the optical axis and the aspherical surface vertex; c is the paraxial curvature of the aspherical surface, c=1/R (namely, the paraxial curvature c is a reciprocal of the curvature radius R in Table 1); k is the cone coefficient (given in Table 1); and Ai is the i-th-order correction coefficient of the aspherical surface.

Table 22 shows the higher-order coefficients of each aspherical surface of each aspherical lens in the example.

TABLE 22 higher-order coefficients of each aspherical surface in example 6.

| Surface type | A4 | A6 | A8 | A10 | A12 |
|---|---|---|---|---|---|
| S1 | 2.7370E−04 | −8.6268E−03 | 3.4395E−02 | −8.7571E−02 | 1.2075E−01 |
| S2 | 1.4486E−02 | 7.7289E−02 | −2.9229E−01 | 5.4331E−01 | −6.0599E−01 |
| S3 | −1.4862E−01 | 3.4349E−01 | −9.4393E−01 | 1.9046E+00 | −2.5201E+00 |
| S4 | −1.7636E−01 | 3.2376E−01 | −6.2508E−01 | 4.7765E−01 | 1.3959E+00 |
| S5 | 2.0642E−01 | −4.7138E−01 | 1.3884E+00 | −3.8830E+00 | 8.2461E+00 |
| S6 | −3.5996E−02 | 1.4068E−01 | −8.2234E−01 | 2.6950E+00 | −5.1301E+00 |
| S7 | −1.1287E−01 | −1.4181E−01 | 7.3556E−01 | −2.6350E+00 | 6.2007E+00 |
| S8 | −8.3740E−02 | −1.6051E−01 | 5.2135E−01 | −1.3664E+00 | 2.3674E+00 |
| S9 | 1.0544E−01 | −2.3439E−01 | 4.4643E−01 | −6.5096E−01 | 4.2151E−01 |
| S10 | −1.4158E−01 | 2.4724E−01 | −2.3505E−01 | 1.4549E−01 | −1.0002E−01 |
| S11 | −1.6324E−01 | 1.5486E−01 | −2.6623E−01 | 3.2158E−01 | −2.7256E−01 |
| S12 | −3.7345E−03 | −1.1558E−01 | 1.3705E−01 | −1.0093E−01 | 4.9064E−02 |
| S13 | −3.5555E−01 | 2.9012E−01 | −1.8222E−01 | 8.7287E−02 | −2.9971E−02 |
| S14 | −1.7755E−01 | 1.3998E−01 | −1.0020E−01 | 5.8302E−02 | −2.5501E−02 |

| Surface type | A14 | A16 | A18 | A20 |
|---|---|---|---|---|
| S1 | −9.9514E−02 | 4.7838E−02 | −1.2278E−02 | 1.2719E−03 |
| S2 | 4.1411E−01 | −1.6669E−01 | 3.5879E−02 | −3.1897E−03 |
| S3 | 2.1083E+00 | −1.0670E+00 | 2.9682E−01 | −3.4725E−02 |
| S4 | −4.2384E+00 | 4.7587E+00 | −2.4970E+00 | 5.0757E−01 |
| S5 | −1.1331E+01 | 9.2517E+00 | −4.0324E+00 | 7.1797E−01 |
| S6 | 5.7879E+00 | −3.6832E+00 | 1.1399E+00 | −1.0116E−01 |
| S7 | −9.3425E+00 | 8.6478E+00 | −4.4727E+00 | 9.8583E−01 |
| S8 | −2.6265E+00 | 1.8080E+00 | −7.0450E−01 | 1.1805E−01 |
| S9 | 8.5142E−02 | −3.1315E−01 | 1.8553E−01 | −3.8464E−02 |
| S10 | 8.4195E−02 | −4.9075E−02 | 1.4684E−02 | −1.7036E−03 |
| S11 | 1.5431E−01 | −5.4376E−02 | 1.0651E−02 | −8.7717E−04 |
| S12 | −1.5348E−02 | 2.9276E−03 | −3.0619E−04 | 1.3211E−05 |
| S13 | 7.2247E−03 | −1.2041E−03 | 1.2753E−04 | −6.4245E−06 |
| S14 | 7.5509E−03 | −1.3849E−03 | 1.4044E−04 | −5.9920E−06 |

Table 23 shows the effective focal length f of the optical imaging lens, the effective focal lengths f1 to f7 of the lenses, the distance TTL between the object-side surface S1 of the first lens to the imaging surface S17 on the optical axis, the F number Fno of the optical imaging lens, ImgH is a half of diagonal length of the effective pixel region on the imaging surface of the optical imaging lens, and the maximum horizontal field of view in example 6.

TABLE 23 parameters of the optical imaging lens.

| Parameters | examples 6 |
|---|---|
| TTL(mm) | 5.00 |
| ImgH (mm) | 3.10 |
| Semi-FOV(°) | 35.0 |
| Fno | 1.89 |
| f(mm) | 4.20 |
| f1(mm) | 4.54 |
| f2(mm) | −5.30 |
| f3(mm) | 4.60 |
| f4(mm) | −16.03 |
| f5(mm) | 76.68 |
| f6(mm) | 12.93 |
| f7(mm) | −4.90 |

Table 24 shows relationship expressions of the optical imaging lens in example 6. In example 6, f/EPD=1.89, which is in the range of 1.4 to 1.98, so a larger aperture can be realized to increase the amount of lighting, and a low order aberration of the system can be effectively balanced and controlled under the premise of compressing the overall size of lens and ensuring the normal mass production yield;

T23/T34=0.15, which is in the range of 0.1 to 0.3, the aperture may be increased, and the amount of lighting may be increased;

R11/f3=0.33, which is in the range of 0.1 to 0.5, the optical sensitivity of the third lens E3 and the sixth lens E6 is reduced to reduce the aberration in the range and improve the imaging quality;

f2/f7=1.08, which is in the range of 1 to 1.6, so the spherical aberration may be controlled within a reasonable range for better imaging effect;

(R12−R11)/(R12+R11)=0.08, which is in the range of 0 to 0.5, so an excessive incidence angle of the optical imaging lens may be avoided, and the range of the focal power of the optical imaging lens may be restricted to reduce a coma;

ΣCT/TD=0.53, which is in the range of 0.3 to 0.8, so the thickness of each lens is within a reasonable range relative to the length of optical imaging lens, which reduces the size of the optical imaging lens and reduces the difficulty of lens production;

R11/R14=0.97, which is in the range of 0.9 to 1.5, so the optical sensitivity of the sixth lens E6 and the seventh lens E7 may be reduced;

SAG11/ET1=3.42, which is in the range of 3 to 3.6, so the mass production of the first lens E1 may be increased, and the first lens may be easily assembled on a lens barrel;

CT6/(T67+CT7)=0.32, which is in the range of 0.1 to 0.6, so it is ensured that the sixth lens E6 and the seventh lens E7 will be neither too thin to affect production nor will the total length of the optical imaging lens exceed a manufacturing limit;

(f/f1)+(f/f3)=1.84, which is in the range of 1.3 to 2, so it is beneficial to reducing the spherical aberration and field curvature of the first lens E1 and the third lens E3;

EPD/ΣAT=1.17, which is in the range of 0.9 to 1.6; by reasonably restricting the total length of the air space, the structure of the lens is more compact, and the effective focal length of the optical imaging lens and the total length of the optical imaging lens are still within a reasonable range while achieving a large aperture.

|SAG71*T67|/ImgH$^2$=0.05, which is in the range of 0.04 to 0.09; by defining the vector height of the object-side surface S14 of the seventh lens and the ratio of the air space between the sixth lens E6 and the seventh lens E7 to an image height, the seventh lens E7 is more easily machined and the overall length of the optical imaging lens may be correspondingly reduced.

TABLE 24 relationship expressions of the optical imaging lens in example 6

| Conditional expressions | examples 6 |
|---|---|
| f/EPD | 1.89 |
| T23/T34 | 0.15 |
| R11/f3 | 0.33 |
| f2/f7 | 1.08 |
| (R12 − R11)/(R12 + R11) | 0.08 |
| ΣCT/TD | 0.53 |
| R11/R14 | 0.97 |
| SAG11/ET1 | 3.42 |
| CT6/(T67 + CT7) | 0.32 |
| (f/f1) + (f/f3) | 1.84 |
| EPD/ΣAT | 1.17 |
| |SAG71*T67|/ImgH^2 | 0.05 |

In the example, the length of the optical imaging lens on the optical axis from the object-side surface S1 of the first lens to the imaging surface S17 is 5.0 mm, the effective focal length of the optical imaging lens is 4.2 mm, the image height is 3.10 mm, the maximum HFOV is 35 degrees, and the aperture value is 1.89. The example ensures a larger aperture while ensuring the miniaturization of the optical imaging lens, which can obtain more amount of lighting, reduce the optical aberration in case of insufficient light, improve the image acquisition quality, and obtain the stable imaging effect. It is to be noted that the larger the aperture value, the smaller the aperture, and the smaller the aperture value, the larger the aperture.

Figure 27:
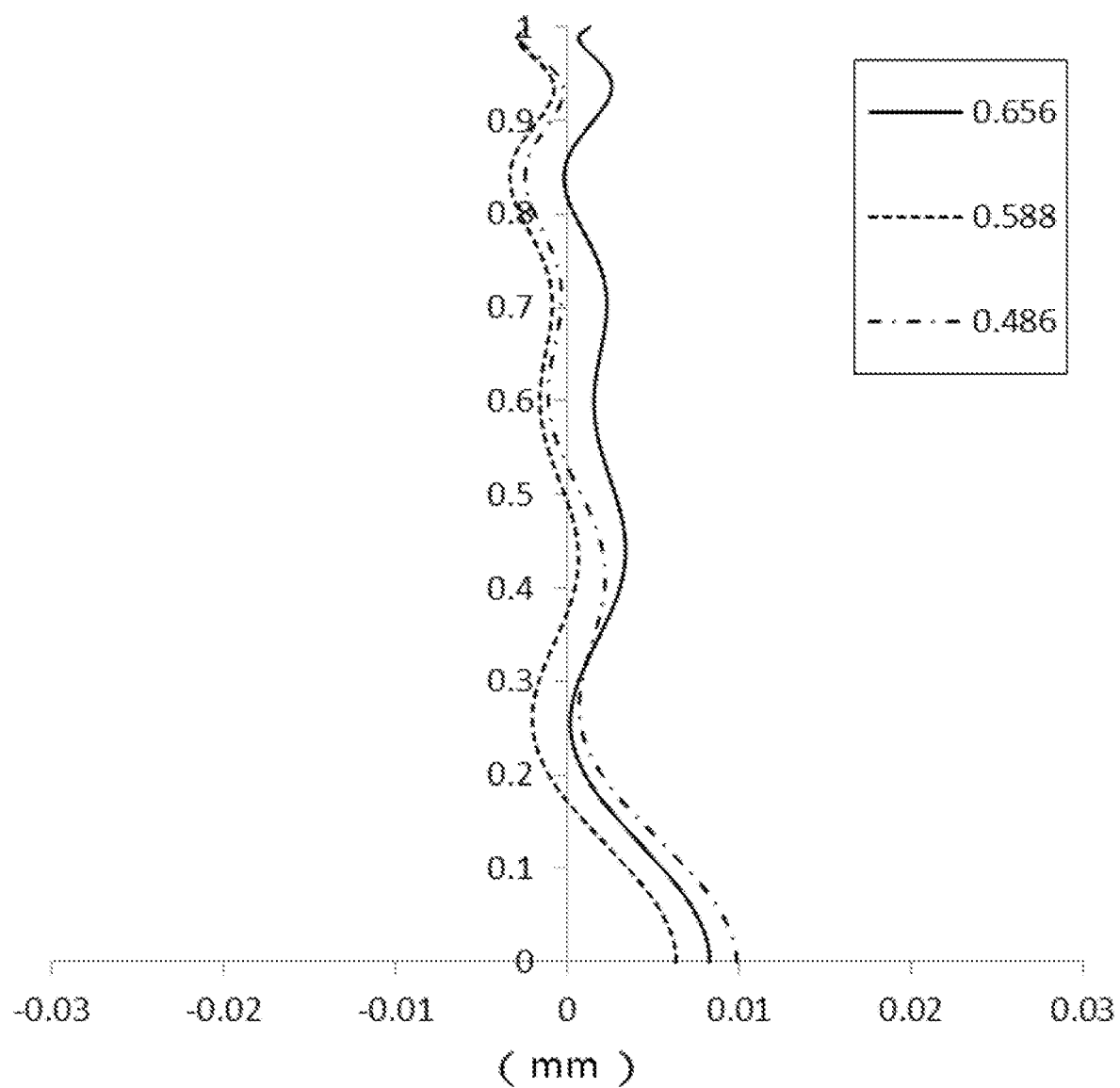
FIG. 27 shows a longitudinal aberration curve of the optical imaging lens in FIG. 26.
Figure 28:
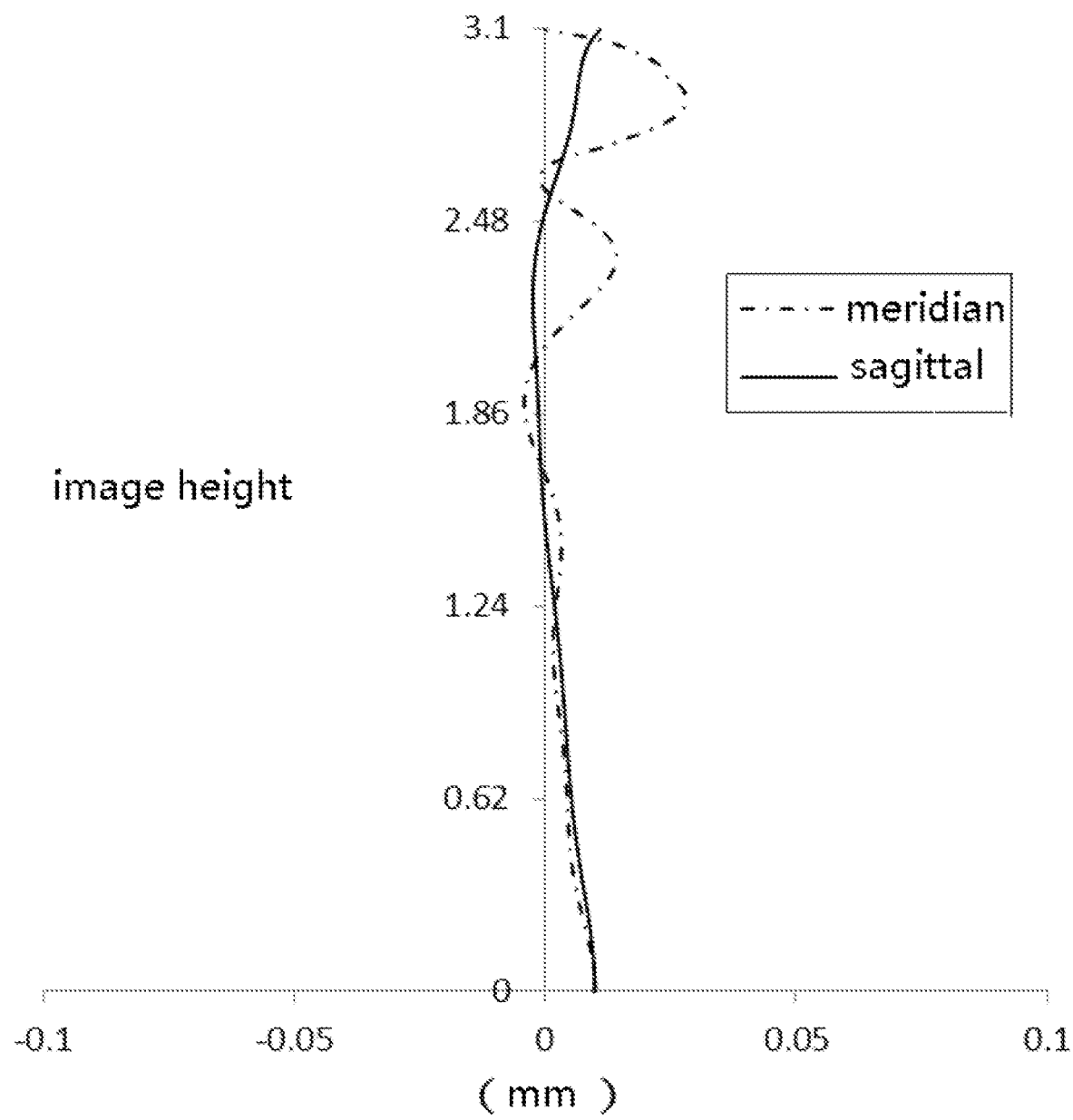
FIG. 28 shows an astigmatism curve of the optical imaging lens in FIG. 26.
Figure 29:
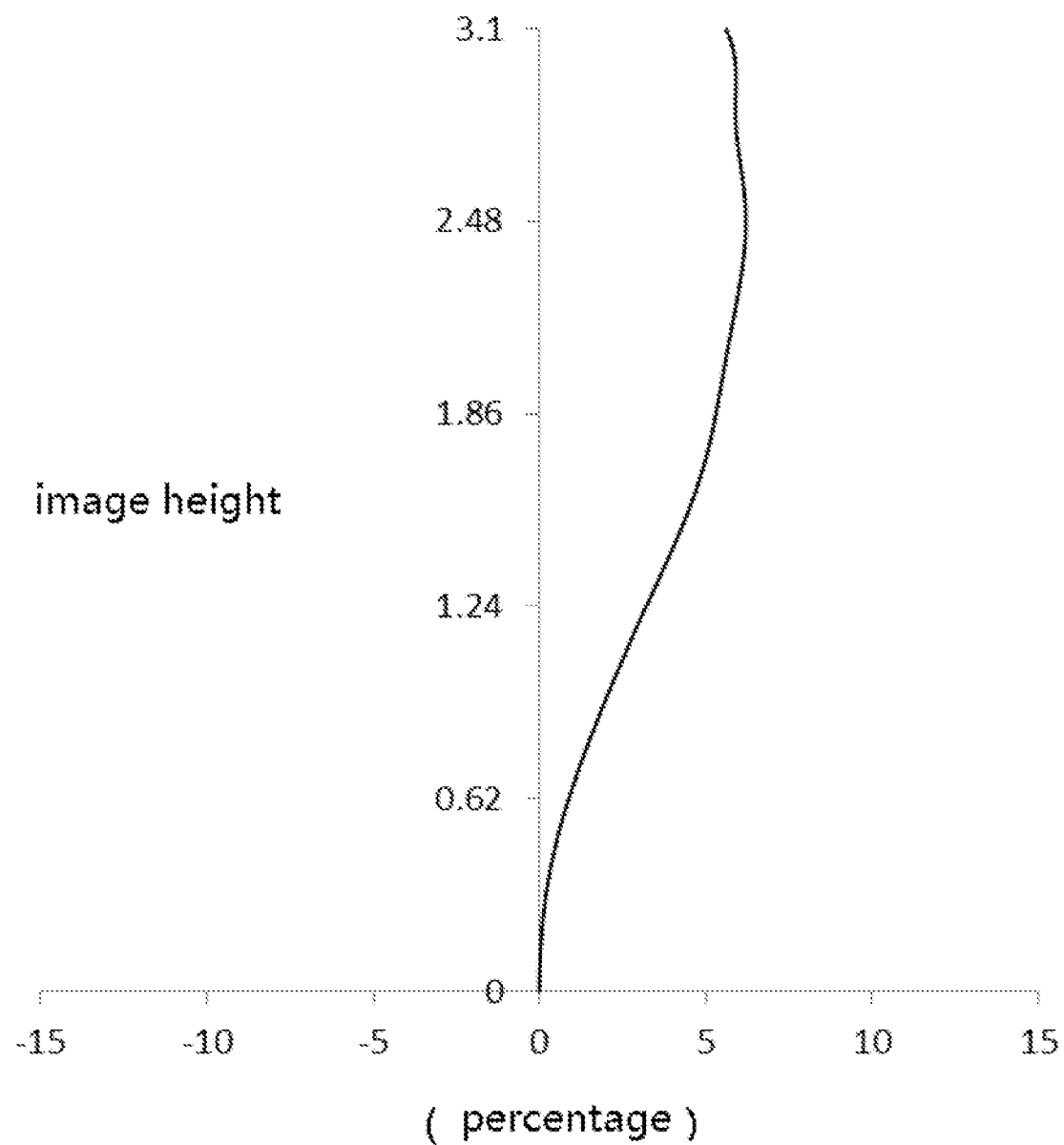
FIG. 29 shows a distortion curve of the optical imaging lens in FIG. 26.
Figure 30:
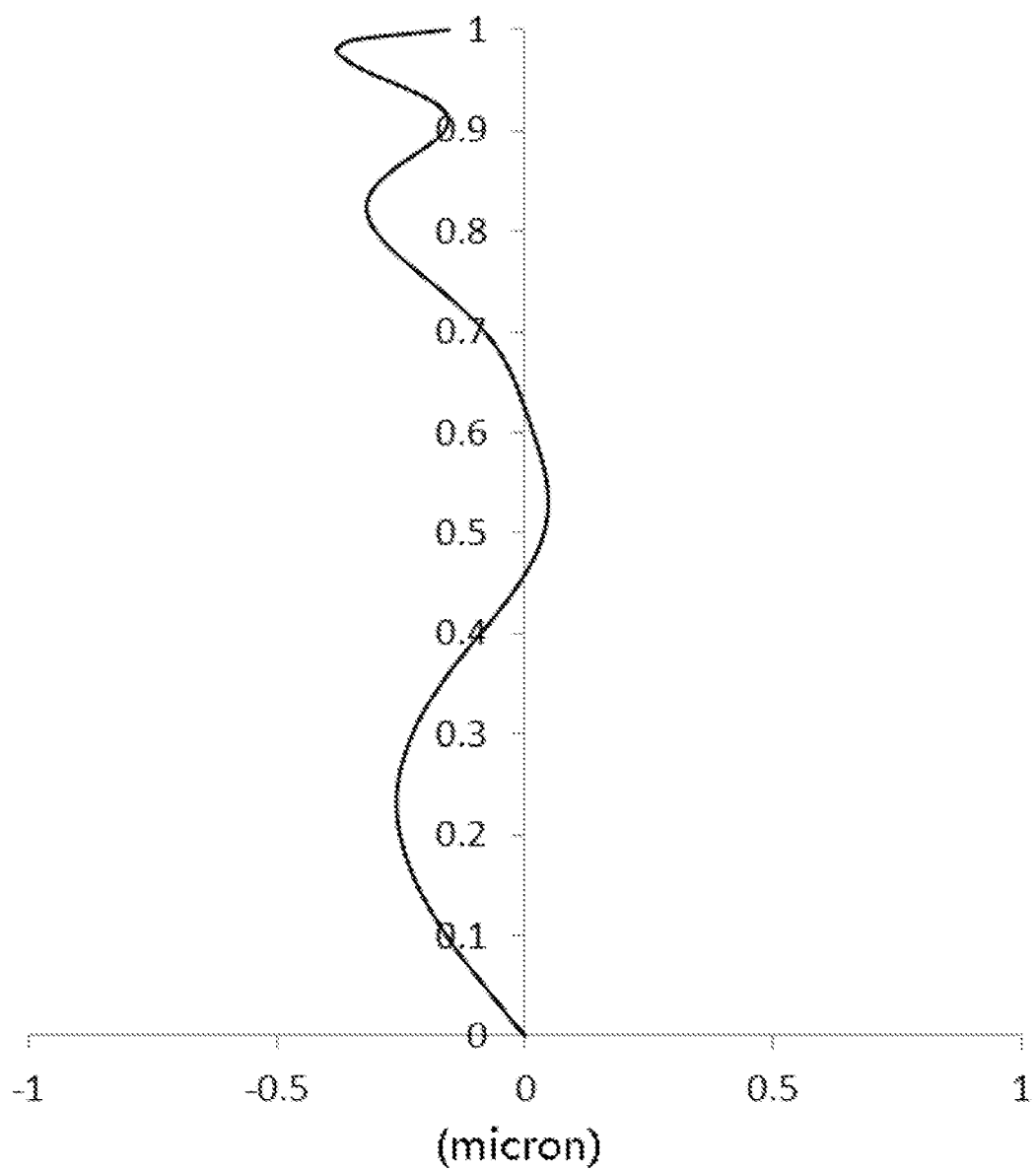
FIG. 30 shows a lateral color curve of the optical imaging lens in FIG. 26.

FIG. 27 shows the longitudinal aberration curve of the optical imaging lens in example 6, which represents that the converging focus of light with different wavelengths deviates after passing through the optical system, then the focal planes of the light with different wavelengths cannot coincide in the final imaging, and the polychromatic light scatters to form the chromatic dispersion. FIG. 28 shows an astigmatism curve of the optical imaging lens according to embodiment 6, which represents the meridian image surface curvature and the sagittal image surface curvature. FIG. 29 shows a distortion curve of the optical imaging lens in example 6, which represents the distortion values at different angles of view. FIG. 30 shows a lateral color curve of the optical imaging lens in example 6, which represents the aberration of different image heights on the imaging surface after the light passes through the optical imaging lens. It can be seen from FIG. 27 to FIG. 30 that the optical imaging lens based on example 6 is suitable for portable electronic products, and has large aperture and good imaging quality.

The above is only the preferred embodiments of the disclosure and not intended to limit the disclosure; for those skilled in the art, the disclosure may have various modifications and changes. Any modifications, equivalent replacements, improvements and the like within the spirit and principle of the disclosure should fall within the protection scope of the claims of the disclosure.

What is claimed is:

1. An optical imaging lens, sequentially comprising from an object side to an image side:
   a first lens with positive focal power;
   a second lens with negative focal power;
   a third lens with positive focal power;
   a fourth lens with focal power;
   a fifth lens with focal power;
   a sixth lens with focal power, an object-side surface of which is a convex surface and an image-side surface of which is a concave surface; and
   a seventh lens with negative focal power, an image-side surface of which is a concave surface;
   wherein, an Entrance Pupil Diameter (EPD) of the optical imaging lens and an effective focal length f of the optical imaging lens meet 1.4<f/EPD<1.98, an air space T23 between the second lens and the third lens on an optical axis and an air space T34 between the third lens and the fourth lens on the optical axis meet 0.1<T23/T34<0.3;
   a sum ΣAT of an air spaces between any two lenses of the first lens to the seventh lens on the optical axis and the EPD of the optical imaging lens meet 0.9<EPD/ΣAT<1.6;
   an effective focal length f2 of the second lens and an effective focal length f7 of the seventh lens meet 1<f2/f7<1.6;
   a distance from an intersection of an object-side surface of the first lens and the optical axis to a vertex of an effective radius of the object-side surface of the first lens on the optical axis is SAG11, an edge thickness of the first lens is ET1; SAG11 and ET1 meet 3<SAG11/ET1<3.6.

2. The optical imaging lens as claimed in claim 1, wherein a curvature radius R11 of the object-side surface of the sixth lens and an effective focal length f3 of the third lens meet 1.1<R11/f3<0.5.

3. The optical imaging lens as claimed in claim 1, wherein a curvature radius R12 of the image-side surface of the sixth lens and a curvature radius R11 of the object-side surface of the sixth lens meet 0<(R12−R11)/(R12+R11)<0.5.

4. The optical imaging lens as claimed in claim 1, wherein a sum ΣCT of Center Thicknesses (CT) of the first lens to the seventh lens on the optical axis and a distance TD from an object-side surface of the first lens to the image-side surface of the seventh lens on the optical axis meet 0.3<ΣCT/TD<0.8.

5. The optical imaging lens as claimed in claim 1, wherein a curvature radius R11 of the object-side surface of the sixth lens and a curvature radius R14 of the image-side surface of the seventh lens meet 0.9<R11/R14<1.5.

6. The optical imaging lens as claimed in claim 1, wherein a CT6 of the sixth lens on the optical axis, an air space T67 between the sixth lens and the seventh lens on the optical axis, and a CT7 of the seventh lens on the optical axis meet 0.1<CT6/(T67+CT7)<0.6.

7. The optical imaging lens as claimed in claim 1, wherein the effective focal length f of the optical imaging lens, an effective focal length f1 of the first lens and an effective focal length f3 of the third lens meet $1.3 < (f/f1) + (f/f3) < 2$.

* * * * *